US011996106B2

(12) United States Patent
Disch et al.

(10) Patent No.: US 11,996,106 B2

(45) **Date of Patent: *May 28, 2024**

(54) APPARATUS AND METHOD FOR ENCODING AND DECODING AN ENCODED AUDIO SIGNAL USING TEMPORAL NOISE/PATCH SHAPING

(71) Applicant: Fraunhofer-Gesellschaft zur Foerderung der angewandten Forschung e.V., Munich (DE)

(72) Inventors: Sascha Disch, Fuerth (DE); Frederik Nagel, Nuremberg (DE); Ralf Geiger, Erlangen (DE); Balaji Nagendran Thoshkahna, Erlangen (DE); Konstantin Schmidt, Nuremberg (DE); Stefan Bayer, Nuremberg (DE); Christian Neukam, Kalchreuth (DE); Bernd Edler, Fuerth (DE); Christian Helmrich, Fuerth (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,270

(22) Filed: Jun. 4, 2021

(65) Prior Publication Data

US 2021/0295853 A1 Sep. 23, 2021

Related U.S. Application Data

(60) Continuation of application No. 16/417,471, filed on May 20, 2019, now Pat. No. 11,049,506, which is a (Continued)

(30) Foreign Application Priority Data

Jul. 22, 2013 (EP) .................................... 13177346
Jul. 22, 2013 (EP) .................................... 13177348

(Continued)

(51) Int. Cl.
*G10L 19/008* (2013.01)
*G10L 19/02* (2013.01)

(Continued)

(52) U.S. Cl.
CPC ........ *G10L 19/008* (2013.01); *G10L 19/0204* (2013.01); *G10L 19/0208* (2013.01);

(Continued)

(58) Field of Classification Search
CPC .............................. G10L 19/008; G10L 19/06
See application file for complete search history.

(56) References Cited

U.S. PATENT DOCUMENTS

| | | |
|---|---|---|
| 4,757,517 A | 7/1988 | Yatsuzuka |
| 5,502,713 A | 3/1996 | Lagerqvist et al. |

(Continued)

FOREIGN PATENT DOCUMENTS

| | | |
|---|---|---|
| CN | 1114122 A | 12/1995 |
| CN | 1276903 A | 12/2000 |

(Continued)

OTHER PUBLICATIONS

"Information technology—MPEG audio technologies—Part 3: Unified speech and audio coding", ISO/IEC FDIS 23003-3:2011(E); ISO/IEC JTC 1/SC 29/WG 11; STD Version 2.1c2 , 2011 , 286 pp.

(Continued)

*Primary Examiner* — Michael N Opsasnick
(74) *Attorney, Agent, or Firm* — Perkins Coie LLP; Michael A. Glenn

(57) ABSTRACT

An apparatus decodes an encoded audio signal. The apparatus includes a spectral domain audio decoder that gener- (Continued)

ates a decoded representation of a set of spectral portions, the decoded representation being spectral prediction residual values. A frequency regenerator generates a reconstructed spectral portion using a portion of the same set spectral portions. The reconstructed spectral portion also includes spectral prediction residual values. An inverse prediction filter is configured using prediction filter information included in the encoded audio signal and performs an inverse prediction over frequency using the spectral prediction residual values.

27 Claims, 29 Drawing Sheets

Related U.S. Application Data continuation of application No. 15/431,571, filed on Feb. 13, 2017, now Pat. No. 10,347,274, which is a division of application No. 14/680,743, filed on Apr. 7, 2015, now Pat. No. 10,332,539, which is a continuation of application No. PCT/EP2014/065123, filed on Jul. 15, 2014.

(30) Foreign Application Priority Data

| | | |
|---|---|---|
| Jul. 22, 2013 | (EP) | 13177350 |
| Jul. 22, 2013 | (EP) | 13177353 |
| Oct. 18, 2013 | (EP) | 13189358 |

(51) Int. Cl.

| | |
|---|---|
| ***G10L 19/022*** | (2013.01) |
| ***G10L 19/025*** | (2013.01) |
| ***G10L 19/03*** | (2013.01) |
| ***G10L 19/032*** | (2013.01) |
| ***G10L 19/06*** | (2013.01) |
| ***G10L 21/0388*** | (2013.01) |
| ***G10L 25/06*** | (2013.01) |
| ***G10L 25/18*** | (2013.01) |
| ***G10L 25/21*** | (2013.01) |
| ***H04S 1/00*** | (2006.01) |

(52) U.S. Cl.

CPC ........ *G10L 19/0212* (2013.01); *G10L 19/022* (2013.01); *G10L 19/025* (2013.01); *G10L 19/03* (2013.01); *G10L 19/032* (2013.01); *G10L 19/06* (2013.01); *G10L 21/0388* (2013.01); *G10L 25/06* (2013.01); *G10L 25/18* (2013.01); *G10L 25/21* (2013.01); *H04S 1/007* (2013.01); *G10L 19/02* (2013.01)

(56) References Cited

U.S. PATENT DOCUMENTS

| | | | |
|---|---|---|---|
| 5,619,566 | A | 4/1997 | Fogel |
| 5,717,821 | A | 2/1998 | Tsutsui et al. |
| 5,913,191 | A | 6/1999 | Fielder |
| 5,926,788 | A | 7/1999 | Nishiguchi |
| 5,950,153 | A | 9/1999 | Ohmori et al. |
| 5,978,759 | A | 11/1999 | Tsushima et al. |
| 6,029,126 | A | 2/2000 | Malvar |
| 6,041,295 | A | 3/2000 | Hinderks |
| 6,061,555 | A | 5/2000 | Bultman et al. |
| 6,104,321 | A | 8/2000 | Akagiri |
| 6,253,165 | B1 | 6/2001 | Malvar |
| 6,253,172 | B1 | 6/2001 | Ding et al. |
| 6,289,308 | B1 | 9/2001 | Lokhoff |
| 6,424,939 | B1 | 7/2002 | Herre et al. |
| 6,453,289 | B1 | 9/2002 | Ertem et al. |
| 6,502,069 | B1 | 12/2002 | Grill et al. |
| 6,680,972 | B1 | 1/2004 | Liljeryd et al. |
| 6,708,145 | B1 | 3/2004 | Liljeryd et al. |
| 6,799,164 | B1 | 9/2004 | Araki |
| 6,826,526 | B1 | 11/2004 | Norimatsu et al. |
| 6,963,405 | B1 | 11/2005 | Wheel et al. |
| 6,978,236 | B1 | 12/2005 | Liljeryd et al. |
| 7,206,740 | B2 | 4/2007 | Thyssen et al. |
| 7,246,065 | B2 | 7/2007 | Tanaka et al. |
| 7,318,027 | B2 | 1/2008 | Lennon et al. |
| 7,328,161 | B2 | 2/2008 | Oh |
| 7,447,317 | B2 | 11/2008 | Herre et al. |
| 7,447,631 | B2 | 11/2008 | Truman et al. |
| 7,460,990 | B2 | 12/2008 | Mehrotra et al. |
| 7,483,758 | B2 | 1/2009 | Liljeryd et al. |
| 7,502,743 | B2 | 3/2009 | Thumpudi et al. |
| 7,539,612 | B2 | 5/2009 | Thumpudi et al. |
| 7,739,119 | B2 | 6/2010 | Venkatesha et al. |
| 7,756,713 | B2 | 7/2010 | Chong et al. |
| 7,761,303 | B2 | 7/2010 | Pang et al. |
| 7,801,735 | B2 | 9/2010 | Thumpudi et al. |
| 7,917,369 | B2 | 3/2011 | Chen et al. |
| 7,930,171 | B2 | 4/2011 | Chen et al. |
| 7,945,449 | B2 | 5/2011 | Vinton et al. |
| 7,983,904 | B2 | 7/2011 | Ehara et al. |
| 8,078,474 | B2 | 12/2011 | Vos et al. |
| 8,112,284 | B2 | 2/2012 | Kjoerling et al. |
| 8,135,047 | B2 | 3/2012 | Rajendran et al. |
| 8,214,202 | B2 | 7/2012 | Bruhn |
| 8,255,229 | B2 | 8/2012 | Koishida et al. |
| 8,412,365 | B2 | 4/2013 | Liljeryd et al. |
| 8,428,957 | B2 | 4/2013 | Garudadri et al. |
| 8,473,301 | B2 | 6/2013 | Chen et al. |
| 8,484,020 | B2 | 7/2013 | Krishnan et al. |
| 8,489,403 | B1 | 7/2013 | Griffin et al. |
| 8,494,863 | B2 | 7/2013 | Biswas et al. |
| 8,554,569 | B2 | 10/2013 | Chen et al. |
| 8,645,146 | B2 | 2/2014 | Koishida et al. |
| 8,655,670 | B2 * | 2/2014 | Purnhagen .............. G10L 19/04 704/220 |
| 8,891,776 | B2 | 11/2014 | Ramamoorthy |
| 8,892,448 | B2 | 11/2014 | Vos et al. |
| 9,015,041 | B2 | 4/2015 | Bayer et al. |
| 9,047,875 | B2 | 6/2015 | Gao |
| 9,105,271 | B2 | 8/2015 | Mehrotra et al. |
| 9,111,427 | B2 | 8/2015 | Knox et al. |
| 9,111,535 | B2 | 8/2015 | Yang et al. |
| 9,177,569 | B2 | 11/2015 | Choo et al. |
| 9,280,975 | B2 | 3/2016 | Sung et al. |
| 9,390,717 | B2 | 7/2016 | Yamamoto et al. |
| 9,646,624 | B2 | 5/2017 | Disch et al. |
| 9,697,840 | B2 | 7/2017 | Biswas et al. |
| 9,805,735 | B2 | 10/2017 | Nagel et al. |
| 10,147,430 | B2 | 12/2018 | Neukam et al. |
| 10,332,539 | B2 * | 6/2019 | Disch .................... G10L 19/022 |
| 11,049,506 | B2 * | 6/2021 | Disch ...................... G10L 25/21 |
| 11,289,104 | B2 * | 3/2022 | Disch .................. G10L 19/0208 |
| 2002/0087304 | A1 | 7/2002 | Kjorling et al. |
| 2002/0128839 | A1 | 9/2002 | Lindgren et al. |
| 2003/0009327 | A1 | 1/2003 | Nilsson et al. |
| 2003/0014136 | A1 | 1/2003 | Wang et al. |
| 2003/0074191 | A1 | 4/2003 | Byrnes et al. |
| 2003/0115042 | A1 | 6/2003 | Chen et al. |
| 2003/0158726 | A1 | 8/2003 | Philippe et al. |
| 2003/0187663 | A1 | 10/2003 | Truman et al. |
| 2003/0220800 | A1 | 11/2003 | Budnikov |
| 2004/0008615 | A1 | 1/2004 | Oh |
| 2004/0024588 | A1 | 2/2004 | Watson et al. |
| 2004/0028244 | A1 | 2/2004 | Tsushima et al. |
| 2004/0054525 | A1 | 3/2004 | Sekiguchi |
| 2004/0225505 | A1 | 11/2004 | Andersen et al. |
| 2005/0004793 | A1 | 1/2005 | Ojala et al. |
| 2005/0036633 | A1 | 2/2005 | Jeon et al. |
| 2005/0053242 | A1 | 3/2005 | Henn et al. |
| 2005/0074127 | A1 | 4/2005 | Herre et al. |
| 2005/0096917 | A1 | 5/2005 | Kjorling et al. |
| 2005/0141721 | A1 | 6/2005 | Aarts et al. |
| 2005/0157891 | A1 | 7/2005 | Johansen |
| 2005/0165611 | A1 | 7/2005 | Mehrotra et al. |

(56) References Cited

U.S. PATENT DOCUMENTS

2005/0216262 A1 9/2005 Fejzo
2005/0278171 A1 12/2005 Suppappola et al.
2006/0006103 A1 1/2006 Sirota et al.
2006/0031075 A1 2/2006 Oh et al.
2006/0095269 A1 5/2006 Smith et al.
2006/0122828 A1 6/2006 Lee et al.
2006/0149538 A1 7/2006 Lee et al.
2006/0210180 A1 9/2006 Geiger et al.
2006/0239473 A1 10/2006 Kjorling et al.
2006/0265087 A1 11/2006 Philippe et al.
2006/0265210 A1 11/2006 Ramakrishnan et al.
2006/0282262 A1 12/2006 Vos et al.
2006/0282263 A1 12/2006 Vos et al.
2007/0016402 A1 1/2007 Schuller et al.
2007/0016403 A1 1/2007 Schuller et al.
2007/0016411 A1 1/2007 Kim et al.
2007/0016427 A1 1/2007 Thumpudi et al.
2007/0027677 A1 2/2007 Ouyang et al.
2007/0043557 A1 2/2007 Schuller et al.
2007/0043575 A1 2/2007 Onuma et al.
2007/0063877 A1 3/2007 Shmunk et al.
2007/0067162 A1 3/2007 Villemoes et al.
2007/0094009 A1 4/2007 Ryu et al.
2007/0100607 A1 5/2007 Villemoes
2007/0112559 A1 5/2007 Schuijers et al.
2007/0129036 A1 6/2007 Arora
2007/0147518 A1 6/2007 Bessette
2007/0179781 A1 8/2007 Villemoes
2007/0196022 A1 8/2007 Geiger et al.
2007/0223577 A1 9/2007 Ehara et al.
2007/0239442 A1 10/2007 Hotho et al.
2007/0282603 A1 12/2007 Bessette
2008/0002842 A1 1/2008 Neusinger et al.
2008/0004869 A1 1/2008 Herre et al.
2008/0027711 A1 1/2008 Rajendran et al.
2008/0027717 A1 1/2008 Rajendran et al.
2008/0027718 A1 1/2008 Krishnan et al.
2008/0040103 A1 2/2008 Vinton et al.
2008/0052066 A1 2/2008 Oshikiri et al.
2008/0199014 A1 8/2008 Kurniawati et al.
2008/0208538 A1 8/2008 Visser et al.
2008/0208575 A1 8/2008 Laaksonen et al.
2008/0208600 A1 8/2008 Pang et al.
2008/0243518 A1 10/2008 Oraevsky et al.
2008/0262835 A1 10/2008 Oshikiri
2008/0262853 A1 10/2008 Jung et al.
2008/0270125 A1 10/2008 Choo et al.
2008/0281604 A1 11/2008 Choo et al.
2008/0312758 A1 12/2008 Koishida et al.
2009/0006103 A1 1/2009 Koishida et al.
2009/0055196 A1 2/2009 Oh et al.
2009/0110208 A1 4/2009 Choo et al.
2009/0132261 A1 5/2009 Kjorling et al.
2009/0144055 A1 6/2009 Davidson et al.
2009/0144062 A1 6/2009 Ramabadran et al.
2009/0164226 A1 6/2009 Boehm et al.
2009/0180531 A1* 7/2009 Wein ...................... G10L 19/08
375/240
2009/0192789 A1 7/2009 Lee et al.
2009/0216527 A1 8/2009 Oshikiri
2009/0226010 A1 9/2009 Schnell et al.
2009/0228285 A1 9/2009 Schnell et al.
2009/0234644 A1 9/2009 Reznik et al.
2009/0263036 A1 10/2009 Tanaka
2009/0292537 A1 11/2009 Ehara et al.
2010/0017195 A1 1/2010 Villemoes
2010/0023322 A1 1/2010 Schnell et al.
2010/0042415 A1 2/2010 Tsushima et al.
2010/0063802 A1 3/2010 Gao
2010/0063808 A1 3/2010 Gao et al.
2010/0070270 A1 3/2010 Gao
2010/0076774 A1 3/2010 Breebaart
2010/0114583 A1 5/2010 Lee et al.
2010/0177903 A1 7/2010 Vinton et al.
2010/0211399 A1 8/2010 Liljeryd et al.
2010/0211400 A1 8/2010 Oh et al.
2010/0223052 A1 9/2010 Nilsson et al.
2010/0232619 A1 9/2010 Uhle et al.
2010/0241433 A1 9/2010 Herre et al.
2010/0241437 A1 9/2010 Taleb et al.
2010/0286981 A1 11/2010 Krini et al.
2010/0286990 A1 11/2010 Biswas et al.
2011/0002266 A1 1/2011 Gao
2011/0015768 A1 1/2011 Lim et al.
2011/0022402 A1 1/2011 Engdegard et al.
2011/0029923 A1 2/2011 Xu et al.
2011/0035227 A1 2/2011 Lee et al.
2011/0046945 A1 2/2011 Li et al.
2011/0093276 A1 4/2011 Rämöet al.
2011/0099004 A1 4/2011 Krishnan et al.
2011/0099018 A1 4/2011 Neuendorf et al.
2011/0106529 A1 5/2011 Disch et al.
2011/0106545 A1 5/2011 Disch et al.
2011/0125505 A1* 5/2011 Vaillancourt ......... G10L 19/005
704/500
2011/0144979 A1 6/2011 Jung et al.
2011/0173006 A1 7/2011 Nagel et al.
2011/0173007 A1 7/2011 Multrus et al.
2011/0173012 A1 7/2011 Rettelbach et al.
2011/0194712 A1 8/2011 Potard
2011/0196684 A1 8/2011 Koishida et al.
2011/0200196 A1 8/2011 Disch et al.
2011/0202352 A1 8/2011 Neuendorf et al.
2011/0202354 A1 8/2011 Grill et al.
2011/0202358 A1 8/2011 Neuendorf et al.
2011/0235809 A1 9/2011 Schuijers et al.
2011/0238425 A1* 9/2011 Neuendorf .............. G10L 19/18
704/500
2011/0238426 A1 9/2011 Fuchs et al.
2011/0257984 A1 10/2011 Virette et al.
2011/0264454 A1 10/2011 Ullberg et al.
2011/0264457 A1* 10/2011 Oshikiri ................ G10L 21/038
704/500
2011/0288873 A1 11/2011 Nagel et al.
2011/0295598 A1 12/2011 Yang et al.
2011/0305352 A1 12/2011 Villemoes et al.
2011/0320212 A1 12/2011 Tsujino et al.
2012/0002818 A1 1/2012 Heiko et al.
2012/0029923 A1 2/2012 Rajendran et al.
2012/0065965 A1 3/2012 Choo et al.
2012/0095769 A1 4/2012 Zhang et al.
2012/0136670 A1 5/2012 Ishikawa et al.
2012/0158409 A1 6/2012 Nagel et al.
2012/0209600 A1 8/2012 Kim et al.
2012/0226505 A1 9/2012 Lin et al.
2012/0239388 A1 9/2012 Sverrisson et al.
2012/0245947 A1 9/2012 Neuendorf et al.
2012/0253797 A1 10/2012 Geiger et al.
2012/0265534 A1 10/2012 Coorman et al.
2012/0271644 A1 10/2012 Bessette et al.
2012/0275607 A1 11/2012 Kjoerling et al.
2012/0296641 A1 11/2012 Rajendran et al.
2013/0006644 A1 1/2013 Jiang et al.
2013/0006645 A1 1/2013 Jiang et al.
2013/0035777 A1 2/2013 Niemisto et al.
2013/0051571 A1 2/2013 Nagel et al.
2013/0051574 A1 2/2013 Yoo
2013/0090933 A1 4/2013 Villemoes et al.
2013/0090934 A1 4/2013 Nagel et al.
2013/0121411 A1 5/2013 Robillard et al.
2013/0124214 A1 5/2013 Yamamoto et al.
2013/0156112 A1 6/2013 Suzuki et al.
2013/0185085 A1 7/2013 Tsujino et al.
2013/0262122 A1 10/2013 Kim et al.
2013/0282368 A1 10/2013 Choo et al.
2013/0282383 A1 10/2013 Hedelin et al.
2013/0308792 A1 11/2013 Gao
2013/0332176 A1 12/2013 Setiawan et al.
2014/0039890 A1 2/2014 Mundt et al.
2014/0088973 A1 3/2014 Gibbs et al.
2014/0088978 A1 3/2014 Mundt et al.
2014/0149124 A1 5/2014 Choo et al.
2014/0149126 A1 5/2014 Soulodre
2014/0188464 A1 7/2014 Choo

(56) References Cited

U.S. PATENT DOCUMENTS

| | | | | |
|---|---|---|---|---|
| 2014/0200899 | A1 | 7/2014 | Yamamoto et al. | |
| 2014/0200901 | A1 | 7/2014 | Kawashima et al. | |
| 2014/0226822 | A1 | 8/2014 | Engdegard et al. | |
| 2014/0229186 | A1 | 8/2014 | Mehrotra et al. | |
| 2014/0249828 | A1 | 9/2014 | Grancharov et al. | |
| 2014/0336800 | A1 | 11/2014 | Radhakrishnan et al. | |
| 2014/0343932 | A1 | 11/2014 | Daimou et al. | |
| 2015/0071446 | A1 | 3/2015 | Sun et al. | |
| 2016/0035329 | A1 | 2/2016 | Ekstrand et al. | |
| 2016/0140980 | A1 | 5/2016 | Disch et al. | |
| 2016/0210977 | A1* | 7/2016 | Ghido | G10L 19/06 |
| 2017/0116999 | A1* | 4/2017 | Gao | G10L 25/93 |
| 2017/0133023 | A1* | 5/2017 | Disch | G10L 19/18 |

FOREIGN PATENT DOCUMENTS

| | | | |
|---|---|---|---|
| CN | 1465137 | A | 12/2003 |
| CN | 1467703 | A | 1/2004 |
| CN | 1496559 | A | 5/2004 |
| CN | 1503968 | A | 6/2004 |
| CN | 1571993 | A | 1/2005 |
| CN | 1647154 | A | 7/2005 |
| CN | 1659927 | A | 8/2005 |
| CN | 1677491 | A | 10/2005 |
| CN | 1677492 | A | 10/2005 |
| CN | 1677493 | A | 10/2005 |
| CN | 1813286 | A | 8/2006 |
| CN | 1864436 | A | 11/2006 |
| CN | 1905373 | A | 1/2007 |
| CN | 1918631 | A | 2/2007 |
| CN | 1918632 | A | 2/2007 |
| CN | 101006494 | A | 7/2007 |
| CN | 101067931 | A | 11/2007 |
| CN | 101083076 | A | 12/2007 |
| CN | 101185124 | A | 5/2008 |
| CN | 101185127 | A | 5/2008 |
| CN | 101199121 | A | 6/2008 |
| CN | 101238510 | A | 8/2008 |
| CN | 101325059 | A | 12/2008 |
| CN | 101432610 | A | 5/2009 |
| CN | 101502122 | A | 8/2009 |
| CN | 101521014 | A | 9/2009 |
| CN | 101529501 | A | 9/2009 |
| CN | 101609680 | A | 12/2009 |
| CN | 101622669 | A | 1/2010 |
| CN | 101842834 | A | 9/2010 |
| CN | 101933086 | A | 12/2010 |
| CN | 101939782 | A | 1/2011 |
| CN | 101946526 | A | 1/2011 |
| CN | 101996634 | A | 3/2011 |
| CN | 102089758 | A | 6/2011 |
| CN | 102089808 | A | 6/2011 |
| CN | 102089816 | A | 6/2011 |
| CN | 102194457 | A | 9/2011 |
| CN | 101184979 | B | 4/2012 |
| CN | 102750955 | A | 10/2012 |
| CN | 103038819 | A | 4/2013 |
| CN | 103165136 | A | 6/2013 |
| CN | 103548077 | A | 1/2014 |
| CN | 103971699 | A | 8/2014 |
| CN | 105518776 | A | 4/2016 |
| CN | 105580075 | B | 2/2020 |
| EP | 0751493 | A2 | 2/1997 |
| EP | 1734511 | A2 | 12/2006 |
| EP | 1446797 | B1 | 5/2007 |
| EP | 2077551 | A1 | 7/2009 |
| EP | 2077551 | B1 | 3/2011 |
| EP | 1943648 | A4 | 12/2012 |
| EP | 2830056 | A1 | 1/2015 |
| EP | 2830059 | A1 | 1/2015 |
| EP | 2830063 | A1 | 1/2015 |
| JP | 07336231 | A | 12/1995 |
| JP | 2001053617 | A | 2/2001 |
| JP | 2002050967 | A | 2/2002 |
| JP | 2002268693 | A | 9/2002 |
| JP | 2003108197 | A | 4/2003 |
| JP | 2003140692 | A | 5/2003 |
| JP | 2004046179 | A | 2/2004 |
| JP | 2006293400 | A | 10/2006 |
| JP | 2006323037 | A | 11/2006 |
| JP | 3898218 | B2 | 1/2007 |
| JP | 3943127 | B2 | 4/2007 |
| JP | 2007532934 | A | 11/2007 |
| JP | 2009501358 | A | 1/2009 |
| JP | 2010526346 | A | 7/2010 |
| JP | 2010538318 | A | 12/2010 |
| JP | 2011154384 | A | 8/2011 |
| JP | 2011527447 | A | 10/2011 |
| JP | 2012027498 | A | 2/2012 |
| JP | 2012037582 | A | 2/2012 |
| JP | 2013125187 | A | 6/2013 |
| JP | 2013521538 | A | 6/2013 |
| JP | 2013524281 | A | 6/2013 |
| KR | 1020070118173 | A | 12/2007 |
| KR | 20090110244 | A | 10/2009 |
| KR | 20130025963 | A | 3/2013 |
| RU | 2323469 | C2 | 4/2008 |
| RU | 2325708 | C2 | 5/2008 |
| RU | 2388068 | C2 | 4/2010 |
| RU | 2422922 | C1 | 6/2011 |
| RU | 2428747 | C2 | 9/2011 |
| RU | 2459282 | C2 | 8/2012 |
| RU | 2470385 | C2 | 12/2012 |
| RU | 2477532 | C2 | 3/2013 |
| RU | 2481650 | C2 | 5/2013 |
| RU | 2482554 | C1 | 5/2013 |
| RU | 2487427 | C2 | 7/2013 |
| SG | 144743 | A1 | 8/2008 |
| TW | 412719 | B | 11/2000 |
| TW | 200537436 | A | 11/2005 |
| TW | 200939206 | A | 9/2009 |
| TW | 201007696 | A | 2/2010 |
| TW | 201009812 | A | 3/2010 |
| TW | 201034001 | A | 9/2010 |
| TW | 201205558 | A | 2/2012 |
| TW | 201316327 | A | 4/2013 |
| TW | 201333933 | A | 8/2013 |
| WO | 9921185 | A1 | 4/1999 |
| WO | 2004072957 | A2 | 8/2004 |
| WO | 2005027094 | A1 | 3/2005 |
| WO | 2005096274 | A1 | 10/2005 |
| WO | 2005104094 | A1 | 11/2005 |
| WO | 2005109240 | A1 | 11/2005 |
| WO | 2006049204 | A1 | 5/2006 |
| WO | 2006107840 | A1 | 10/2006 |
| WO | 2006130221 | A1 | 12/2006 |
| WO | 2007052942 | A1 | 5/2007 |
| WO | 2008084427 | A2 | 7/2008 |
| WO | 2010070770 | A1 | 6/2010 |
| WO | 2010114123 | A1 | 10/2010 |
| WO | 2010136459 | A1 | 12/2010 |
| WO | 2011047887 | A1 | 4/2011 |
| WO | 2011110499 | A1 | 9/2011 |
| WO | 2012012414 | A1 | 1/2012 |
| WO | 2012110482 | A2 | 8/2012 |
| WO | 2013035257 | A1 | 3/2013 |
| WO | 2013061530 | A1 | 5/2013 |
| WO | 2013/147666 | A1 | 10/2013 |
| WO | 2013/147668 | A1 | 10/2013 |
| WO | 2013147666 | A1 | 10/2013 |
| WO | 2013147668 | A1 | 10/2013 |
| WO | 2015010949 | A1 | 1/2015 |

OTHER PUBLICATIONS

Annadana, Raghuram, et al., "New Results in Low Bit Rate Speech Coding and Bandwidth Extension", Audio Engineering Society Convention 121, Audio Engineering Society Convention Paper 6876, pp. 1-6.

Bosi, Marina, et al. , "Iso/Iec MPEG-2 Advanced Audio Coding", J. Audio Eng. Soc., vol. 45, No. 10, pp. 789-814.

(56) References Cited

OTHER PUBLICATIONS

Daudet, Laurent, et al., "MDCT analysis of sinusoids: exact results and applications to coding artifacts reduction", IEEE Transactions on Speech and Audio Processing, IEEE, vol. 12, No. 3 , pp. 302-312.
Den Brinker, A. C, et al. , "An overview of the coding standard MPEG-4 audio amendments 1 and 2: HE-AAC, SSC, and HE-AAC v2", EURASIP Journal on Audio, Speech, and Music Processing, 2009, Feb. 24, 2009, 24 pps.
Dietz, Martin, et al., "Spectral Band Replication, a Novel Approach in Audio Coding", Engineering Society Convention 121, Audio Engineering Society Paper 5553, pp. 1-8.
Ekstrand, Per, "Bandwidth Extension of Audio Signals by Spectral Band Replication", Proc.1st IEEE Benelux Workshop on Model based Processing and Coding of Audio (MPCA-2002), pp. 53-58.
Ferreira, Anibal J.S, et al. , "Accurate Spectral Replacement", Audio Engineering Society Convention, 118, Audio Engineering Society Convention Paper No. 6383, May 28, 2005, pp. 1-11.
Geiser, Bernd, et al. , "Bandwidth Extension for Hierarchical Speech and Audio Coding in ITU-T Rec. G.729.1", IEEE Transactions on Audio, Speech and Language Processing, IEEE Service Center, vol. 15, No. 8, pp. 2496-2509.
Havasi, Catherine, et al., "Automated color selection using semantic knowledge." 2010 AAAI Fall Symposium Series, 6 pages, 2010., 2010.
Heer, Jeffrey, et al. , ", Color naming models for color selection, image editing and palette design." Proceedings of the SIGCHI Conference on Human Factors in Computing Systems. ACM, 10 pages, 2012., 2012.
Herre, Jurgen, et al., "Extending the MPEG-4 Aac Codec by Perceptual Noise Substitution", Audio Engineering Society Convention 104, Audio Engineering Society Preprint,, pp. 1-14.
Herre, Jurgen, "Temporal Noise Shaping, Quantization and Coding Methods in Perceptual Auidio Coding: A Tutorial Introduction", Audio Engineering Society Conference: 17th International Conference: High-Quality Audio Coding, Audio Engineering Society, pp. 312-325.
Herre, Jürgen, et al., "Extending the MPEG-4 AAC Codec by Perceptual Noise Substitution", 104th AES Convention, Amsterdam, 1998, Preprint 4720.
ISO/IEC 13818-3:1998(E), "Information Technology—Generic Coding of Moving Pictures and Associated Audio, Part 3: Audio", Second Edition, ISO/IEC, Apr. 15, 1998, 132 pps.
ISO/IEC 14496-3:2001, "Information Technology—Coding of audio-visual objects—Part 3: Audio, Amendment 1: Bandwidth Extension", ISO/IEC JTC1/SC29/WG11/N5570, ISO/IEC 14496-3:2001/FDAM 1:2003(E), Mar. 2003, 127 pps.
ISO/IEC FDIS 23003-3:2011(E), "Information Technology—MPEG audio technologies—Part 3: Unified speech and audio coding, Final Draft", ISO/IEC, 2010, 286 pps.
McAulay, Robert J, et al., "Speech Analysis/ Synthesis Based on a Sinusoidal Representation", IEEE Transactions on Acoustics, Speech and Signal Processing, vol. ASSP-34, No. 4, Aug. 1986, pp. 744-754.
Mehrotra, Sanjeev, et al., "Hybrid low bitrate audio coding using adaptive gain shape vector quantization", Multimedia Signal Processing, 2008 IEEE 10th Workshop on, IEEE, Piscataway, NJ, USA XP031356759 ISBN: 978-1-4344-3394-4, pp. 927-932.
Nagel, Frederik, et al., "A Continuous Modulated Single Sideband Bandwidth Extension", ICASSP International Conference on Acoustics, Speech and Signal Processing, pp. 357-360.
Nagel, Frederik, et al., "A Harmonic Bandwidth Extension Method for Audio Codecs", International Conference on Acoustics, Speech and Signal Processing, pp. 145-148.
Nagel, Frederik, et al., "A Harmonic Banwidth Extension Method for Audio Codecs", International Conference on Acoustics, Speech and Signal Processing 2009, Taipei, pp. 145-148.
Neuendorf, Max, et al., "MPEG Unified Speech and Audio Coding—The ISO/MPEG Standard for High-Efficiency Audio Coding of all Content Types", Audio Engineering Society Convention Paper 8654, Presented at the 132nd Convention, pp. 1-22.
O'Donovan, Peter, et al., "Color compatibility from large datasets." ACM Transactions on Graphics, 8 pages, 2011., 2011.
Purnhagen, Heiko, et al., "HILN-the MPEG-4 parametric audio coding tools", Proceedings ISCAS 2000 Geneva, The 2000 IEEE International Symposium on Circuits and Systems, pp. 201-204.
Sinha, Deepen, et al., "A Novel Integrated Audio Bandwidth Extension Toolkit", ABET, Audio Engineering Society Convention, Paris, France, 1-12.
Smith, Julius O, et al., "PARSHL: An analysis/synthesis program for non-harmonic sounds based on a sinusoidal representation", Proceedings of the International Computer Music Conference, 1987, 1-22.
Zernicki, Tomasz, et al., "Audio bandwidth extension by frequency scaling of sinusoidal partials", Audio Engineering Society Convention, San Francisco, USA, 1-7.
Bao, Feng, et al., "Analysis and Forecast of Audio Bandwidth Extending Techniques", Telecommunication Engineering, No. 02, Feb. 20, 2022.
Geiser, Bernd, et al., "Candidate proposal for ITU-T super-wideband speech and audio coding", Acoustics, Speech and signal processing, 2009, ICASSP 2009, IEEE international conference on, IEEE, Piscatway, NJ, USA, pp. 4121-4124.
Jaing, Tai-Ping, et al., "Research of Synchronized Compression and Decode of Multi-View Video and Audio", Computer Technology and Development, vol. 22, No. 1, pp. 114-118.
Mehrotra, Sanjee, et al., "Hybrid low bitrate audio coding using adaptive gain shape vector quantization", Multimedia Signal Processing, 2008 IEEE 10th Workshop on, IEEE, Piscataway, NJ, USA. 6 pages.
Mohan, Seshadri, et al., "Speech Encoding by a Stack Algorithm", IEEE Transactions on Communications, vol. 28, No. 6, pp. 825-830.
Wang, Jian-Hong, et al., "Fast Algorithm of Subband Synthesis Filter Banks for Decoding of Digital Audio and Its Implementation on Fixed Point DSP Chip", Journal of Shangahi Jiaotong University, vol. 34, No. 6, pp. 764-771.

* cited by examiner

- 1st resolution (high resolution) for „envelope“ of the 1st set (line-wise coding);
- 2nd resolution (low resolution) for „envelope“ of the 2nd set (scale factor per SCB);

(QUANTIZER PROCESSOR)

(OTHER SPECTRAL PORTIONS)

(ENCODER)

(DECODER)

DFT spectrogram of the original signal (left panel);
DFT spectrogram of the extended signal without TTS (right panel).

Basis TTS filter scheme. Each box marks the spectral region covered by one particular filter.

DFT spectrogram of the original signal (left panel);
DFT spectrogram of the extended signal with TTS (right panel).

| | | | | |
|---|---|---|---|---|
| source range | 1 | 1 | 2 | 2 |
| destin. range | 1 | 2 | 1 | 2 |

1: first two-channel representation (e.g. L/R)

2: second two-channel representation (e.g. M/S)

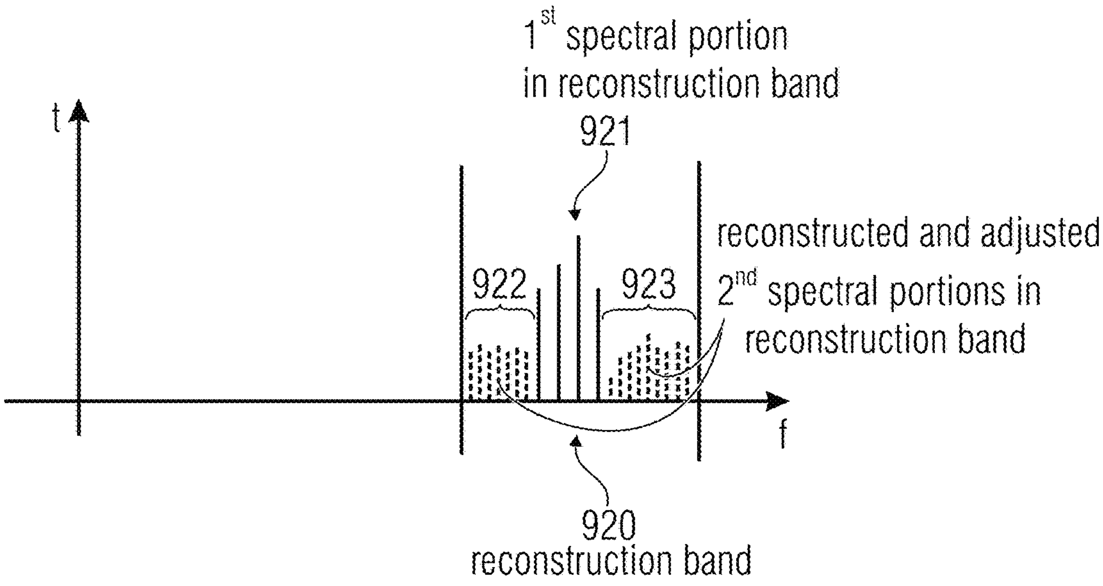

e.g.
- surviving energy: 5 units
- energy value for reconstr. band: 10 units (covers 1st and 2nd spectral portions in the reconstruction band)
- energy of source range data or raw target range data: 8 units
- missing energy: 5 units
- gain factor: $g := \sqrt{\frac{mE_k}{pE_k}} = 0.79$ → only spectral values for the 2nd spectral portions are adjusted → 1st spectral portion is not influenced by the envelope adjustment

FIG 9C

APPARATUS AND METHOD FOR ENCODING AND DECODING AN ENCODED AUDIO SIGNAL USING TEMPORAL NOISE/PATCH SHAPING

CROSS-REFERENCE TO RELATED APPLICATIONS

This application is a continuation of U.S. patent application Ser. No. 16/417,471, filed May 20, 2019, now U.S. Pat. No. 11,049,506, issued Jun. 29, 2021, which is a continuation of U.S. patent application Ser. No. 15/431,571, filed Feb. 13, 2017, now U.S. Pat. No. 10,347,274, issued Jul. 9, 2019, which is a division of application Ser. No. 14/680,743, filed Apr. 7, 2015, now U.S. Pat. No. 10,332,539, issued Jun. 25, 2019, which in turn is a continuation of International Application No. PCT/EP2014/065123, filed Jul. 15, 2014, which is incorporated herein by reference in its entirety, and additionally claims priority from European Applications Nos. EP13177353, filed Jul. 22, 2013, EP13177350, filed Jul. 22, 2013, EP13177348, filed Jul. 22, 2013, EP13177346, filed Jul. 22, 2013, and EP13189358, filed Oct. 18, 2013, which are all incorporated herein by reference in their entirety.

BACKGROUND OF THE INVENTION

The present invention relates to audio coding/decoding and, particularly, to audio coding using Intelligent Gap Filling (IGF).

Audio coding is the domain of signal compression that deals with exploiting redundancy and irrelevancy in audio signals using psychoacoustic knowledge. Today audio codecs typically need around 60 kbps/channel for perceptually transparent coding of almost any type of audio signal. Newer codecs are aimed at reducing the coding bitrate by exploiting spectral similarities in the signal using techniques such as bandwidth extension (BWE). A BWE scheme uses a low bitrate parameter set to represent the high frequency (HF) components of an audio signal. The HF spectrum is filled up with spectral content from low frequency (LF) regions and the spectral shape, tilt and temporal continuity adjusted to maintain the timbre and color of the original signal. Such BWE methods enable audio codecs to retain good quality at even low bitrates of around 24 kbps/channel.

Storage or transmission of audio signals is often subject to strict bitrate constraints. In the past, coders were forced to drastically reduce the transmitted audio bandwidth when only a very low bitrate was available.

Modern audio codecs are nowadays able to code wideband signals by using bandwidth extension (BWE) methods [1]. These algorithms rely on a parametric representation of the high-frequency content (HF)—which is generated from the waveform coded low-frequency part (LF) of the decoded signal by means of transposition into the HF spectral region ("patching") and application of a parameter driven post processing. In BWE schemes, the reconstruction of the HF spectral region above a given so-called cross-over frequency is often based on spectral patching. Typically, the HF region is composed of multiple adjacent patches and each of these patches is sourced from band-pass (BP) regions of the LF spectrum below the given cross-over frequency. State-of-the-art systems efficiently perform the patching within a filterbank representation, e.g. Quadrature Mirror Filterbank (QMF), by copying a set of adjacent subband coefficients from a source to the target region.

Another technique found in today's audio codecs that increases compression efficiency and thereby enables extended audio bandwidth at low bitrates is the parameter driven synthetic replacement of suitable parts of the audio spectra. For example, noise-like signal portions of the original audio signal can be replaced without substantial loss of subjective quality by artificial noise generated in the decoder and scaled by side information parameters. One example is the Perceptual Noise Substitution (PNS) tool contained in MPEG-4 Advanced Audio Coding (AAC) [5].

A further provision that also enables extended audio bandwidth at low bitrates is the noise filling technique contained in MPEG-D Unified Speech and Audio Coding (USAC) [7]. Spectral gaps (zeroes) that are inferred by the dead-zone of the quantizer due to a too coarse quantization, are subsequently filled with artificial noise in the decoder and scaled by a parameter-driven post-processing.

Another state-of-the-art system is termed Accurate Spectral Replacement (ASR) [2-4]. In addition to a waveform codec, ASR employs a dedicated signal synthesis stage which restores perceptually important sinusoidal portions of the signal at the decoder. Also, a system described in [5] relies on sinusoidal modeling in the HF region of a waveform coder to enable extended audio bandwidth having decent perceptual quality at low bitrates. All these methods involve transformation of the data into a second domain apart from the Modified Discrete Cosine Transform (MDCT) and also fairly complex analysis/synthesis stages for the preservation of HF sinusoidal components.

FIG. 13*a* illustrates a schematic diagram of an audio encoder for a bandwidth extension technology as, for example, used in High Efficiency Advanced Audio Coding (HE-AAC). An audio signal at line 1300 is input into a filter system comprising of a low pass 1302 and a high pass 1304. The signal output by the high pass filter 1304 is input into a parameter extractor/coder 1306. The parameter extractor/coder 1306 is configured for calculating and coding parameters such as a spectral envelope parameter, a noise addition parameter, a missing harmonics parameter, or an inverse filtering parameter, for example. These extracted parameters are input into a bit stream multiplexer 1308. The low pass output signal is input into a processor typically comprising the functionality of a down sampler 1310 and a core coder 1312. The low pass 1302 restricts the bandwidth to be encoded to a significantly smaller bandwidth than occurring in the original input audio signal on line 1300. This provides a significant coding gain due to the fact that the whole functionalities occurring in the core coder only have to operate on a signal with a reduced bandwidth. When, for example, the bandwidth of the audio signal on line 1300 is 20 kHz and when the low pass filter 1302 exemplarily has a bandwidth of 4 kHz, in order to fulfill the sampling theorem, it is theoretically sufficient that the signal subsequent to the down sampler has a sampling frequency of 8 kHz, which is a substantial reduction to the sampling rate necessitated for the audio signal 1300 which has to be at least 40 kHz.

FIG. 13*b* illustrates a schematic diagram of a corresponding bandwidth extension decoder. The decoder comprises a bitstream multiplexer 1320. The bitstream demultiplexer 1320 extracts an input signal for a core decoder 1322 and an input signal for a parameter decoder 1324. A core decoder output signal has, in the above example, a sampling rate of 8 kHz and, therefore, a bandwidth of 4 kHz while, for a complete bandwidth reconstruction, the output signal of a high frequency reconstructor 1330 has to be at 20 kHz necessitating a sampling rate of at least 40 kHz. In order to make this possible, a decoder processor having the functionality of an upsampler 1325 and a filterbank 1326 is necessitated. The high frequency reconstructor 1330 then receives the frequency-analyzed low frequency signal output by the filterbank 1326 and reconstructs the frequency range defined by the high pass filter 1304 of FIG. 13*a* using the parametric representation of the high frequency band. The high frequency reconstructor 1330 has several functionalities such as the regeneration of the upper frequency range using the source range in the low frequency range, a spectral envelope adjustment, a noise addition functionality and a functionality to introduce missing harmonics in the upper frequency range and, if applied and calculated in the encoder of FIG. 13*a*, an inverse filtering operation in order to account for the fact that the higher frequency range is typically not as tonal as the lower frequency range. In HE-AAC, missing harmonics are re-synthesized on the decoder-side and are placed exactly in the middle of a reconstruction band. Hence, all missing harmonic lines that have been determined in a certain reconstruction band are not placed at the frequency values where they were located in the original signal. Instead, those missing harmonic lines are placed at frequencies in the center of the certain band. Thus, when a missing harmonic line in the original signal was placed very close to the reconstruction band border in the original signal, the error in frequency introduced by placing this missing harmonics line in the reconstructed signal at the center of the band is close to 50% of the individual reconstruction band, for which parameters have been generated and transmitted.

Furthermore, even though the typical audio core coders operate in the spectral domain, the core decoder nevertheless generates a time domain signal which is then, again, converted into a spectral domain by the filter bank 1326 functionality. This introduces additional processing delays, may introduce artifacts due to tandem processing of firstly transforming from the spectral domain into the frequency domain and again transforming into typically a different frequency domain and, of course, this also necessitates a substantial amount of computation complexity and thereby electric power, which is specifically an issue when the bandwidth extension technology is applied in mobile devices such as mobile phones, tablet or laptop computers, etc.

Current audio codecs perform low bitrate audio coding using BWE as an integral part of the coding scheme. However, BWE techniques are restricted to replace high frequency (HF) content only. Furthermore, they do not allow perceptually important content above a given cross-over frequency to be waveform coded. Therefore, contemporary audio codecs either lose HF detail or timbre when the BWE is implemented, since the exact alignment of the tonal harmonics of the signal is not taken into consideration in most of the systems.

Another shortcoming of the current state of the art BWE systems is the need for transformation of the audio signal into a new domain for implementation of the BWE (e.g. transform from MDCT to QMF domain). This leads to complications of synchronization, additional computational complexity and increased memory requirements.

Particularly, if a bandwidth extension system is implemented in a filterbank or time-frequency transform domain, there is only a limited possibility to control the temporal shape of the bandwidth extension signal. Typically, the temporal granularity is limited by the hop-size used between adjacent transform windows. This can lead to unwanted pre- or post-echoes in the bandwidth extension spectral range. In order to increase the temporal granularity, shorter hop-sizes or shorter bandwidth extension frames can be used, but this results in a bitrate overhead due to the fact that, for a certain time period, a higher number of parameters, typically a certain set of parameters for each time frame has to be transmitted. Otherwise, if the individual time frames are made too large, then pre- and post-echoes particularly for transient portions of an audio signal are generated.

SUMMARY

According to an embodiment, an apparatus for decoding an encoded audio signal may have: a spectral domain audio decoder configured for generating a first decoded representation of a first set of first spectral portions being spectral prediction residual values; a frequency regenerator configured for generating a reconstructed second spectral portion using a first spectral portion of the first set of first spectral portions, wherein the reconstructed second spectral portion and the first set of first spectral portions include spectral prediction residual values, and wherein the reconstructed second spectral portion is different, with respect to frequency, from the first spectral portion of the first set of first spectral portions; and an inverse prediction filter configured for performing an inverse prediction over frequency using the spectral prediction residual values for the first set of first spectral portions and the reconstructed second spectral portion using prediction filter information include d in the encoded audio signal.

According to another embodiment, an apparatus for encoding an audio signal may have: a time-frequency converter configured for converting an audio signal into a spectral representation; a prediction filter configured for performing a prediction over frequency on the spectral representation to generate spectral residual values, the prediction filter being defined by filter information derived from the audio signal; an audio coder configured for encoding a first set of first spectral portions of the spectral residual values to acquire an encoded first set of first spectral values including a first spectral resolution; a parametric coder configured for parametrically coding a second set of second spectral portions of the spectral residual values or of values of the spectral representation with a second spectral resolution being lower than the first spectral resolution to obtain a parametrically encoded second set, wherein the second spectral portions of the second set of second spectral portions are different, with respect to frequency, from the first spectral portions of the first set of first spectral portions; and an output interface configured for outputting an encoded signal including the parametrically encoded second set, the encoded first set, and the filter information.

According to another embodiment, a method of decoding an encoded audio signal may have the steps of: generating a first decoded representation of a first set of first spectral portions being spectral prediction residual values; regenerating a reconstructed second spectral portion using a first spectral portion of the first set of first spectral portions, wherein the reconstructed second spectral portion and the first set of first spectral portions include spectral prediction residual values, and wherein the reconstructed second spectral portion is different, with respect to frequency, from the first spectral portion of the first set of first spectral portions; and performing an inverse prediction over frequency using the spectral prediction residual values for the first set of first spectral portions and the reconstructed second spectral portion using prediction filter information include d in the encoded audio signal.

According to another embodiment, a method of encoding an audio signal may have the steps of: converting an audio signal into a spectral representation; performing a prediction over frequency on the spectral representation to generate spectral residual values, the prediction filter being defined by filter information derived from the audio signal; encoding a first set of first spectral portions of the spectral residual values to acquire an encoded first set of first spectral values including a first spectral resolution; parametrically coding a second set of second spectral portions of the spectral residual values or of values of the spectral representation with a second spectral resolution being lower than the first spectral resolution to obtain a parametrically encoded second set, wherein the second spectral portions of the second set of second spectral portions are different, with respect to frequency, from the first spectral portions of the first set of first spectral portions; and outputting an encoded signal including the parametrically encoded second set, the encoded first set, and the filter information.

Another embodiment may have a non-transitory digital storage medium having a computer program stored thereon to perform the method of decoding an encoded audio signal, the method having the steps of: generating a first decoded representation of a first set of first spectral portions being spectral prediction residual values; regenerating a reconstructed second spectral portion using a first spectral portion of the first set of first spectral portions, wherein the reconstructed second spectral portion and the first set of first spectral portions include spectral prediction residual values, and wherein the reconstructed second spectral portion is different, with respect to frequency, from the first spectral portion of the first set of first spectral portions; and performing an inverse prediction over frequency using the spectral prediction residual values for the first set of first spectral portions and the reconstructed second spectral portion using prediction filter information included in the encoded audio signal, when said computer program is run by a computer.

Another embodiment may have a non-transitory digital storage medium having a computer program stored thereon to perform the method of encoding an audio signal, the method having the steps of: converting an audio signal into a spectral representation; performing a prediction over frequency on the spectral representation to generate spectral residual values, the prediction filter being defined by filter information derived from the audio signal; encoding a first set of first spectral portions of the spectral residual values to acquire an encoded first set of first spectral values including a first spectral resolution; parametrically coding a second set of second spectral portions of the spectral residual values or of values of the spectral representation with a second spectral resolution being lower than the first spectral resolution to acquire a parametrically encoded second set, wherein the second spectral portions of the second set of second spectral portions are different, with respect to frequency, from the first spectral portions of the first set of first spectral portions; and outputting an encoded signal including the parametrically encoded second set, the encoded first set, and the filter information, when said computer program is run by a computer.

The present invention is based on the finding that an improved quality and reduced bitrate specifically for signals comprising transient portions as they occur very often in audio signals is obtained by combining the Temporal Noise Shaping (TNS) or Temporal Tile Shaping (TTS) technology with high frequency reconstruction. The TNS/TTS processing on the encoder-side being implemented by a prediction over frequency reconstructs the time envelope of the audio signal. Depending on the implementation, i.e., when the temporal noise shaping filter is determined within a frequency range not only covering the source frequency range but also the target frequency range to be reconstructed in a frequency regeneration decoder, the temporal envelope is not only applied to the core audio signal up to a gap filling start frequency, but the temporal envelope is also applied to the spectral ranges of reconstructed second spectral portions. Thus, pre-echoes or post-echoes that would occur without temporal tile shaping are reduced or eliminated. This is accomplished by applying an inverse prediction over frequency not only within the core frequency range up to a certain gap filling start frequency but also within a frequency range above the core frequency range. To this end, the frequency regeneration or frequency tile generation is performed on the decoder-side before applying a prediction over frequency. However, the prediction over frequency can either be applied before or subsequent to spectral envelope shaping depending on whether the energy information calculation has been performed on the spectral residual values subsequent to filtering or to the (full) spectral values before envelope shaping.

The TTS processing over one or more frequency tiles additionally establishes a continuity of correlation between the source range and the reconstruction range or in two adjacent reconstruction ranges or frequency tiles.

In an implementation, it is advantageous to use complex TNS/TTS filtering. Thereby, the (temporal) aliasing artifacts of a critically sampled real representation, like MDCT, are avoided. A complex TNS filter can be calculated on the encoder-side by applying not only a modified discrete cosine transform but also a modified discrete sine transform in addition to obtain a complex modified transform. Nevertheless, only the modified discrete cosine transform values, i.e., the real part of the complex transform is transmitted. On the decoder-side, however, it is possible to estimate the imaginary part of the transform using MDCT spectra of preceding or subsequent frames so that, on the decoder-side, the complex filter can be again applied in the inverse prediction over frequency and, specifically, the prediction over the border between the source range and the reconstruction range and also over the border between frequency-adjacent frequency tiles within the reconstruction range.

A further aspect is based on the finding that the problems related to the separation of the bandwidth extension on the one hand and the core coding on the other hand can be addressed and overcome by performing the bandwidth extension in the same spectral domain in which the core decoder operates. Therefore, a full rate core decoder is provided which encodes and decodes the full audio signal range. This does not necessitate the need for a downsampler on the encoder side and an upsampler on the decoder side. Instead, the whole processing is performed in the full sampling rate or full bandwidth domain. In order to obtain a high coding gain, the audio signal is analyzed in order to find a first set of first spectral portions which has to be encoded with a high resolution, where this first set of first spectral portions may include, in an embodiment, tonal portions of the audio signal. On the other hand, non-tonal or noisy components in the audio signal constituting a second set of second spectral portions are parametrically encoded with low spectral resolution. The encoded audio signal then only necessitates the first set of first spectral portions encoded in a waveform-preserving manner with a high spectral resolution and, additionally, the second set of second spectral portions encoded parametrically with a low resolution using frequency "tiles" sourced from the first set. On the decoder side, the core decoder, which is a full band decoder, reconstructs the first set of first spectral portions in a waveform-preserving manner, i.e., without any knowledge that there is any additional frequency regeneration. However, the so generated spectrum has a lot of spectral gaps. These gaps are subsequently filled with the inventive Intelligent Gap Filling (IGF) technology by using a frequency regeneration applying parametric data on the one hand and using a source spectral range, i.e., first spectral portions reconstructed by the full rate audio decoder on the other hand.

In further embodiments, spectral portions, which are reconstructed by noise filling only rather than bandwidth replication or frequency tile filling, constitute a third set of third spectral portions. Due to the fact that the coding concept operates in a single domain for the core coding/decoding on the one hand and the frequency regeneration on the other hand, the IGF is not only restricted to fill up a higher frequency range but can fill up lower frequency ranges, either by noise filling without frequency regeneration or by frequency regeneration using a frequency tile at a different frequency range.

Furthermore, it is emphasized that an information on spectral energies, an information on individual energies or an individual energy information, an information on a survive energy or a survive energy information, an information a tile energy or a tile energy information, or an information on a missing energy or a missing energy information may comprise not only an energy value, but also an (e.g. absolute) amplitude value, a level value or any other value, from which a final energy value can be derived. Hence, the information on an energy may e.g. comprise the energy value itself, and/or a value of a level and/or of an amplitude and/or of an absolute amplitude.

A further aspect is based on the finding that the correlation situation is not only important for the source range but is also important for the target range. Furthermore, the present invention acknowledges the situation that different correlation situations can occur in the source range and the target range. When, for example, a speech signal with high frequency noise is considered, the situation can be that the low frequency band comprising the speech signal with a small number of overtones is highly correlated in the left channel and the right channel, when the speaker is placed in the middle. The high frequency portion, however, can be strongly uncorrelated due to the fact that there might be a different high frequency noise on the left side compared to another high frequency noise or no high frequency noise on the right side. Thus, when a straightforward gap filling operation would be performed that ignores this situation, then the high frequency portion would be correlated as well, and this might generate serious spatial segregation artifacts in the reconstructed signal. In order to address this issue, parametric data for a reconstruction band or, generally, for the second set of second spectral portions which have to be reconstructed using a first set of first spectral portions is calculated to identify either a first or a second different two-channel representation for the second spectral portion or, stated differently, for the reconstruction band. On the encoder side, a two-channel identification is, therefore calculated for the second spectral portions, i.e., for the portions, for which, additionally, energy information for reconstruction bands is calculated. A frequency regenerator on the decoder side then regenerates a second spectral portion depending on a first portion of the first set of first spectral portions, i.e., the source range and parametric data for the second portion such as spectral envelope energy information or any other spectral envelope data and, additionally, dependent on the two-channel identification for the second portion, i.e., for this reconstruction band under reconsideration.

The two-channel identification is advantageously transmitted as a flag for each reconstruction band and this data is transmitted from an encoder to a decoder and the decoder then decodes the core signal as indicated by calculated flags for the core bands. Then, in an implementation, the core signal is stored in both stereo representations (e.g. left/right and mid/side) and, for the IGF frequency tile filling, the source tile representation is chosen to fit the target tile representation as indicated by the two-channel identification flags for the intelligent gap filling or reconstruction bands, i.e., for the target range.

It is emphasized that this procedure not only works for stereo signals, i.e., for a left channel and the right channel but also operates for multi-channel signals. In the case of multi-channel signals, several pairs of different channels can be processed in that way such as a left and a right channel as a first pair, a left surround channel and a right surround as the second pair and a center channel and an LFE channel as the third pair. Other pairings can be determined for higher output channel formats such as 7.1, 11.1 and so on.

A further aspect is based on the finding that certain impairments in audio quality can be remedied by applying a signal adaptive frequency tile filling scheme. To this end, an analysis on the encoder-side is performed in order to find out the best matching source region candidate for a certain target region. A matching information identifying for a target region a certain source region together with optionally some additional information is generated and transmitted as side information to the decoder. The decoder then applies a frequency tile filling operation using the matching information. To this end, the decoder reads the matching information from the transmitted data stream or data file and accesses the source region identified for a certain reconstruction band and, if indicated in the matching information, additionally performs some processing of this source region data to generate raw spectral data for the reconstruction band. Then, this result of the frequency tile filling operation, i.e., the raw spectral data for the reconstruction band, is shaped using spectral envelope information in order to finally obtain a reconstruction band that comprises the first spectral portions such as tonal portions as well. These tonal portions, however, are not generated by the adaptive tile filling scheme, but these first spectral portions are output by the audio decoder or core decoder directly.

The adaptive spectral tile selection scheme may operate with a low granularity. In this implementation, a source region is subdivided into typically overlapping source regions and the target region or the reconstruction bands are given by non-overlapping frequency target regions. Then, similarities between each source region and each target region are determined on the encoder-side and the best matching pair of a source region and the target region are identified by the matching information and, on the decoder-side, the source region identified in the matching information is used for generating the raw spectral data for the reconstruction band.

For the purpose of obtaining a higher granularity, each source region is allowed to shift in order to obtain a certain lag where the similarities are maximum. This lag can be as fine as a frequency bin and allows an even better matching between a source region and the target region.

Furthermore, in addition of only identifying a best matching pair, this correlation lag can also be transmitted within the matching information and, additionally, even a sign can be transmitted. When the sign is determined to be negative on the encoder-side, then a corresponding sign flag is also transmitted within the matching information and, on the decoder-side, the source region spectral values are multiplied by "−1" or, in a complex representation, are "rotated" by 180 degrees.

A further implementation of this invention applies a tile whitening operation. Whitening of a spectrum removes the coarse spectral envelope information and emphasizes the spectral fine structure which is of foremost interest for evaluating tile similarity. Therefore, a frequency tile on the one hand and/or the source signal on the other hand are whitened before calculating a cross correlation measure. When only the tile is whitened using a predefined procedure, a whitening flag is transmitted indicating to the decoder that the same predefined whitening process shall be applied to the frequency tile within IGF.

Regarding the tile selection, it is advantageous to use the lag of the correlation to spectrally shift the regenerated spectrum by an integer number of transform bins. Depending on the underlying transform, the spectral shifting may necessitate addition corrections. In case of odd lags, the tile is additionally modulated through multiplication by an alternating temporal sequence of −1/1 to compensate for the frequency-reversed representation of every other band within the MDCT. Furthermore, the sign of the correlation result is applied when generating the frequency tile.

Furthermore, it is advantageous to use tile pruning and stabilization in order to make sure that artifacts created by fast changing source regions for the same reconstruction region or target region are avoided. To this end, a similarity analysis among the different identified source regions is performed and when a source tile is similar to other source tiles with a similarity above a threshold, then this source tile can be dropped from the set of potential source tiles since it is highly correlated with other source tiles. Furthermore, as a kind of tile selection stabilization, it is advantageous to keep the tile order from the previous frame if none of the source tiles in the current frame correlate (better than a given threshold) with the target tiles in the current frame.

The audio coding system efficiently codes arbitrary audio signals at a wide range of bitrates. Whereas, for high bitrates, the inventive system converges to transparency, for low bitrates perceptual annoyance is minimized. Therefore, the main share of available bitrate is used to waveform code just the perceptually most relevant structure of the signal in the encoder, and the resulting spectral gaps are filled in the decoder with signal content that roughly approximates the original spectrum. A very limited bit budget is consumed to control the parameter driven so-called spectral Intelligent Gap Filling (IGF) by dedicated side information transmitted from the encoder to the decoder.

BRIEF DESCRIPTION OF THE DRAWINGS

Embodiments of the present invention will be detailed subsequently referring to the appended drawings, in which:

FIG. 9*c* illustrates a schematic illustrating the functionality of FIG. 9*b;*

DETAILED DESCRIPTION OF THE INVENTION

Figure 1A:
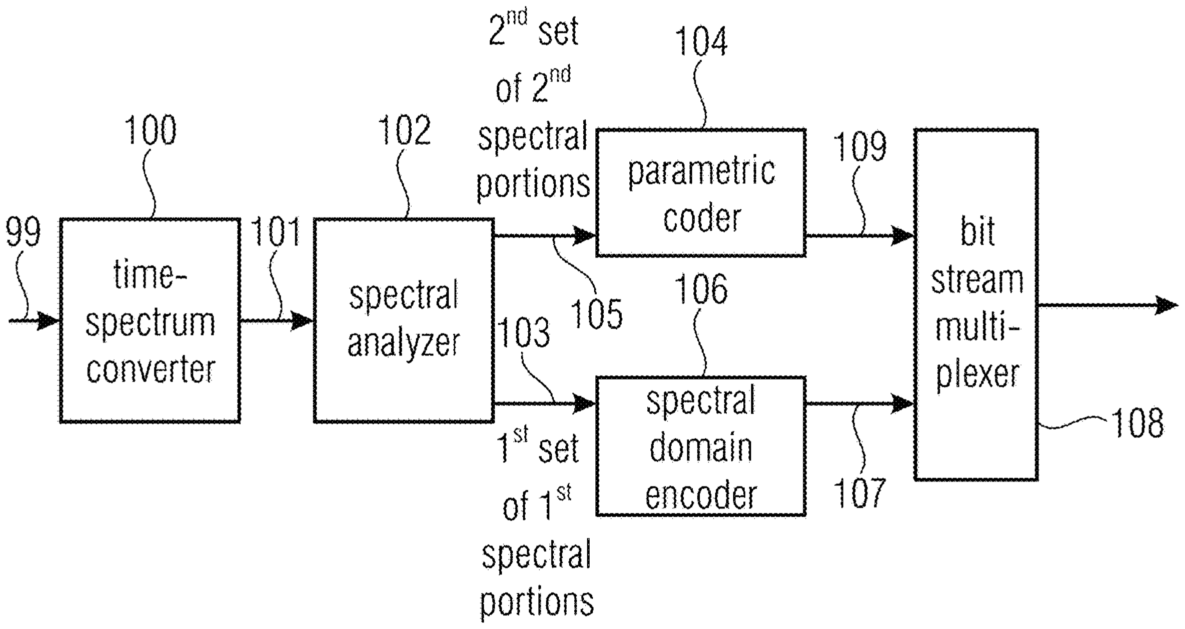
FIG. 1*a* illustrates an apparatus for encoding an audio signal.

FIG. 1*a* illustrates an apparatus for encoding an audio signal 99. The audio signal 99 is input into a time spectrum converter 100 for converting an audio signal having a sampling rate into a spectral representation 101 output by the time spectrum converter. The spectrum 101 is input into a spectral analyzer 102 for analyzing the spectral representation 101. The spectral analyzer 101 is configured for determining a first set of first spectral portions 103 to be encoded with a first spectral resolution and a different second set of second spectral portions 105 to be encoded with a second spectral resolution. The second spectral resolution is smaller than the first spectral resolution. The second set of second spectral portions 105 is input into a parameter calculator or parametric coder 104 for calculating spectral envelope information having the second spectral resolution. Furthermore, a spectral domain audio coder 106 is provided for generating a first encoded representation 107 of the first set of first spectral portions having the first spectral resolution. Furthermore, the parameter calculator/parametric coder 104 is configured for generating a second encoded representation 109 of the second set of second spectral portions. The first encoded representation 107 and the second encoded representation 109 are input into a bit stream multiplexer or bit stream former 108 and block 108 finally outputs the encoded audio signal for transmission or storage on a storage device.

Figure 1B:
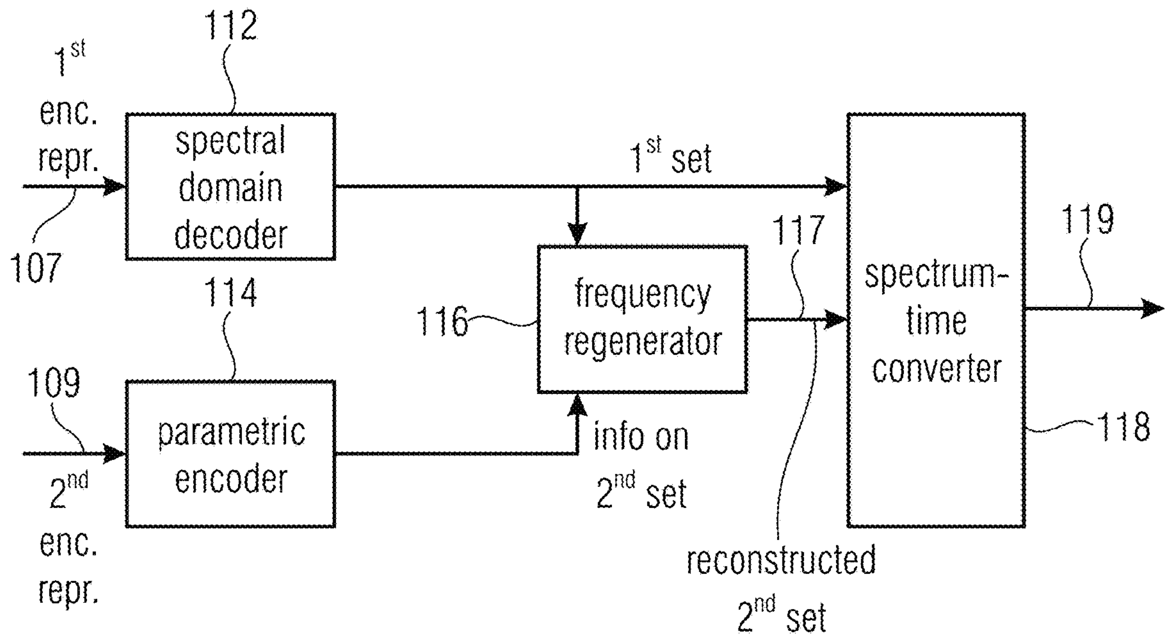
FIG. 1*b* illustrates a decoder for decoding an encoded audio signal matching with the encoder of FIG. 1*a;*
Figure 3A:
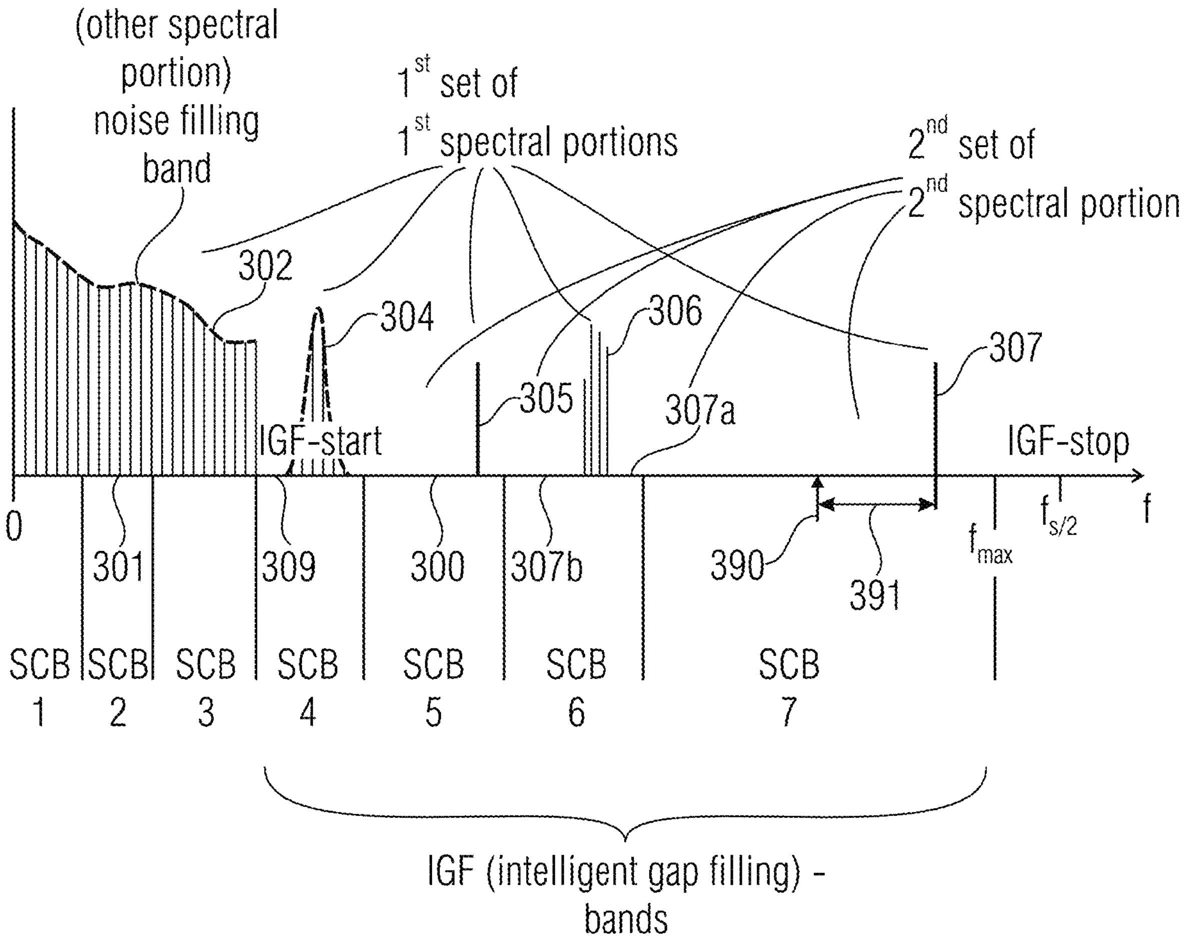
FIG. 3*a* illustrates a schematic representation of a spectrum as generated by the spectral domain decoder of FIG. 1*b;*

Typically, a first spectral portion such as 306 of FIG. 3*a* will be surrounded by two second spectral portions such as 307*a*, 307*b*. This is not the case in HE AAC, where the core coder frequency range is band limited FIG. 1*b* illustrates a decoder matching with the encoder of FIG. 1*a*. The first encoded representation 107 is input into a spectral domain audio decoder 112 for generating a first decoded representation of a first set of first spectral portions, the decoded representation having a first spectral resolution. Furthermore, the second encoded representation 109 is input into a parametric decoder 114 for generating a second decoded representation of a second set of second spectral portions having a second spectral resolution being lower than the first spectral resolution.

The decoder further comprises a frequency regenerator 116 for regenerating a reconstructed second spectral portion having the first spectral resolution using a first spectral portion. The frequency regenerator 116 performs a tile filling operation, i.e., uses a tile or portion of the first set of first spectral portions and copies this first set of first spectral portions into the reconstruction range or reconstruction band having the second spectral portion and typically performs spectral envelope shaping or another operation as indicated by the decoded second representation output by the parametric decoder 114, i.e., by using the information on the second set of second spectral portions. The decoded first set of first spectral portions and the reconstructed second set of spectral portions as indicated at the output of the frequency regenerator 116 on line 117 is input into a spectrum-time converter 118 configured for converting the first decoded representation and the reconstructed second spectral portion into a time representation 119, the time representation having a certain high sampling rate.

Figure 2A:
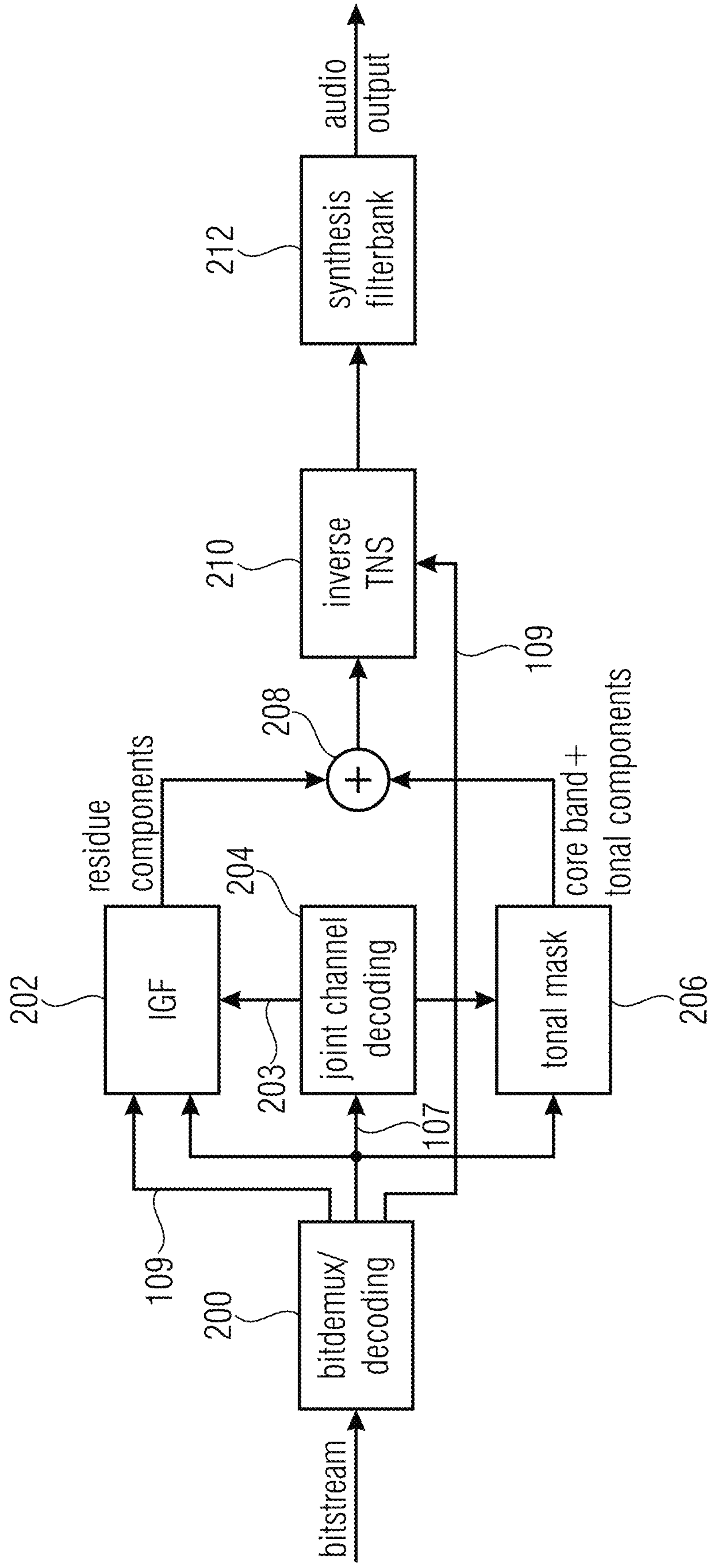
FIG. 2*a* illustrates an implementation of the decoder.
Figure 2B:
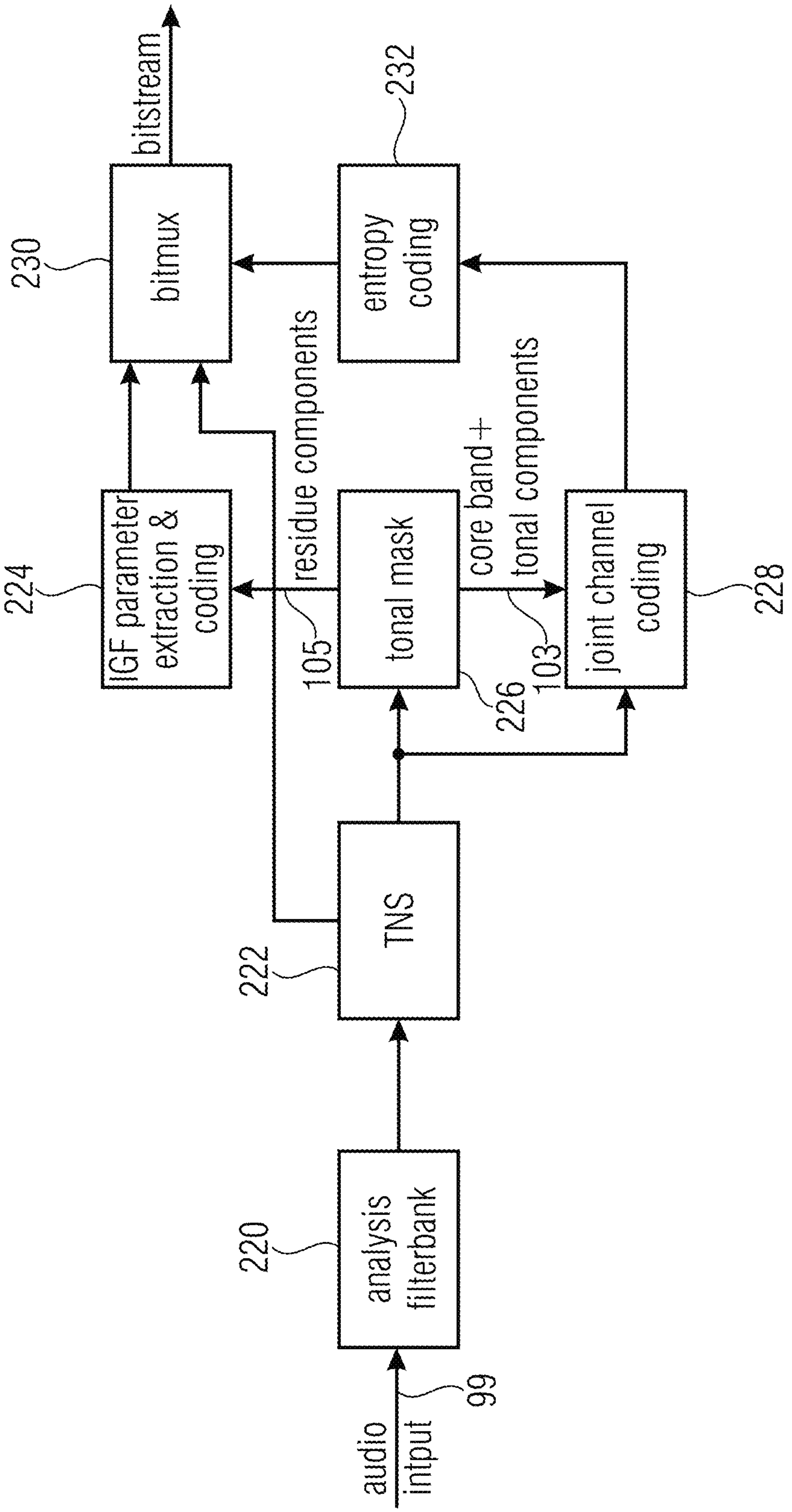
FIG. 2*b* illustrates an implementation of the encoder.

FIG. 2*b* illustrates an implementation of the FIG. 1*a* encoder. An audio input signal 99 is input into an analysis filterbank 220 corresponding to the time spectrum converter 100 of FIG. 1*a*. Then, a temporal noise shaping operation is performed in TNS block 222. Therefore, the input into the spectral analyzer 102 of FIG. 1*a* corresponding to a block tonal mask 226 of FIG. 2*b* can either be full spectral values, when the temporal noise shaping/temporal tile shaping operation is not applied or can be spectral residual values, when the TNS operation as illustrated in FIG. 2*b*, block 222 is applied. For two-channel signals or multi-channel signals, a joint channel coding 228 can additionally be performed, so that the spectral domain encoder 106 of FIG. 1*a* may comprise the joint channel coding block 228. Furthermore, an entropy coder 232 for performing a lossless data compression is provided which is also a portion of the spectral domain encoder 106 of FIG. 1*a*.

The spectral analyzer/tonal mask 226 separates the output of TNS block 222 into the core band and the tonal components corresponding to the first set of first spectral portions 103 and the residual components corresponding to the second set of second spectral portions 105 of FIG. 1*a*. The block 224 indicated as IGF parameter extraction encoding corresponds to the parametric coder 104 of FIG. 1*a* and the bitstream multiplexer 230 corresponds to the bitstream multiplexer 108 of FIG. 1*a*.

Advantageously, the analysis filterbank 222 is implemented as an MDCT (modified discrete cosine transform filterbank) and the MDCT is used to transform the signal 99 into a time-frequency domain with the modified discrete cosine transform acting as the frequency analysis tool.

The spectral analyzer 226 advantageously applies a tonality mask. This tonality mask estimation stage is used to separate tonal components from the noise-like components in the signal. This allows the core coder 228 to code all tonal components with a psycho-acoustic module. The tonality mask estimation stage can be implemented in numerous different ways and is advantageously implemented similar in its functionality to the sinusoidal track estimation stage used in sine and noise-modeling for speech/audio coding [8, 9] or an HILN model based audio coder described in [10]. Advantageously, an implementation is used which is easy to implement without the need to maintain birth-death trajectories, but any other tonality or noise detector can be used as well.

The IGF module calculates the similarity that exists between a source region and a target region. The target region will be represented by the spectrum from the source region. The measure of similarity between the source and target regions is done using a cross-correlation approach. The target region is split into nTar non-overlapping frequency tiles. For every tile in the target region, nSrc source tiles are created from a fixed start frequency. These source tiles overlap by a factor between 0 and 1, where 0 means 0% overlap and 1 means 100% overlap. Each of these source tiles is correlated with the target tile at various lags to find the source tile that best matches the target tile. The best matching tile number is stored in tileNum[idx_tar], the lag at which it best correlates with the target is stored in xcorr_lag[idx_tar][idx_src] and the sign of the correlation is stored in xcorr_sign[idx_tar][idx_src]. In case the correlation is highly negative, the source tile needs to be multiplied by −1 before the tile filling process at the decoder. The IGF module also takes care of not overwriting the tonal components in the spectrum since the tonal components are preserved using the tonality mask. A band-wise energy parameter is used to store the energy of the target region enabling us to reconstruct the spectrum accurately.

This method has certain advantages over the classical SBR [1] in that the harmonic grid of a multi-tone signal is preserved by the core coder while only the gaps between the sinusoids is filled with the best matching "shaped noise" from the source region. Another advantage of this system compared to ASR (Accurate Spectral Replacement) [2-4] is the absence of a signal synthesis stage which creates the important portions of the signal at the decoder. Instead, this task is taken over by the core coder, enabling the preservation of important components of the spectrum. Another advantage of the proposed system is the continuous scalability that the features offer. Just using tileNum[idx_tar] and xcorr_lag=0, for every tile is called gross granularity matching and can be used for low bitrates while using variable xcorr_lag for every tile enables us to match the target and source spectra better.

In addition, a tile choice stabilization technique is proposed which removes frequency domain artifacts such as trilling and musical noise.

In case of stereo channel pairs an additional joint stereo processing is applied. This is necessitated, because for a certain destination range the signal can a highly correlated panned sound source. In case the source regions chosen for this particular region are not well correlated, although the energies are matched for the destination regions, the spatial image can suffer due to the uncorrelated source regions. The encoder analyses each destination region energy band, typically performing a cross-correlation of the spectral values and if a certain threshold is exceeded, sets a joint flag for this energy band. In the decoder the left and right channel energy bands are treated individually if this joint stereo flag is not set. In case the joint stereo flag is set, both the energies and the patching are performed in the joint stereo domain. The joint stereo information for the IGF regions is signaled similar the joint stereo information for the core coding, including a flag indicating in case of prediction if the direction of the prediction is from downmix to residual or vice versa.

The energies can be calculated from the transmitted energies in the L/R-domain.

$$\text{mid}Nrg[k]=\text{left}Nrg[k]+\text{right}Nrg[k];$$

$$\text{side}Nrg[k]=\text{left}Nrg[k]-\text{right}Nrg[k];$$

with k being the frequency index in the transform domain.

Another solution is to calculate and transmit the energies directly in the joint stereo domain for bands where joint stereo is active, so no additional energy transformation is needed at the decoder side.

The source tiles are created according to the Mid/Side-Matrix:

$$\text{midTile}[k]=0.5\cdot(\text{leftTile}[k]+\text{rightTile}[k])$$

$$\text{sideTile}[k]=0.5\cdot(\text{leftTile}[k]-\text{rightTile}[k])$$

Energy adjustment:

$$\text{midTile}[k]=\text{midTile}[k]*\text{mid}Nrg[k];$$

$$\text{sideTile}[k]=\text{sideTile}[k]*\text{side}Nrg[k];$$

Joint stereo→LR transformation:

If no additional prediction parameter is coded:

$$\text{leftTile}[k]=\text{midTile}[k]+\text{sideTile}[k]$$

$$\text{rightTile}[k]=\text{midTile}[k]-\text{sideTile}[k]$$

If an additional prediction parameter is coded and if the signalled direction is from mid to side:

$$\text{sideTile}[k]=\text{sideTile}[k]-\text{predictionCoeff}\cdot\text{midTile}[k]$$

$$\text{leftTile}[k]=\text{midTile}[k]+\text{sideTile}[k]$$

$$\text{rightTile}[k]=\text{midTile}[k]-\text{sideTile}[k]$$

If the signalled direction is from side to mid:

$$\text{midTile1}[k]=\text{midTile}[k]-\text{predictionCoeff}\cdot\text{sideTile}[k]$$

$$\text{leftTile}[k]=\text{midTile1}[k]-\text{sideTile}[k]$$

$$\text{rightTile}[k]=\text{midTile1}[k]+\text{sideTile}[k]$$

This processing ensures that from the tiles used for regenerating highly correlated destination regions and panned destination regions, the resulting left and right channels still represent a correlated and panned sound source even if the source regions are not correlated, preserving the stereo image for such regions.

In other words, in the bitstream, joint stereo flags are transmitted that indicate whether L/R or M/S as an example for the general joint stereo coding shall be used. In the decoder, first, the core signal is decoded as indicated by the joint stereo flags for the core bands. Second, the core signal is stored in both L/R and M/S representation. For the IGF tile filling, the source tile representation is chosen to fit the target tile representation as indicated by the joint stereo information for the IGF bands.

Temporal Noise Shaping (TNS) is a standard technique and part of AAC [11-13]. TNS can be considered as an extension of the basic scheme of a perceptual coder, inserting an optional processing step between the filterbank and the quantization stage. The main task of the TNS module is to hide the produced quantization noise in the temporal masking region of transient like signals and thus it leads to a more efficient coding scheme. First, TNS calculates a set of prediction coefficients using "forward prediction" in the transform domain, e.g. MDCT. These coefficients are then used for flattening the temporal envelope of the signal. As the quantization affects the TNS filtered spectrum, also the quantization noise is temporarily flat. By applying the invers TNS filtering on decoder side, the quantization noise is shaped according to the temporal envelope of the TNS filter and therefore the quantization noise gets masked by the transient.

Figure 7A:
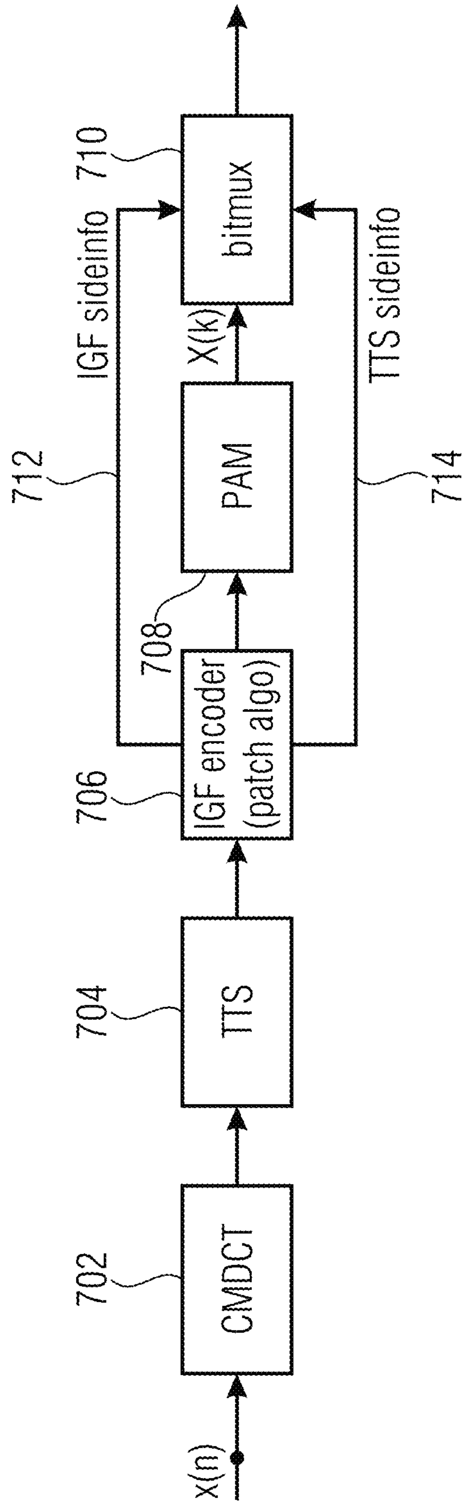
FIG. 7*a* illustrates an implementation of the temporal tile shaping (TTS) functionality.

IGF is based on an MDCT representation. For efficient coding, advantageously long blocks of approx. 20 ms have to be used. If the signal within such a long block contains transients, audible pre- and post-echoes occur in the IGF spectral bands due to the tile filling. FIG. 7*c* shows a typical pre-echo effect before the transient onset due to IGF. On the left side, the spectrogram of the original signal is shown and on the right side the spectrogram of the bandwidth extended signal without TNS filtering is shown.

This pre-echo effect is reduced by using TNS in the IGF context. Here, TNS is used as a temporal tile shaping (TTS) tool as the spectral regeneration in the decoder is performed on the TNS residual signal. The necessitated TTS prediction coefficients are calculated and applied using the full spectrum on encoder side as usual. The TNS/TTS start and stop frequencies are not affected by the IGF start $f_{IGFstart}$ of the IGF tool. In comparison to the legacy TNS, the TTS stop frequency is increased to the stop frequency of the IGF tool, which is higher than $f_{IGFstart}$. On decoder side the TNS/TTS coefficients are applied on the full spectrum again, i.e. the core spectrum plus the regenerated spectrum plus the tonal components from the tonality map (see FIG. 7*e*). The application of TTS is necessitated to form the temporal envelope of the regenerated spectrum to match the envelope of the original signal again. So the shown pre-echoes are reduced. In addition, it still shapes the quantization noise in the signal below $f_{IGFstart}$ as usual with TNS.

In legacy decoders, spectral patching on an audio signal corrupts spectral correlation at the patch borders and thereby impairs the temporal envelope of the audio signal by introducing dispersion. Hence, another benefit of performing the IGF tile filling on the residual signal is that, after application of the shaping filter, tile borders are seamlessly correlated, resulting in a more faithful temporal reproduction of the signal.

In an inventive encoder, the spectrum having undergone TNS/TTS filtering, tonality mask processing and IGF parameter estimation is devoid of any signal above the IGF start frequency except for tonal components. This sparse spectrum is now coded by the core coder using principles of arithmetic coding and predictive coding. These coded components along with the signaling bits form the bitstream of the audio.

FIG. 2*a* illustrates the corresponding decoder implementation. The bitstream in FIG. 2*a* corresponding to the encoded audio signal is input into the demultiplexer/decoder which would be connected, with respect to FIG. 1*b*, to the blocks 112 and 114. The bitstream demultiplexer separates the input audio signal into the first encoded representation 107 of FIG. 1*b* and the second encoded representation 109 of FIG. 1*b*. The first encoded representation having the first set of first spectral portions is input into the joint channel decoding block 204 corresponding to the spectral domain decoder 112 of FIG. 1*b*. The second encoded representation is input into the parametric decoder 114 not illustrated in FIG. 2*a* and then input into the IGF block 202 corresponding to the frequency regenerator 116 of FIG. 1*b*. The first set of first spectral portions necessitated for frequency regeneration are input into IGF block 202 via line 203. Furthermore, subsequent to joint channel decoding 204 the specific core decoding is applied in the tonal mask block 206 so that the output of tonal mask 206 corresponds to the output of the spectral domain decoder 112. Then, a combination by combiner 208 is performed, i.e., a frame building where the output of combiner 208 now has the full range spectrum, but still in the TNS/TTS filtered domain. Then, in block 210, an inverse TNS/TTS operation is performed using TNS/TTS filter information provided via line 109, i.e., the TTS side information is included in the first encoded representation generated by the spectral domain encoder 106 which can, for example, be a straightforward AAC or USAC core encoder, or can also be included in the second encoded representation. At the output of block 210, a complete spectrum until the maximum frequency is provided which is the full range frequency defined by the sampling rate of the original input signal. Then, a spectrum/time conversion is performed in the synthesis filterbank 212 to finally obtain the audio output signal.

FIG. 3*a* illustrates a schematic representation of the spectrum. The spectrum is subdivided in scale factor bands SCB where there are seven scale factor bands SCB1 to SCB7 in the illustrated example of FIG. 3*a*. The scale factor bands can be AAC scale factor bands which are defined in the AAC standard and have an increasing bandwidth to upper frequencies as illustrated in FIG. 3*a* schematically. It is advantageous to perform intelligent gap filling not from the very beginning of the spectrum, i.e., at low frequencies, but to start the IGF operation at an IGF start frequency illustrated at 309. Therefore, the core frequency band extends from the lowest frequency to the IGF start frequency. Above the IGF start frequency, the spectrum analysis is applied to separate high resolution spectral components 304, 305, 306, 307 (the first set of first spectral portions) from low resolution components represented by the second set of second spectral portions. FIG. 3*a* illustrates a spectrum which is exemplarily input into the spectral domain encoder 106 or the joint channel coder 228, i.e., the core encoder operates in the full range, but encodes a significant amount of zero spectral values, i.e., these zero spectral values are quantized to zero or are set to zero before quantizing or subsequent to quantizing. Anyway, the core encoder operates in full range, i.e., as if the spectrum would be as illustrated, i.e., the core decoder does not necessarily have to be aware of any intelligent gap filling or encoding of the second set of second spectral portions with a lower spectral resolution.

Advantageously, the high resolution is defined by a line-wise coding of spectral lines such as MDCT lines, while the second resolution or low resolution is defined by, for example, calculating only a single spectral value per scale factor band, where a scale factor band covers several frequency lines. Thus, the second low resolution is, with respect to its spectral resolution, much lower than the first or high resolution defined by the line-wise coding typically applied by the core encoder such as an AAC or USAC core encoder.

Figure 3B:
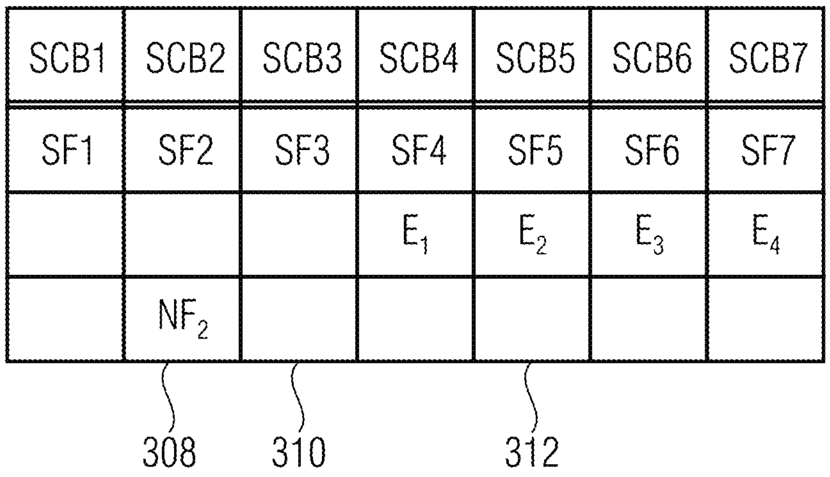
FIG. 3*b* illustrates a table indicating the relation between scale factors for scale factor bands and energies for reconstruction bands and noise filling information for a noise filling band.

Regarding scale factor or energy calculation, the situation is illustrated in FIG. 3*b*. Due to the fact that the encoder is a core encoder and due to the fact that there can, but does not necessarily have to be, components of the first set of spectral portions in each band, the core encoder calculates a scale factor for each band not only in the core range below the IGF start frequency 309, but also above the IGF start frequency until the maximum frequency $f_{IGFstop}$ which is smaller or equal to the half of the sampling frequency, i.e., $f_{s/2}$. Thus, the encoded tonal portions 302, 304, 305, 306, 307 of FIG. 3*a* and, in this embodiment together with the scale factors SCB1 to SCB7 correspond to the high resolution spectral data. The low resolution spectral data are calculated starting from the IGF start frequency and correspond to the energy information values $E_1$, $E_2$, $E_3$, $E_4$, which are transmitted together with the scale factors SF4 to SF7.

Particularly, when the core encoder is under a low bitrate condition, an additional noise-filling operation in the core band, i.e., lower in frequency than the IGF start frequency, i.e., in scale factor bands SCB1 to SCB3 can be applied in addition. In noise-filling, there exist several adjacent spectral lines which have been quantized to zero. On the decoder-side, these quantized to zero spectral values are re-synthesized and the re-synthesized spectral values are adjusted in their magnitude using a noise-filling energy such as $NF_2$ illustrated at 308 in FIG. 3*b*. The noise-filling energy, which can be given in absolute terms or in relative terms particularly with respect to the scale factor as in USAC corresponds to the energy of the set of spectral values quantized to zero. These noise-filling spectral lines can also be considered to be a third set of third spectral portions which are regenerated by straightforward noise-filling synthesis without any IGF operation relying on frequency regeneration using frequency tiles from other frequencies for reconstructing frequency tiles using spectral values from a source range and the energy information $E_1$, $E_2$, $E_3$, $E_4$.

Advantageously, the bands, for which energy information is calculated coincide with the scale factor bands. In other embodiments, an energy information value grouping is applied so that, for example, for scale factor bands 4 and 5, only a single energy information value is transmitted, but even in this embodiment, the borders of the grouped reconstruction bands coincide with borders of the scale factor bands. If different band separations are applied, then certain re-calculations or synchronization calculations may be applied, and this can make sense depending on the certain implementation.

Figure 4A:
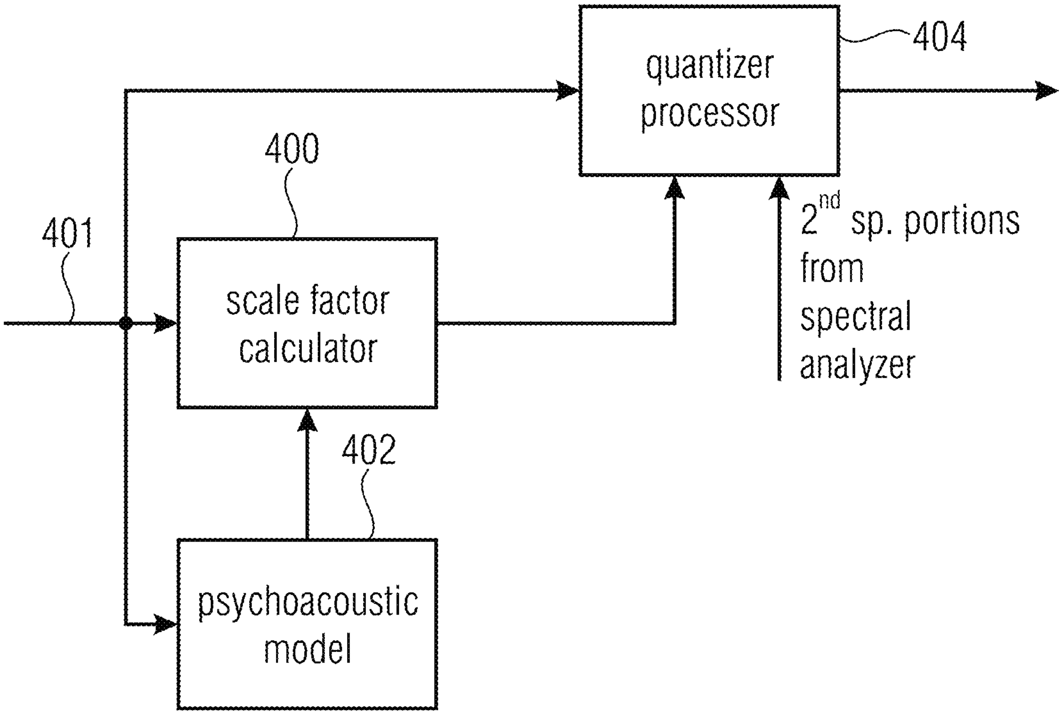
FIG. 4*a* illustrates the functionality of the spectral domain encoder for applying the selection of spectral portions into the first and second sets of spectral portions.

Advantageously, the spectral domain encoder 106 of FIG. 1*a* is a psycho-acoustically driven encoder as illustrated in FIG. 4*a*. Typically, as for example illustrated in the MPEG2/4 AAC standard or MPEG1/2, Layer 3 standard, the to be encoded audio signal after having been transformed into the spectral range (401 in FIG. 4*a*) is forwarded to a scale factor calculator 400. The scale factor calculator is controlled by a psycho-acoustic model additionally receiving the to be quantized audio signal or receiving, as in the MPEG1/2 Layer 3 or MPEG AAC standard, a complex spectral representation of the audio signal. The psycho-acoustic model calculates, for each scale factor band, a scale factor representing the psycho-acoustic threshold. Additionally, the scale factors are then, by cooperation of the well-known inner and outer iteration loops or by any other suitable encoding procedure adjusted so that certain bitrate conditions are fulfilled. Then, the to be quantized spectral values on the one hand and the calculated scale factors on the other hand are input into a quantizer processor 404. In the straightforward audio encoder operation, the to be quantized spectral values are weighted by the scale factors and, the weighted spectral values are then input into a fixed quantizer typically having a compression functionality to upper amplitude ranges. Then, at the output of the quantizer processor there do exist quantization indices which are then forwarded into an entropy encoder typically having specific and very efficient coding for a set of zero-quantization indices for adjacent frequency values or, as also called in the art, a "run" of zero values.

In the audio encoder of FIG. 1*a*, however, the quantizer processor typically receives information on the second spectral portions from the spectral analyzer. Thus, the quantizer processor 404 makes sure that, in the output of the quantizer processor 404, the second spectral portions as identified by the spectral analyzer 102 are zero or have a representation acknowledged by an encoder or a decoder as a zero representation which can be very efficiently coded, specifically when there exist "runs" of zero values in the spectrum.

Figure 4B:
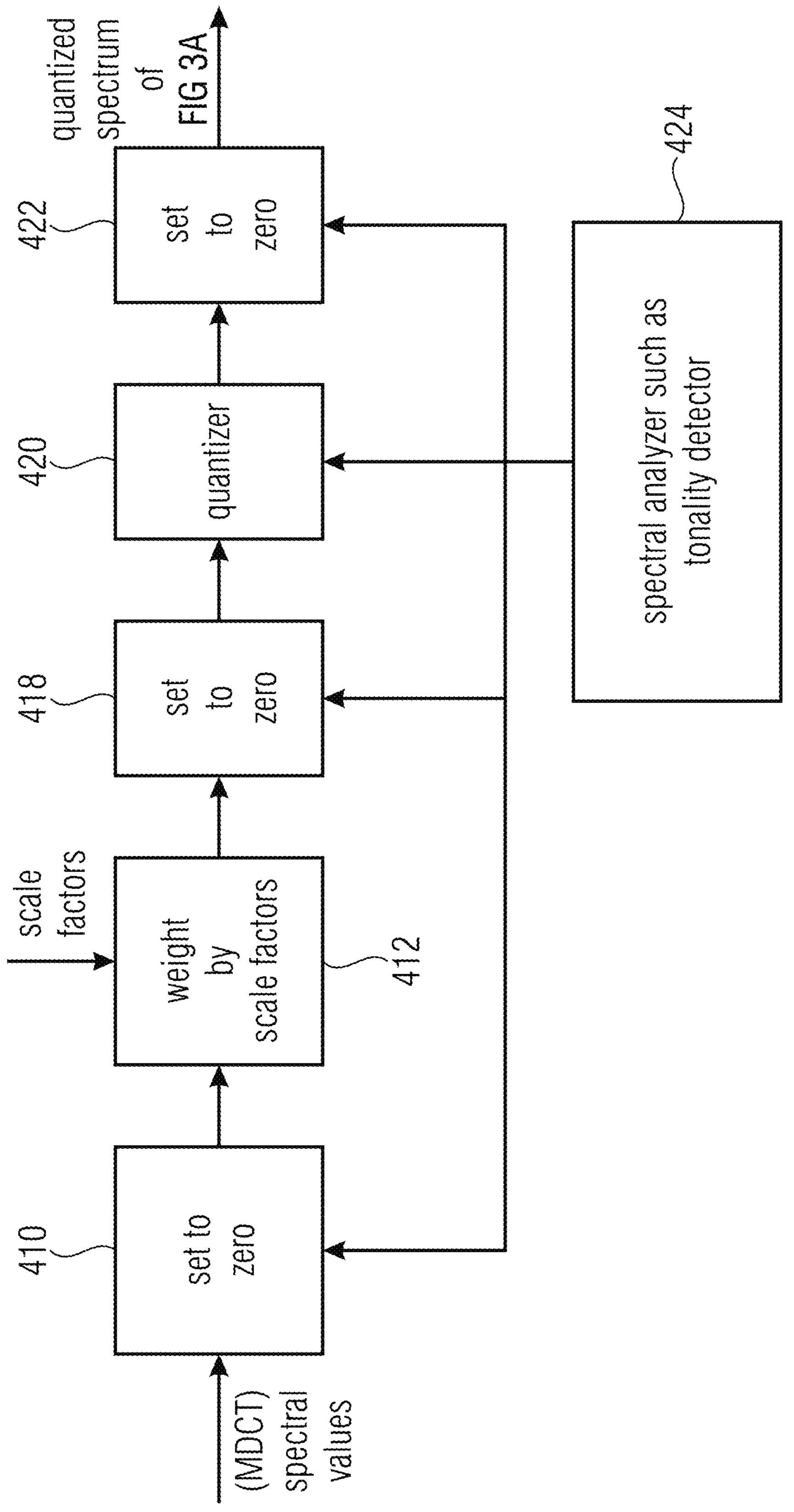
FIG. 4*b* illustrates an implementation of the functionality of FIG. 4*a;*

FIG. 4*b* illustrates an implementation of the quantizer processor. The MDCT spectral values can be input into a set to zero block 410. Then, the second spectral portions are already set to zero before a weighting by the scale factors in block 412 is performed. In an additional implementation, block 410 is not provided, but the set to zero cooperation is performed in block 418 subsequent to the weighting block 412. In an even further implementation, the set to zero operation can also be performed in a set to zero block 422 subsequent to a quantization in the quantizer block 420. In this implementation, blocks 410 and 418 would not be present. Generally, at least one of the blocks 410, 418, 422 are provided depending on the specific implementation.

Then, at the output of block 422, a quantized spectrum is obtained corresponding to what is illustrated in FIG. 3*a*. This quantized spectrum is then input into an entropy coder such as 232 in FIG. 2*b* which can be a Huffman coder or an arithmetic coder as, for example, defined in the USAC standard.

The set to zero blocks 410, 418, 422, which are provided alternatively to each other or in parallel are controlled by the spectral analyzer 424. The spectral analyzer advantageously comprises any implementation of a well-known tonality detector or comprises any different kind of detector operative for separating a spectrum into components to be encoded with a high resolution and components to be encoded with a low resolution. Other such algorithms implemented in the spectral analyzer can be a voice activity detector, a noise detector, a speech detector or any other detector deciding, depending on spectral information or associated metadata on the resolution requirements for different spectral portions.

Figure 5A:
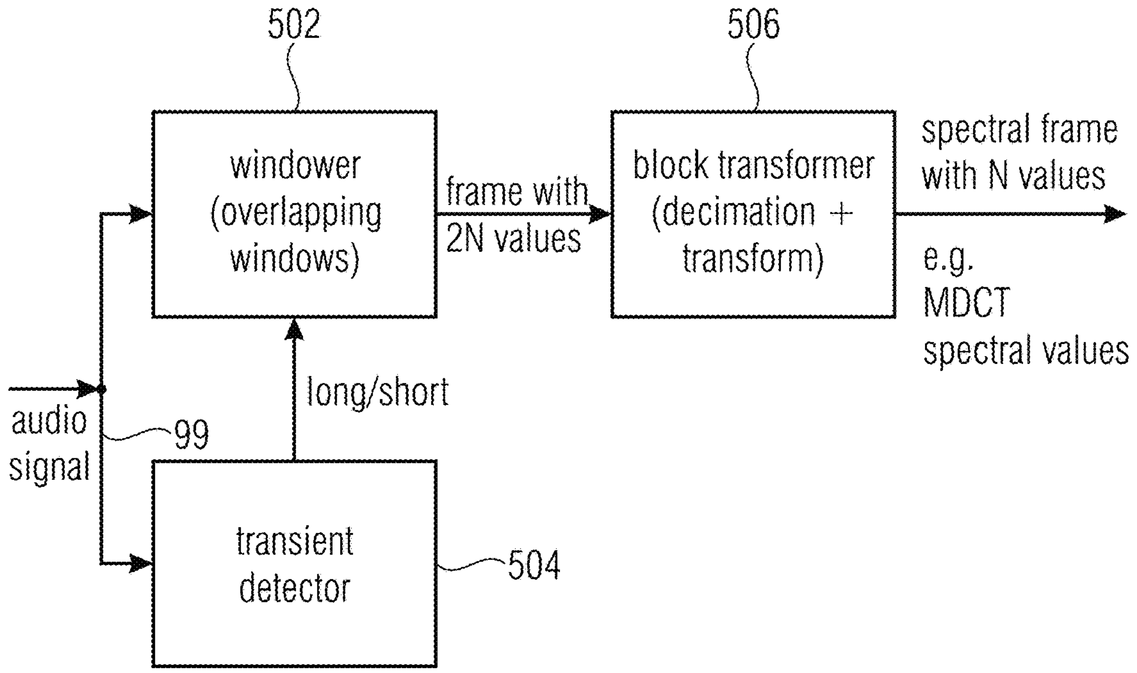
FIG. 5*a* illustrates a functionality of an MDCT encoder.

FIG. 5*a* illustrates an implementation of the time spectrum converter 100 of FIG. 1*a* as, for example, implemented in AAC or USAC. The time spectrum converter 100 comprises a windower 502 controlled by a transient detector 504. When the transient detector 504 detects a transient, then a switchover from long windows to short windows is signaled to the windower. The windower 502 then calculates, for overlapping blocks, windowed frames, where each windowed frame typically has two N values such as 2048 values. Then, a transformation within a block transformer 506 is performed, and this block transformer typically additionally provides a decimation, so that a combined decimation/transform is performed to obtain a spectral frame with N values such as MDCT spectral values. Thus, for a long window operation, the frame at the input of block 506 comprises two N values such as 2048 values and a spectral frame then has 1024 values. Then, however, a switch is performed to short blocks, when eight short blocks are performed where each short block has ⅛ windowed time domain values compared to a long window and each spectral block has ⅛ spectral values compared to a long block. Thus, when this decimation is combined with a 50% overlap operation of the windower, the spectrum is a critically sampled version of the time domain audio signal 99.

Figure 5B:
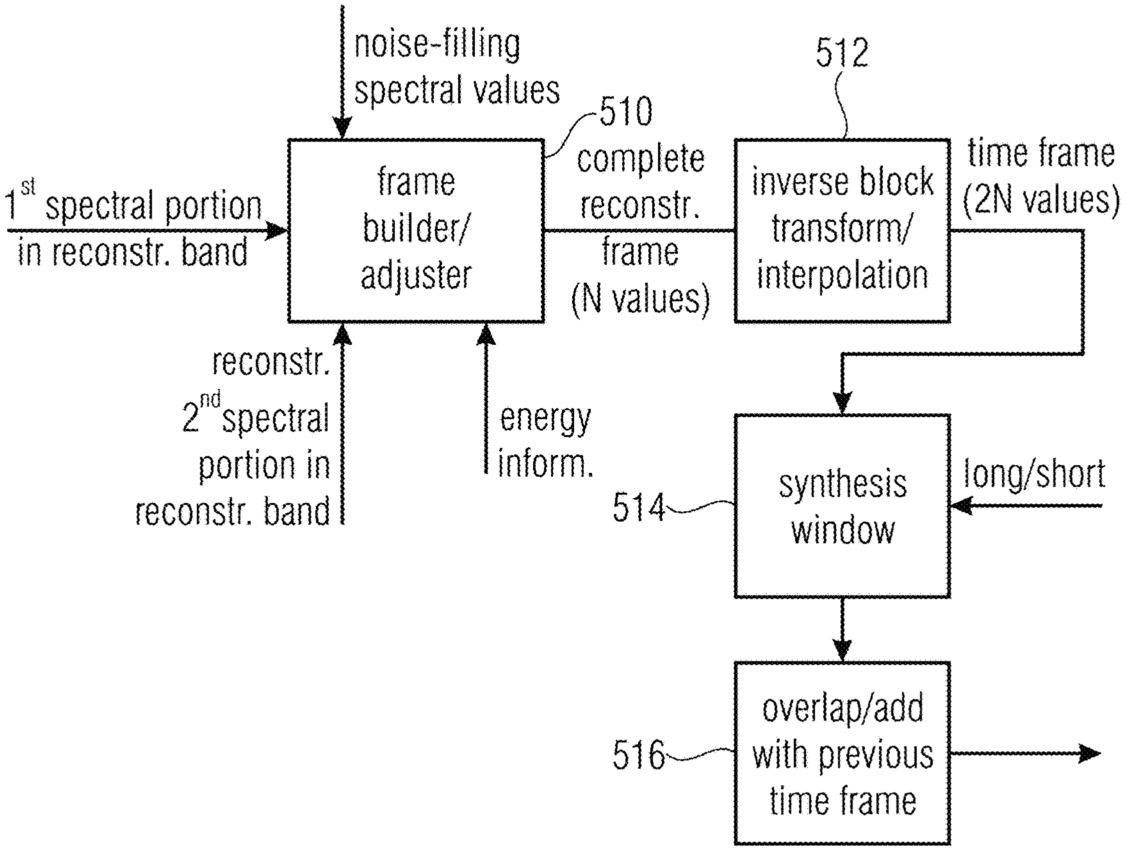
FIG. 5*b* illustrates a functionality of the decoder with an MDCT technology.

Subsequently, reference is made to FIG. 5*b* illustrating a specific implementation of frequency regenerator 116 and the spectrum-time converter 118 of FIG. 1*b*, or of the combined operation of blocks 208, 212 of FIG. 2*a*. In FIG. 5*b*, a specific reconstruction band is considered such as scale factor band 6 of FIG. 3*a*. The first spectral portion in this reconstruction band, i.e., the first spectral portion 306 of FIG. 3*a* is input into the frame builder/adjustor block 510. Furthermore, a reconstructed second spectral portion for the scale factor band 6 is input into the frame builder/adjuster 510 as well. Furthermore, energy information such as $E_3$ of FIG. 3*b* for a scale factor band 6 is also input into block 510. The reconstructed second spectral portion in the reconstruction band has already been generated by frequency tile filling using a source range and the reconstruction band then corresponds to the target range. Now, an energy adjustment of the frame is performed to then finally obtain the complete reconstructed frame having the N values as, for example, obtained at the output of combiner 208 of FIG. 2*a*. Then, in block 512, an inverse block transform/interpolation is performed to obtain 248 time domain values for the for example 124 spectral values at the input of block 512. Then, a synthesis windowing operation is performed in block 514 which is again controlled by a long window/short window indication transmitted as side information in the encoded audio signal. Then, in block 516, an overlap/add operation with a previous time frame is performed. Advantageously, MDCT applies a 50% overlap so that, for each new time frame of 2N values, N time domain values are finally output. A 50% overlap is heavily advantageous due to the fact that it provides critical sampling and a continuous crossover from one frame to the next frame due to the overlap/add operation in block 516.

As illustrated at 301 in FIG. 3*a*, a noise-filling operation can additionally be applied not only below the IGF start frequency, but also above the IGF start frequency such as for the contemplated reconstruction band coinciding with scale factor band 6 of FIG. 3*a*. Then, noise-filling spectral values can also be input into the frame builder/adjuster 510 and the adjustment of the noise-filling spectral values can also be applied within this block or the noise-filling spectral values can already be adjusted using the noise-filling energy before being input into the frame builder/adjuster 510.

Advantageously, an IGF operation, i.e., a frequency tile filling operation using spectral values from other portions can be applied in the complete spectrum. Thus, a spectral tile filling operation can not only be applied in the high band above an IGF start frequency but can also be applied in the low band. Furthermore, the noise-filling without frequency tile filling can also be applied not only below the IGF start frequency but also above the IGF start frequency. It has, however, been found that high quality and high efficient audio encoding can be obtained when the noise-filling operation is limited to the frequency range below the IGF start frequency and when the frequency tile filling operation is restricted to the frequency range above the IGF start frequency as illustrated in FIG. 3*a*.

Advantageously, the target tiles (TT) (having frequencies greater than the IGF start frequency) are bound to scale factor band borders of the full rate coder. Source tiles (ST), from which information is taken, i.e., for frequencies lower than the IGF start frequency are not bound by scale factor band borders. The size of the ST should correspond to the size of the associated TT. This is illustrated using the following example. TT[0] has a length of 10 MDCT Bins. This exactly corresponds to the length of two subsequent SCBs (such as 4+6). Then, all possible ST that are to be correlated with TT[0], have a length of 10 bins, too. A second target tile TT[1] being adjacent to TT[0] has a length of 15 bins I (SCB having a length of 7+8). Then, the ST for that have a length of 15 bins rather than 10 bins as for TT[0].

Should the case arise that one cannot find a TT for an ST with the length of the target tile (when e.g. the length of TT is greater than the available source range), then a correlation is not calculated and the source range is copied a number of times into this TT (the copying is done one after the other so that a frequency line for the lowest frequency of the second copy immediately follows—in frequency—the frequency line for the highest frequency of the first copy), until the target tile TT is completely filled up.

Figure 5C:
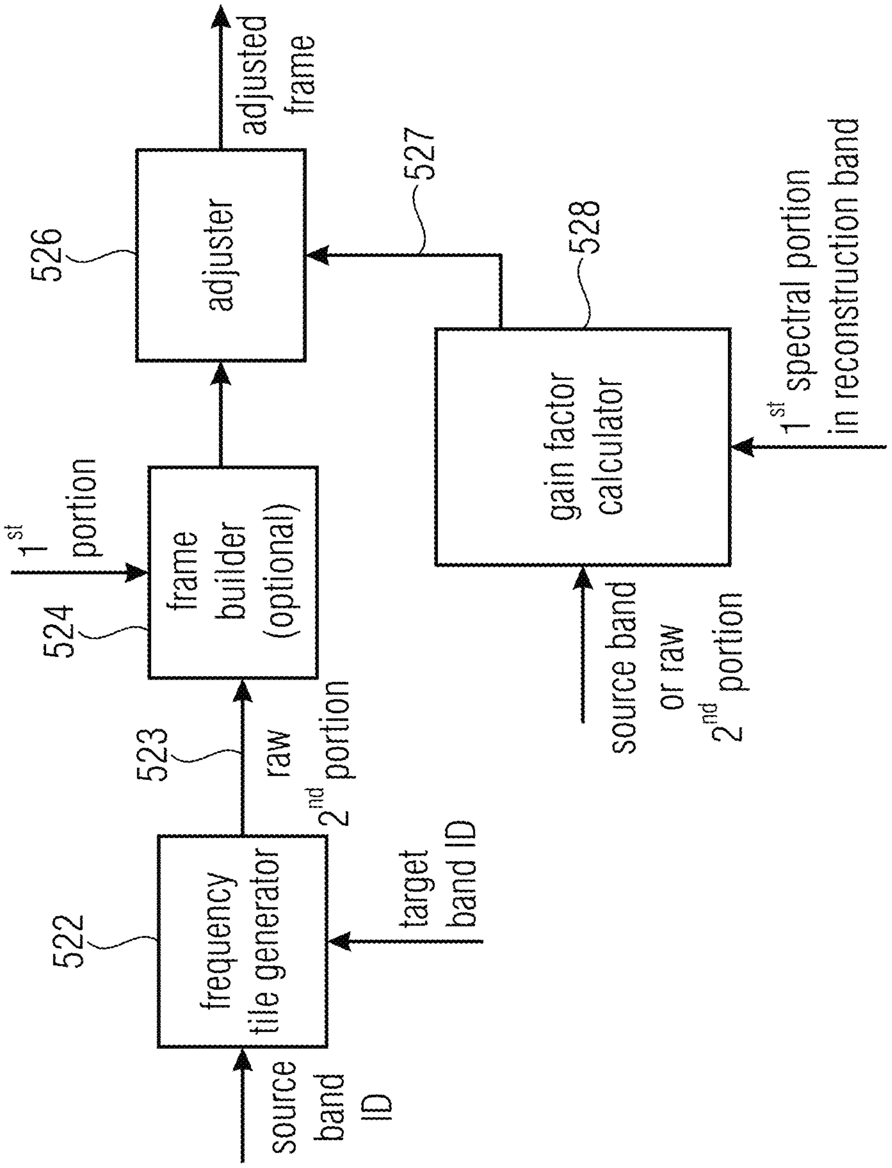
FIG. 5*c* illustrates an implementation of the frequency regenerator.

Subsequently, reference is made to FIG. 5*c* illustrating a further embodiment of the frequency regenerator 116 of FIG. 1*b* or the IGF block 202 of FIG. 2*a*. Block 522 is a frequency tile generator receiving, not only a target band ID, but additionally receiving a source band ID. Exemplarily, it has been determined on the encoder-side that the scale factor band 3 of FIG. 3*a* is very well suited for reconstructing scale factor band 7. Thus, the source band ID would be 2 and the target band ID would be 7. Based on this information, the frequency tile generator 522 applies a copy up or harmonic tile filling operation or any other tile filling operation to generate the raw second portion of spectral components 523. The raw second portion of spectral components has a frequency resolution identical to the frequency resolution included in the first set of first spectral portions.

Then, the first spectral portion of the reconstruction band such as 307 of FIG. 3*a* is input into a frame builder 524 and the raw second portion 523 is also input into the frame builder 524. Then, the reconstructed frame is adjusted by the adjuster 526 using a gain factor for the reconstruction band calculated by the gain factor calculator 528. Importantly, however, the first spectral portion in the frame is not influenced by the adjuster 526, but only the raw second portion for the reconstruction frame is influenced by the adjuster 526. To this end, the gain factor calculator 528 analyzes the source band or the raw second portion 523 and additionally analyzes the first spectral portion in the reconstruction band to finally find the correct gain factor 527 so that the energy of the adjusted frame output by the adjuster 526 has the energy $E_4$ when a scale factor band 7 is contemplated.

Figure 13A:
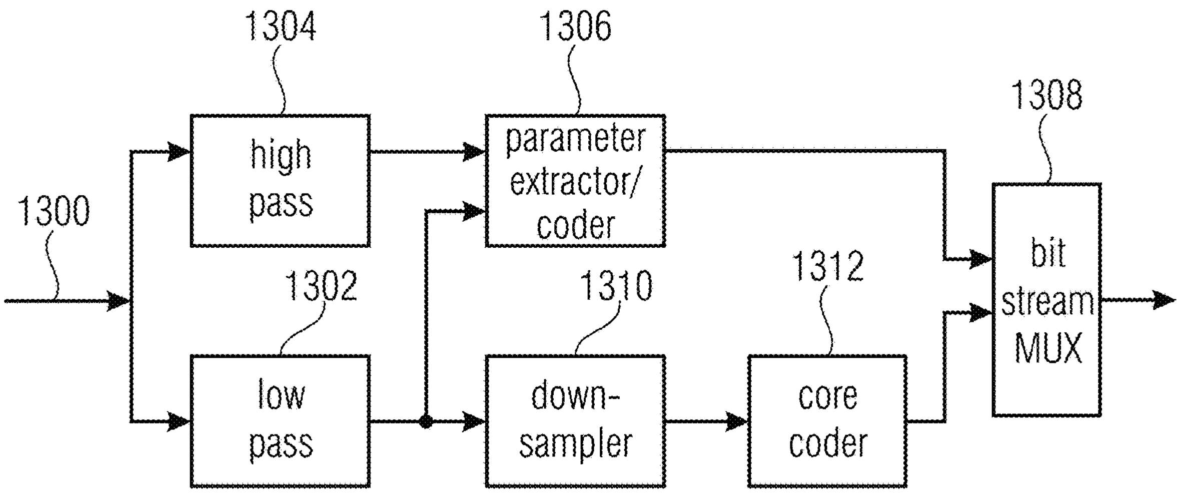
FIG 13A (PRIOR ART)
FIG. 13*a* illustrates a conventional encoder with bandwidth extension.
Figure 13B:
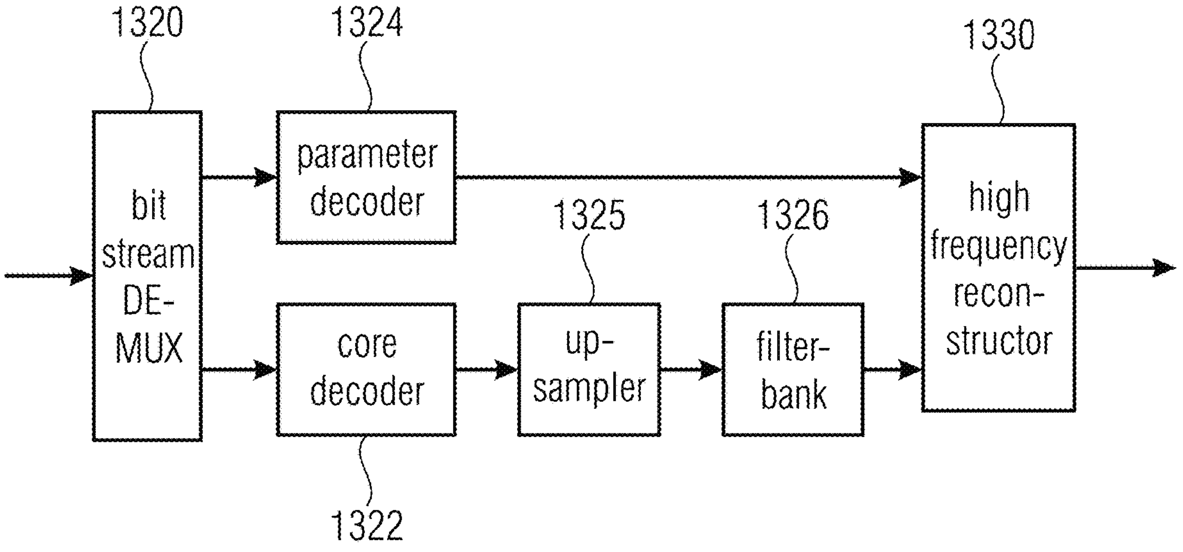
FIG 13B (PRIOR ART)
FIG. 13*b* illustrates a conventional decoder with bandwidth extension.

In this context, it is very important to evaluate the high frequency reconstruction accuracy of the present invention compared to HE-AAC. This is explained with respect to scale factor band 7 in FIG. 3*a*. It is assumed that a conventional encoder such as illustrated in FIG. 13*a* would detect the spectral portion 307 to be encoded with a high resolution as a "missing harmonics". Then, the energy of this spectral component would be transmitted together with a spectral envelope information for the reconstruction band such as scale factor band 7 to the decoder. Then, the decoder would recreate the missing harmonic. However, the spectral value, at which the missing harmonic 307 would be reconstructed by the conventional decoder of FIG. 13*b* would be in the middle of band 7 at a frequency indicated by reconstruction frequency 390. Thus, the present invention avoids a frequency error 391 which would be introduced by the conventional decoder of FIG. 13*d*.

In an implementation, the spectral analyzer is also implemented to calculating similarities between first spectral portions and second spectral portions and to determine, based on the calculated similarities, for a second spectral portion in a reconstruction range a first spectral portion matching with the second spectral portion as far as possible. Then, in this variable source range/destination range implementation, the parametric coder will additionally introduce into the second encoded representation a matching information indicating for each destination range a matching source range. On the decoder-side, this information would then be used by a frequency tile generator 522 of FIG. 5*c* illustrating a generation of a raw second portion 523 based on a source band ID and a target band ID.

Furthermore, as illustrated in FIG. 3*a*, the spectral analyzer is configured to analyze the spectral representation up to a maximum analysis frequency being only a small amount below half of the sampling frequency and advantageously being at least one quarter of the sampling frequency or typically higher.

As illustrated, the encoder operates without downsampling and the decoder operates without upsampling. In other words, the spectral domain audio coder is configured to generate a spectral representation having a Nyquist frequency defined by the sampling rate of the originally input audio signal.

Furthermore, as illustrated in FIG. 3*a*, the spectral analyzer is configured to analyze the spectral representation starting with a gap filling start frequency and ending with a maximum frequency represented by a maximum frequency included in the spectral representation, wherein a spectral portion extending from a minimum frequency up to the gap filling start frequency belongs to the first set of spectral portions and wherein a further spectral portion such as 304, 305, 306, 307 having frequency values above the gap filling frequency additionally is included in the first set of first spectral portions.

As outlined, the spectral domain audio decoder 112 is configured so that a maximum frequency represented by a spectral value in the first decoded representation is equal to a maximum frequency included in the time representation having the sampling rate wherein the spectral value for the maximum frequency in the first set of first spectral portions is zero or different from zero. Anyway, for this maximum frequency in the first set of spectral components a scale factor for the scale factor band exists, which is generated and transmitted irrespective of whether all spectral values in this scale factor band are set to zero or not as discussed in the context of FIGS. 3*a* and 3*b*.

The invention is, therefore, advantageous that with respect to other parametric techniques to increase compression efficiency, e.g. noise substitution and noise filling (these techniques are exclusively for efficient representation of noise like local signal content) the invention allows an accurate frequency reproduction of tonal components. To date, no state-of-the-art technique addresses the efficient parametric representation of arbitrary signal content by spectral gap filling without the restriction of a fixed a-priory division in low band (LF) and high band (HF).

Embodiments of the inventive system improve the state-of-the-art approaches and thereby provides high compression efficiency, no or only a small perceptual annoyance and full audio bandwidth even for low bitrates.

The general system consists of full band core coding intelligent gap filling (tile filling or noise filling)

sparse tonal parts in core selected by tonal mask joint stereo pair coding for full band, including tile filling TNS on tile spectral whitening in IGF range A first step towards a more efficient system is to remove the need for transforming spectral data into a second transform domain different from the one of the core coder. As the majority of audio codecs, such as AAC for instance, use the MDCT as basic transform, it is useful to perform the BWE in the MDCT domain also. A second requirement for the BWE system would be the need to preserve the tonal grid whereby even HF tonal components are preserved and the quality of the coded audio is thus superior to the existing systems. To take care of both the above mentioned requirements for a BWE scheme, a new system is proposed called Intelligent Gap Filling (IGF). FIG. 2*b* shows the block diagram of the proposed system on the encoder-side and FIG. 2*a* shows the system on the decoder-side.

Figure 6A:
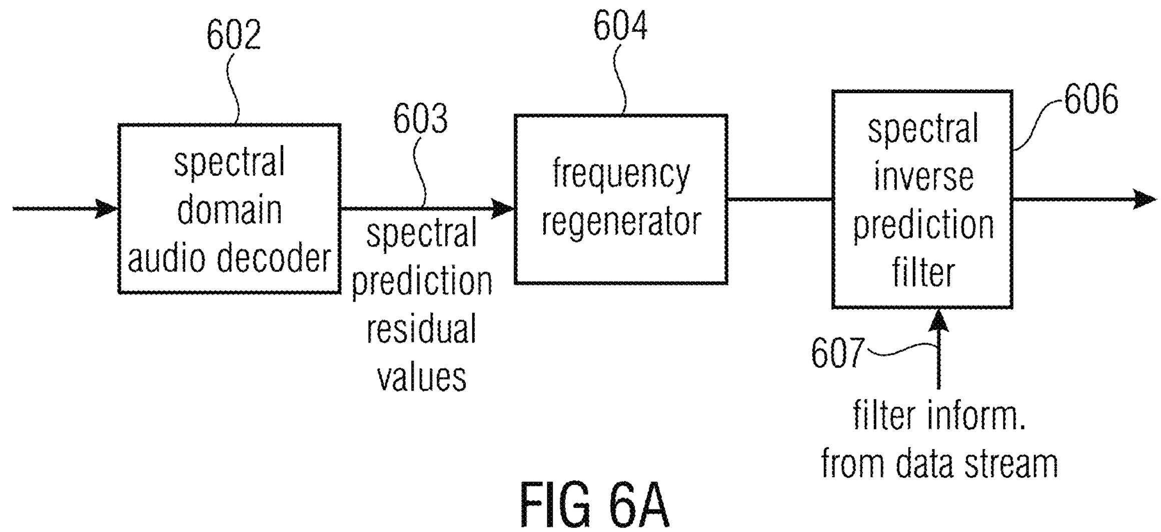
FIG. 6*a* illustrates an audio coder with temporal noise shaping/temporal tile shaping functionality.
Figure 6B:
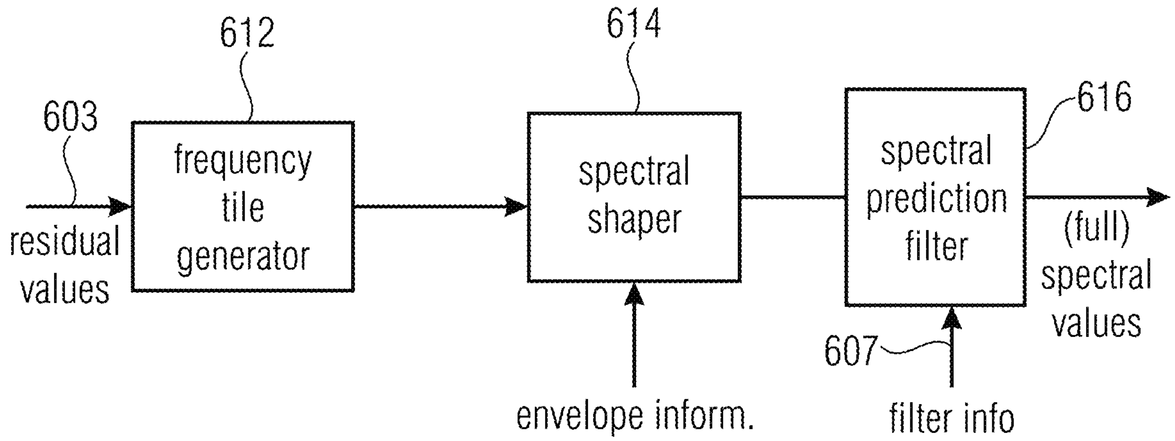
FIG. 6*b* illustrates a decoder with temporal noise shaping/temporal tile shaping technology.
Figure 6C:
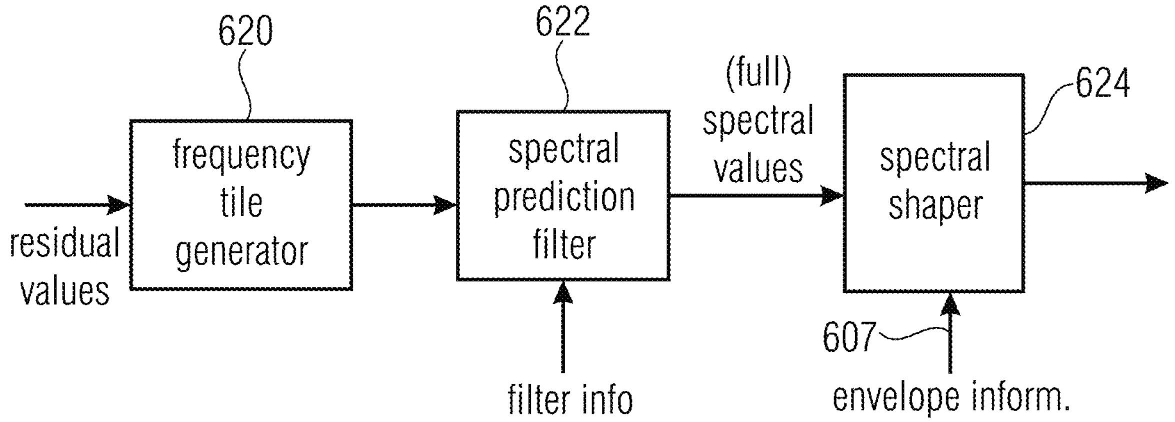
FIG. 6*c* illustrates a further functionality of temporal noise shaping/temporal tile shaping functionality with a different order of the spectral prediction filter and the spectral shaper.

FIG. 6*a* illustrates an apparatus for decoding an encoded audio signal in another implementation of the present invention. The apparatus for decoding comprises a spectral domain audio decoder 602 for generating a first decoded representation of a first set of spectral portions and as the frequency regenerator 604 connected downstream of the spectral domain audio decoder 602 for generating a reconstructed second spectral portion using a first spectral portion of the first set of first spectral portions. As illustrated at 603, the spectral values in the first spectral portion and in the second spectral portion are spectral prediction residual values. In order to transform these spectral prediction residual values into a full spectral representation, a spectral prediction filter 606 is provided. This inverse prediction filter is configured for performing an inverse prediction over frequency using the spectral residual values for the first set of the first frequency and the reconstructed second spectral portions. The spectral inverse prediction filter 606 is configured by filter information included in the encoded audio signal. FIG. 6*b* illustrates a more detailed implementation of the FIG. 6*a* embodiment. The spectral prediction residual values 603 are input into a frequency tile generator 612 generating raw spectral values for a reconstruction band or for a certain second frequency portion and this raw data now having the same resolution as the high resolution first spectral representation is input into the spectral shaper 614. The spectral shaper now shapes the spectrum using envelope information transmitted in the bitstream and the spectrally shaped data are then applied to the spectral prediction filter 616 finally generating a frame of full spectral values using the filter information 607 transmitted from the encoder to the decoder via the bitstream.

In FIG. 6*b*, it is assumed that, on the encoder-side, the calculation of the filter information transmitted via the bitstream and used via line 607 is performed subsequent to the calculating of the envelope information. Therefore, in other words, an encoder matching with the decoder of FIG. 6*b* would calculate the spectral residual values first and would then calculate the envelope information with the spectral residual values as, for example, illustrated in FIG. 7*a*. However, the other implementation is useful for certain implementations as well, where the envelope information is calculated before performing TNS or TTS filtering on the encoder-side. Then, the spectral prediction filter 622 is applied before performing spectral shaping in block 624. Thus, in other words, the (full) spectral values are generated before the spectral shaping operation 624 is applied.

Advantageously, a complex valued TNS filter or TTS filter is calculated. This is illustrated in FIG. 7*a*. The original audio signal is input into a complex MDCT block 702. Then, the TTS filter calculation and TTS filtering is performed in the complex domain. Then, in block 706, the IGF side information is calculated and any other operation such as spectral analysis for coding etc. are calculated as well. Then, the first set of first spectral portion generated by block 706 is encoded with a psycho-acoustic model-driven encoder illustrated at 708 to obtain the first set of first spectral portions indicated at X(k) in FIG. 7*a* and all these data is forwarded to the bitstream multiplexer 710.

On the decoder-side, the encoded data is input into a demultiplexer 720 to separate IGF side information on the one hand, TTS side information on the other hand and the encoded representation of the first set of first spectral portions.

Then, block 724 is used for calculating a complex spectrum from one or more real-valued spectra. Then, both the real-valued and the complex spectra are input into block 726 to generate reconstructed frequency values in the second set of second spectral portions for a reconstruction band. Then, on the completely obtained and tile filled full band frame, the inverse TTS operation 728 is performed and, on the decoder-side, a final inverse complex MDCT operation is performed in block 730. Thus, the usage of complex TNS filter information allows, when being applied not only within the core band or within the separate tile bands but being applied over the core/tile borders or the tile/tile borders automatically generates a tile border processing, which, in the end, reintroduces a spectral correlation between tiles. This spectral correlation over tile borders is not obtained by only generating frequency tiles and performing a spectral envelope adjustment on this raw data of the frequency tiles.

FIG. 7*c* illustrates a comparison of an original signal (left panel) and an extended signal without TTS. It can be seen that there are strong artifacts illustrated by the broadened portions in the upper frequency range illustrated at 750. This, however, does not occur in FIG. 7*e* when the same spectral portion at 750 is compared with the artifact-related component 750 of FIG. 7*c*.

Embodiments or the inventive audio coding system use the main share of available bitrate to waveform code only the perceptually most relevant structure of the signal in the encoder, and the resulting spectral gaps are filled in the decoder with signal content that roughly approximates the original spectrum. A very limited bit budget is consumed to control the parameter driven so-called spectral Intelligent Gap Filling (IGF) by dedicated side information transmitted from the encoder to the decoder.

Storage or transmission of audio signals is often subject to strict bitrate constraints. In the past, coders were forced to drastically reduce the transmitted audio bandwidth when only a very low bitrate was available. Modern audio codecs are nowadays able to code wide-band signals by using bandwidth extension (BWE) methods like Spectral Bandwidth Replication (SBR) [1]. These algorithms rely on a parametric representation of the high-frequency content (HF)—which is generated from the waveform coded low-frequency part (LF) of the decoded signal by means of transposition into the HF spectral region ("patching") and application of a parameter driven post processing. In BWE schemes, the reconstruction of the HF spectral region above a given so-called cross-over frequency is often based on spectral patching. Typically, the HF region is composed of multiple adjacent patches and each of these patches is sourced from band-pass (BP) regions of the LF spectrum below the given cross-over frequency. State-of-the-art systems efficiently perform the patching within a filterbank representation by copying a set of adjacent subband coefficients from a source to the target region.

If a BWE system is implemented in a filterbank or time-frequency transform domain, there is only a limited possibility to control the temporal shape of the bandwidth extension signal. Typically, the temporal granularity is limited by the hop-size used between adjacent transform windows. This can lead to unwanted pre- or post-echoes in the BWE spectral range.

From perceptual audio coding, it is known that the shape of the temporal envelope of an audio signal can be restored by using spectral filtering techniques like Temporal Envelope Shaping (TNS) [14]. However, the TNS filter known from state-of-the-art is a real-valued filter on real-valued spectra. Such a real-valued filter on real-valued spectra can be seriously impaired by aliasing artifacts, especially if the underlying real transform is a Modified Discrete Cosine Transform (MDCT).

The temporal envelope tile shaping applies complex filtering on complex-valued spectra, like obtained from e.g. a Complex Modified Discrete Cosine Transform (CMDCT). Thereby, aliasing artifacts are avoided.

The temporal tile shaping consists of

- complex filter coefficient estimation and application of a flattening filter on the original signal spectrum at the encoder
- transmission of the filter coefficients in the side information
- application of a shaping filter on the tile filled reconstructed spectrum in the decoder The invention extends state-of-the-art technique known from audio transform coding, specifically Temporal Noise Shaping (TNS) by linear prediction along frequency direction, for the use in a modified manner in the context of bandwidth extension.

Further, the inventive bandwidth extension algorithm is based on Intelligent Gap Filling (IGF), but employs an oversampled, complex-valued transform (CMDCT), as opposed to the IGF standard configuration that relies on a real-valued critically sampled MDCT representation of a signal. The CMDCT can be seen as the combination of the MDCT coefficients in the real part and the MDST coefficients in the imaginary part of each complex-valued spectral coefficient.

Although the new approach is described in the context of IGF, the inventive processing can be used in combination with any BWE method that is based on a filter bank representation of the audio signal.

In this novel context, linear prediction along frequency direction is not used as temporal noise shaping, but rather as a temporal tile shaping (TTS) technique. The renaming is justified by the fact that tile filled signal components are temporally shaped by TTS as opposed to the quantization noise shaping by TNS in state-of-the-art perceptual transform codecs.

FIG. 7*a* shows a block diagram of a BWE encoder using IGF and the new TTS approach.

Figure 7B:
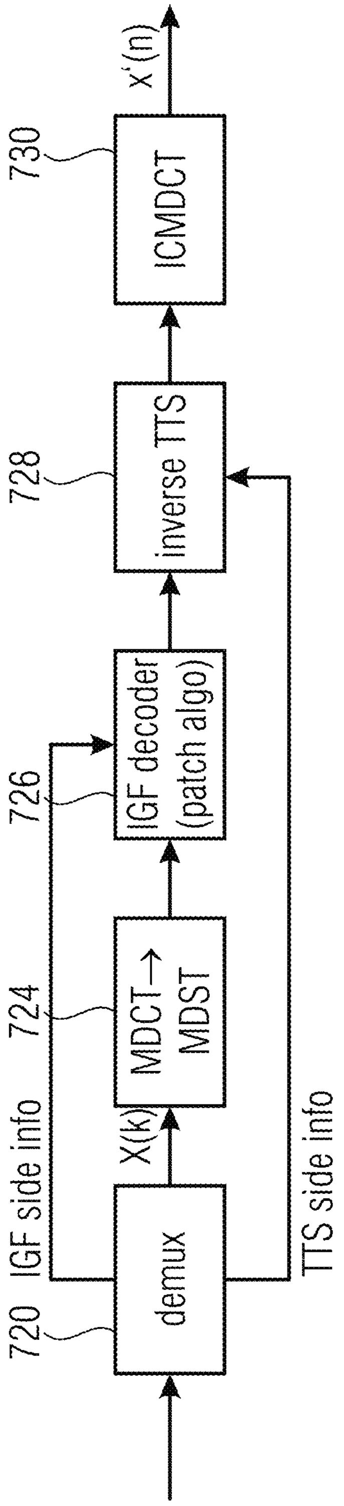
FIG. 7*b* illustrates a decoder implementation matching with the encoder implementation of FIG. 7*a;*
Figure 7C:
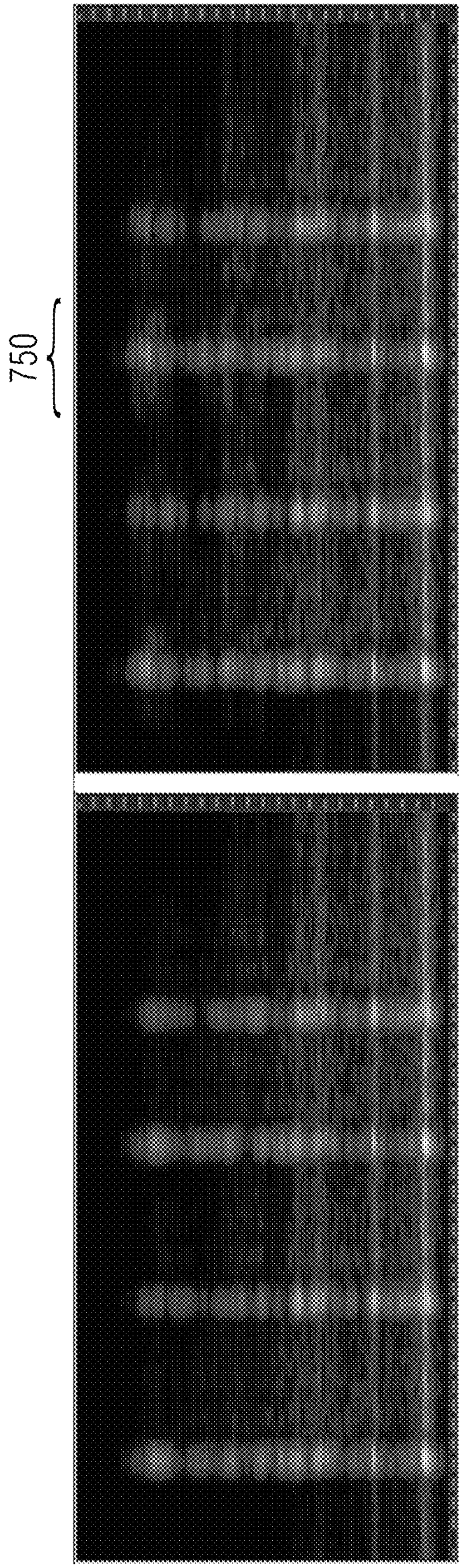
FIG. 7*c* illustrates a spectrogram of an original signal and an extended signal without TTS.

So the basic encoding scheme works as follows:

- compute the CMDCT of a time domain signal x(n) to get the frequency domain signal X(k)
- calculate the complex-valued TTS filter
- get the side information for the BWE and remove the spectral information which has to be replicated by the decoder
- apply the quantization using the psycho acoustic module (PAM)
- store/transmit the data, only real-valued MDCT coefficients are transmitted FIG. 7*b* shows the corresponding decoder. It reverses mainly the steps done in the encoder.

Here, the basic decoding scheme works as follows:

- estimate the MDST coefficients from of the MDCT values (this processing adds one block decoder delay) and combine MDCT and MDST coefficients into complex-valued CMDCT coefficients
- perform the tile filling with its post processing
- apply the inverse TTS filtering with the transmitted TTS filter coefficients
- calculate the inverse CMDCT Note that, alternatively, the order of TTS synthesis and IGF post-processing can also be reversed in the decoder if TTS analysis and IGF parameter estimation are consistently reversed in the encoder.

For efficient transform coding, advantageously, so-called "long blocks" of approx. 20 ms have to be used to achieve reasonable transform gain. If the signal within such a long block contains transients, audible pre- and post-echoes occur in the reconstructed spectral bands due to tile filling. FIG. 7*c* shows typical pre- and post-echo effects that impair the transients due to IGF. On the left panel of FIG. 7*c*, the spectrogram of the original signal is shown, and on the right panel the spectrogram of the tile filled signal without inventive TTS filtering is shown. In this example, the IGF start frequency $f_{IGFstart}$ or $f_{Split}$ between core band and tile-filled band is chosen to be $f_s/4$. In the right panel of FIG. 7*c*, distinct pre- and post-echoes are visible surrounding the transients, especially prominent at the upper spectral end of the replicated frequency region.

The main task of the TTS module is to confine these unwanted signal components in close vicinity around a transient and thereby hide them in the temporal region governed by the temporal masking effect of human perception. Therefore, the necessitated TTS prediction coefficients are calculated and applied using "forward prediction" in the CMDCT domain.

Figure 7D:
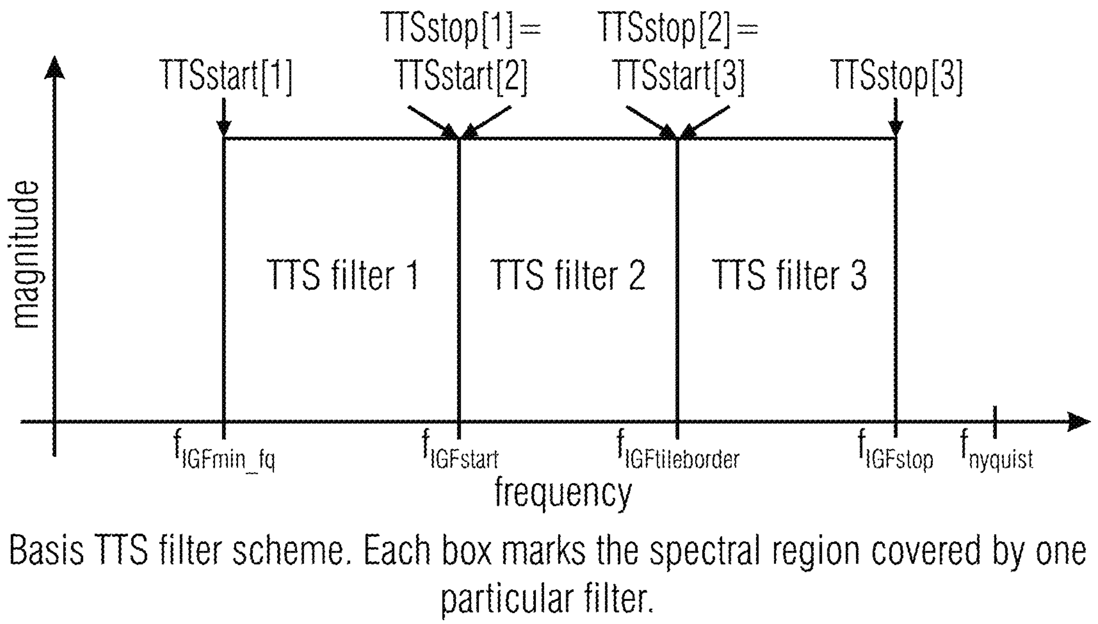
FIG. 7*d* illustrates a frequency representation illustrating the correspondence between intelligent gap filling frequencies and temporal tile shaping energies.

In an embodiment that combines TTS and IGF into a codec it is important to align certain TTS parameters and IGF parameters such that an IGF tile is either entirely filtered by one TTS filter (flattening or shaping filter) or not. Therefore, all TTSstart[ . . . ] or TTSstop[ . . . ] frequencies shall not be comprised within an IGF tile, but rather be aligned to the respective $f_{IGF\ldots}$ frequencies. FIG. 7*d* shows an example of TTS and IGF operating areas for a set of three TTS filters.

The TTS stop frequency is adjusted to the stop frequency of the IGF tool, which is higher than $f_{IGFstart}$. If TTS uses more than one filter, it has to be ensured that the cross-over frequency between two TTS filters has to match the IGF split frequency. Otherwise, one TTS sub-filter will run over $f_{IGFstart}$ resulting in unwanted artifacts like over-shaping.

In the implementation variant depicted in FIG. 7*a* and FIG. 7*b*, additional care has to be taken that in that decoder IGF energies are adjusted correctly. This is especially the case if, in the course of TTS and IGF processing, different TTS filters having different prediction gains are applied to source region (as a flattening filter) and target spectral region (as a shaping filter which is not the exact counterpart of said flattening filter) of one IGF tile. In this case, the prediction gain ratio of the two applied TTS filters does not equal one anymore and therefore an energy adjustment by this ratio has to be applied.

In the alternative implementation variant, the order of IGF post-processing and TTS is reversed. In the decoder, this means that the energy adjustment by IGF post-processing is calculated subsequent to TTS filtering and thereby is the final processing step before the synthesis transform. Therefore, regardless of different TTS filter gains being applied to one tile during coding, the final energy is adjusted correctly by the IGF processing.

On decoder-side, the TTS filter coefficients are applied on the full spectrum again, i.e. the core spectrum extended by the regenerated spectrum. The application of the TTS is necessitated to form the temporal envelope of the regenerated spectrum to match the envelope of the original signal again. So the shown pre-echoes are reduced. In addition, it still temporally shapes the quantization noise in the signal below $f_{IGFstart}$ as usual with legacy TNS.

In legacy coders, spectral patching on an audio signal (e.g. SBR) corrupts spectral correlation at the patch borders and thereby impairs the temporal envelope of the audio signal by introducing dispersion. Hence, another benefit of performing the IGF tile filling on the residual signal is that, after application of the TTS shaping filter, tile borders are seamlessly correlated, resulting in a more faithful temporal reproduction of the signal.

Figure 7E:
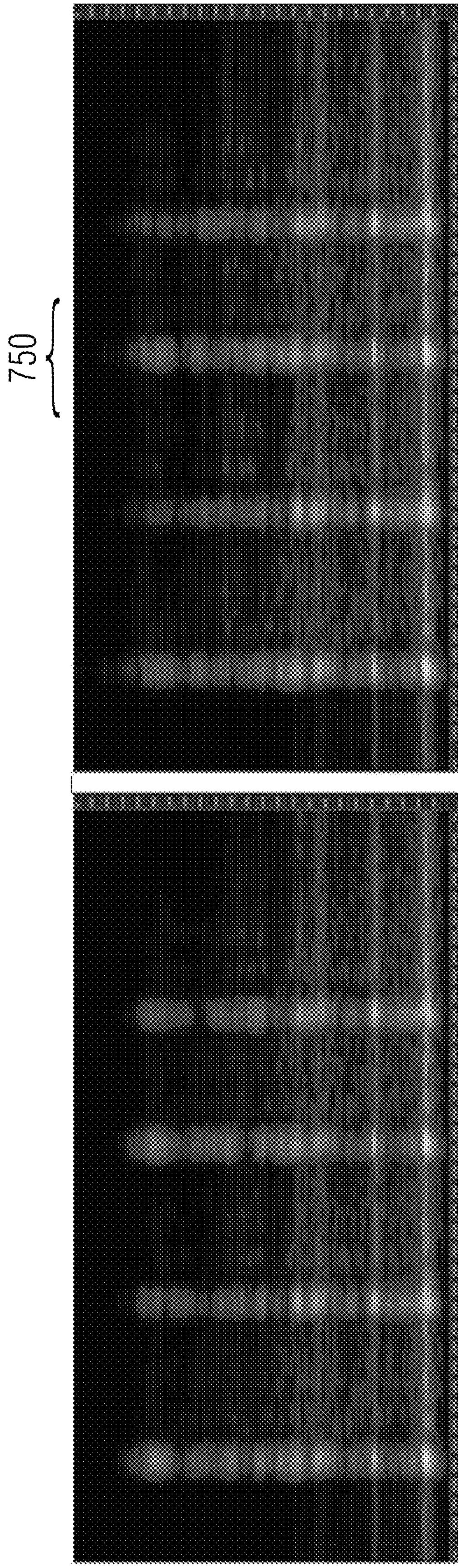
FIG. 7*e* illustrates a spectrogram of an original signal and an extended signal with TTS.

The result of the accordingly processed signal is shown in FIG. 7*e*. In comparison the unfiltered version (FIG. 7*c*, right panel) the TTS filtered signal shows a good reduction of the unwanted pre- and post-echoes (FIG. 7*e*, right panel).

Furthermore, as discussed, FIG. 7*a* illustrates an encoder matching with the decoder of FIG. 7*b* or the decoder of FIG. 6*a*. Basically, an apparatus for encoding an audio signal comprises a time-spectrum converter such as 702 for converting an audio signal into a spectral representation. The spectral representation can be a real value spectral representation or, as illustrated in block 702, a complex value spectral representation. Furthermore, a prediction filter such as 704 for performing a prediction over frequency is provided to generate spectral residual values, wherein the prediction filter 704 is defined by prediction filter information derived from the audio signal and forwarded to a bitstream multiplexer 710, as illustrated at 714 in FIG. 7*a*. Furthermore, an audio coder such as the psycho-acoustically driven audio encoder 704 is provided. The audio coder is configured for encoding a first set of first spectral portions of the spectral residual values to obtain an encoded first set of first spectral values. Additionally, a parametric coder such as the one illustrated at 706 in FIG. 7*a* is provided for encoding a second set of second spectral portions. Advantageously, the first set of first spectral portions is encoded with a higher spectral resolution compared to the second set of second spectral portions.

Finally, as illustrated in FIG. 7*a*, an output interface is provided for outputting the encoded signal comprising the parametrically encoded second set of second spectral portions, the encoded first set of first spectral portions and the filter information illustrated as "TTS side info" at 714 in FIG. 7*a*.

Advantageously, the prediction filter 704 comprises a filter information calculator configured for using the spectral values of the spectral representation for calculating the filter information. Furthermore, the prediction filter is configured for calculating the spectral residual values using the same spectral values of the spectral representation used for calculating the filter information.

Advantageously, the TTS filter 704 is configured in the same way as known for conventional audio encoders applying the TNS tool in accordance with the AAC standard.

Subsequently, a further implementation using two-channel decoding is discussed in the context of FIGS. 8*a* to 8*e*. Furthermore, reference is made to the description of the corresponding elements in the context of FIGS. 2*a*, 2*b* (joint channel coding 228 and joint channel decoding 204).

Figures 8A, 8B:
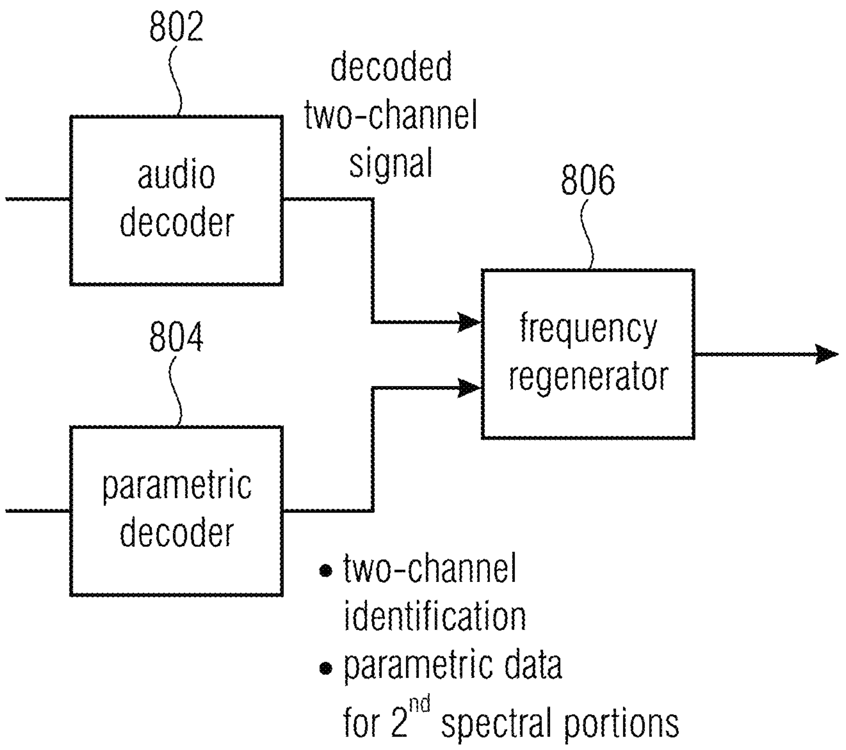
FIG. 8*a* illustrates a two-channel decoder with frequency regeneration.
FIG. 8*b* illustrates a table illustrating different combinations of representations and source/destination ranges.

FIG. 8*a* illustrates an audio decoder for generating a decoded two-channel signal. The audio decoder comprises four audio decoders 802 for decoding an encoded two-channel signal to obtain a first set of first spectral portions and additionally a parametric decoder 804 for providing parametric data for a second set of second spectral portions and, additionally, a two-channel identification identifying either a first or a second different two-channel representation for the second spectral portions. Additionally, a frequency regenerator 806 is provided for regenerating a second spectral portion depending on a first spectral portion of the first set of first spectral portions and parametric data for the second portion and the two-channel identification for the second portion. FIG. 8*b* illustrates different combinations for two-channel representations in the source range and the destination range. The source range can be in the first two-channel representation and the destination range can also be in the first two-channel representation. Alternatively, the source range can be in the first two-channel representation and the destination range can be in the second two-channel representation. Furthermore, the source range can be in the second two-channel representation and the destination range can be in the first two-channel representation as indicated in the third column of FIG. 8*b*. Finally, both, the source range and the destination range can be in the second two-channel representation. In an embodiment, the first two-channel representation is a separate two-channel representation where the two channels of the two-channel signal are individually represented. Then, the second two-channel representation is a joint representation where the two channels of the two-channel representation are represented jointly, i.e., where a further processing or representation transform is necessitated to re-calculate a separate two-channel representation as necessitated for outputting to corresponding speakers.

In an implementation, the first two-channel representation can be a left/right (UR) representation and the second two-channel representation is a joint stereo representation. However, other two-channel representations apart from left/right or M/S or stereo prediction can be applied and used for the present invention.

Figure 8C:
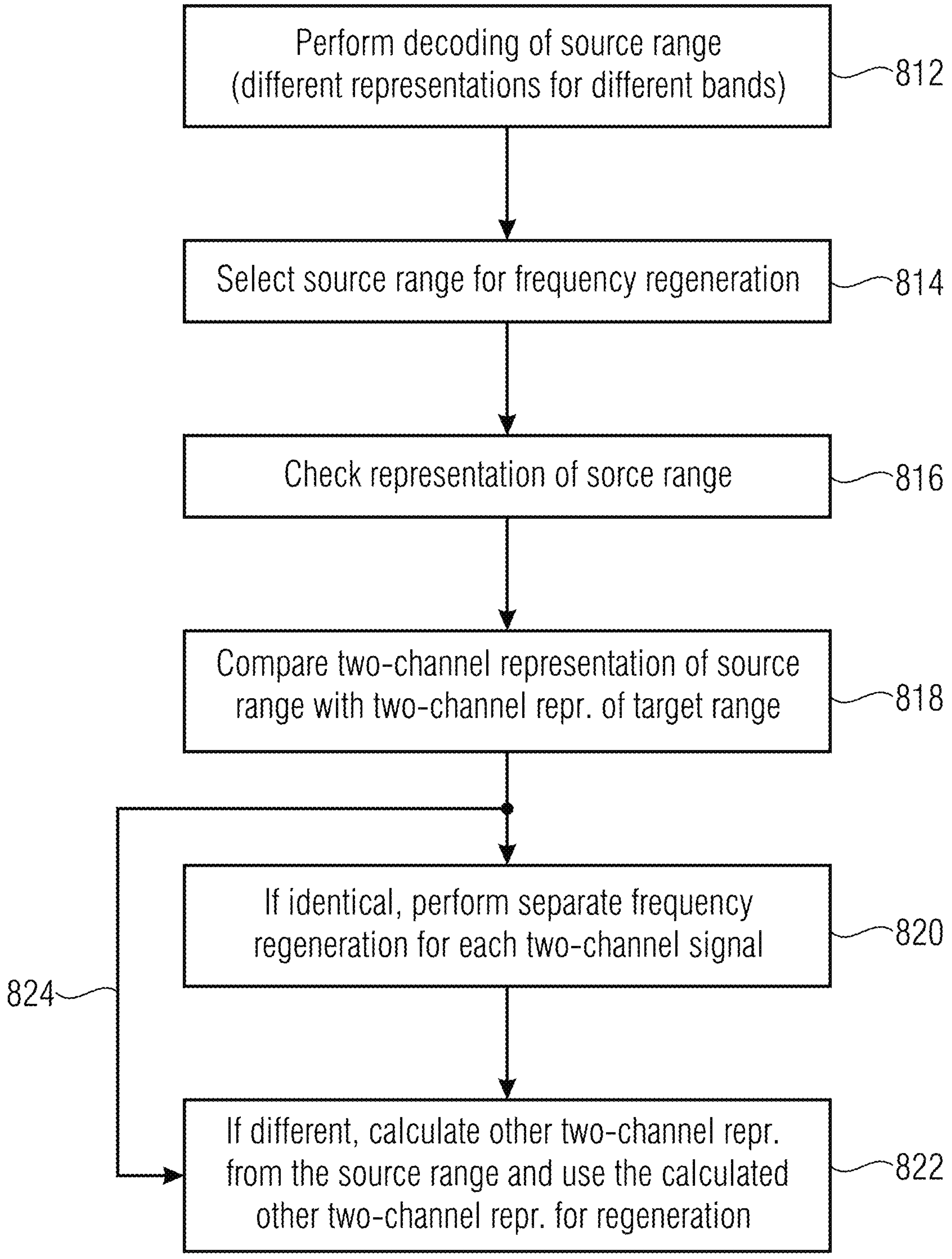
FIG. 8*c* illustrates flow chart illustrating the functionality of the two-channel decoder with frequency regeneration of FIG. 8*a;*

FIG. 8*c* illustrates a flow chart for operations performed by the audio decoder of FIG. 8*a*. In a step 812, the audio decoder 802 performs a decoding of the source range. The source range can comprise, with respect to FIG. 3*a*, scale factor bands SCB1 to SCB3. Furthermore, there can be a two-channel identification for each scale factor band and scale factor band 1 can, for example, be in the first representation (such as UR) and the third scale factor band can be in the second two-channel representation such as M/S or prediction downmix/residual. Thus, step 812 may result in different representations for different bands. Then, in step 814, the frequency regenerator 806 is configured for selecting a source range for a frequency regeneration. In step 816, the frequency regenerator 806 then checks the representation of the source range and in block 818, the frequency regenerator 806 compares the two-channel representation of the source range with the two-channel representation of the target range. If both representations are identical, the frequency regenerator 806 provides a separate frequency regeneration for each channel of the two-channel signal. When, however, both representations as detected in block 818 are not identical, then signal flow 824 is taken and block 822 calculates the other two-channel representation from the source range and uses this calculated other two-channel representation for the regeneration of the target range. Thus, the decoder of FIG. 8*a* makes it possible to regenerate a destination range indicated as having the second two-channel identification using a source range being in the first two-channel representation. Naturally, the present invention additionally allows to regenerate a target range using a source range having the same two-channel identification. And, additionally, the present invention allows to regenerate a target range having a two-channel identification indicating a joint two-channel representation and to then transform this representation into a separate channel representation necessitated for storage or transmission to corresponding loudspeakers for the two-channel signal.

It is emphasized that the two channels of the two-channel representation can be two stereo channels such as the left channel and the right channel. However, the signal can also be a multi-channel signal having, for example, five channels and a sub-woofer channel or having even more channels. Then, a pair-wise two-channel processing as discussed in the context of FIGS. 8*a* to 8*e* can be performed where the pairs can, for example, be a left channel and a right channel, a left surround channel and a right surround channel, and a center channel and an LFE (subwoofer) channel. Any other pairings can be used in order to represent, for example, six input channels by three two-channel processing procedures.

Figure 8D:
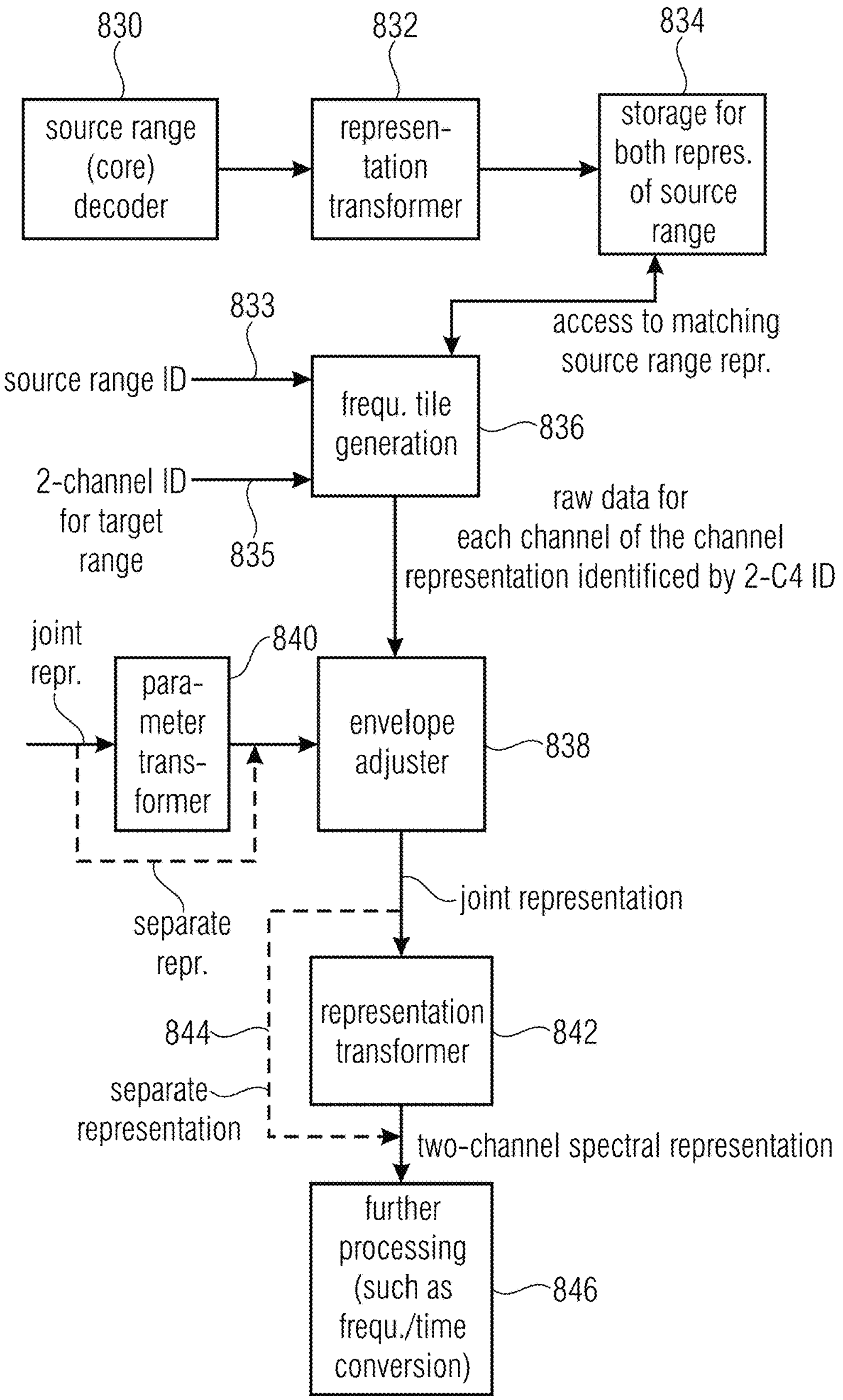
FIG. 8*d* illustrates a more detailed implementation of the decoder of FIG. 8*a;*

FIG. 8*d* illustrates a block diagram of an inventive decoder corresponding to FIG. 8*a*. A source range or a core decoder 830 may correspond to the audio decoder 802. The other blocks 832, 834, 836, 838, 840, 842 and 846 can be parts of the frequency regenerator 806 of FIG. 8*a*. Particularly, block 832 is a representation transformer for transforming source range representations in individual bands so that, at the output of block 832, a complete set of the source range in the first representation on the one hand and in the second two-channel representation on the other hand is present. These two complete source range representations can be stored in the storage 834 for both representations of the source range.

Then, block 836 applies a frequency tile generation using, as in input, a source range ID and additionally using as an input a two-channel ID for the target range. Based on the two-channel ID for the target range, the frequency tile generator accesses the storage 834 and receives the two-channel representation of the source range matching with the two-channel ID for the target range input into the frequency tile generator at 835. Thus, when the two-channel ID for the target range indicates joint stereo processing, then the frequency tile generator 836 accesses the storage 834 in order to obtain the joint stereo representation of the source range indicated by the source range ID 833.

The frequency tile generator 836 performs this operation for each target range and the output of the frequency tile generator is so that each channel of the channel representation identified by the two-channel identification is present. Then, an envelope adjustment by an envelope adjuster 838 is performed. The envelope adjustment is performed in the two-channel domain identified by the two-channel identification. To this end, envelope adjustment parameters are necessitated and these parameters are either transmitted from the encoder to the decoder in the same two-channel representation as described. When, the two-channel identification in the target range to be processed by the envelope adjuster has a two-channel identification indicating a different two-channel representation than the envelope data for this target range, then a parameter transformer 840 transforms the envelope parameters into the necessitated two-channel representation. When, for example, the two-channel identification for one band indicates joint stereo coding and when the parameters for this target range have been transmitted as L/R envelope parameters, then the parameter transformer calculates the joint stereo envelope parameters from the L/R envelope parameters as described so that the correct parametric representation is used for the spectral envelope adjustment of a target range.

In another embodiment the envelope parameters are already transmitted as joint stereo parameters when joint stereo is used in a target band.

When it is assumed that the input into the envelope adjuster 838 is a set of target ranges having different two-channel representations, then the output of the envelope adjuster 838 is a set of target ranges in different two-channel representations as well. When, a target range has a joined representation such as M/S, then this target range is processed by a representation transformer 842 for calculating the separate representation necessitated for a storage or transmission to loudspeakers. When, however, a target range already has a separate representation, signal flow 844 is taken and the representation transformer 842 is bypassed. At the output of block 842, a two-channel spectral representation being a separate two-channel representation is obtained which can then be further processed as indicated by block 846, where this further processing may, for example, be a frequency/time conversion or any other necessitated processing.

Advantageously, the second spectral portions correspond to frequency bands, and the two-channel identification is provided as an array of flags corresponding to the table of FIG. 8*b*, where one flag for each frequency band exists. Then, the parametric decoder is configured to check whether the flag is set or not and to control the frequency regenerator 106 in accordance with a flag to use either a first representation or a second representation of the first spectral portion.

In an embodiment, only the reconstruction range starting with the IGF start frequency 309 of FIG. 3*a* has two-channel identifications for different reconstruction bands. In a further embodiment, this is also applied for the frequency range below the IGF start frequency 309.

In a further embodiment, the source band identification and the target band identification can be adaptively determined by a similarity analysis. However, the inventive two-channel processing can also be applied when there is a fixed association of a source range to a target range. A source range can be used for recreating a, with respect to frequency, broader target range either by a harmonic frequency tile filling operation or a copy-up frequency tile filling operation using two or more frequency tile filling operations similar to the processing for multiple patches known from high efficiency AAC processing.

Figure 8E:
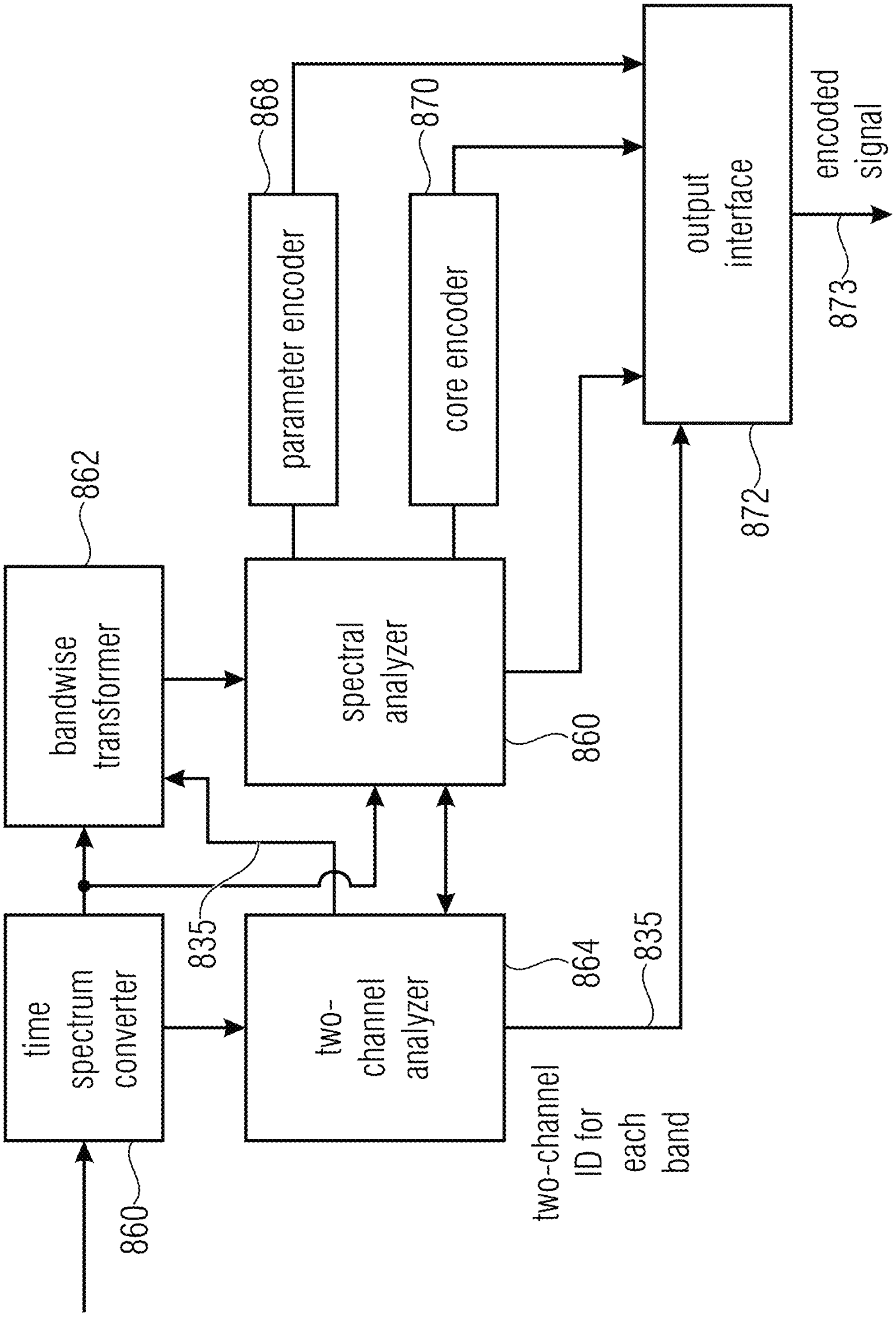
FIG. 8*e* illustrates an implementation of an encoder for the two-channel processing to be decoded by the decoder of FIG. 8*a:*

FIG. 8*e* illustrates an audio encoder for encoding a two-channel audio signal. The encoder comprises a time-spectrum converter 860 for converting the two-channel audio signal into spectral representation. Furthermore, a spectral analyzer 866 for converting the two-channel audio channel audio signal into a spectral representation. Furthermore, a spectral analyzer 866 is provided for performing an analysis in order to determine, which spectral portions are to be encoded with a high resolution, i.e., to find out the first set of first spectral portions and to additionally find out the second set of second spectral portions.

Furthermore, a two-channel analyzer 864 is provided for analyzing the second set of second spectral portions to determine a two-channel identification identifying either a first two-channel representation or a second two-channel representation.

Depending on the result of the two-channel analyzer, a band in the second spectral representation is either parameterized using the first two-channel representation or the second two-channel representation, and this is performed by a parameter encoder 868. The core frequency range, i.e., the frequency band below the IGF start frequency 309 of FIG. 3*a* is encoded by a core encoder 870. The result of blocks 868 and 870 are input into an output interface 872. As indicated, the two-channel analyzer provides a two-channel identification for each band either above the IGF start frequency or for the whole frequency range, and this two-channel identification is also forwarded to the output interface 872 so that this data is also included in an encoded signal 873 output by the output interface 872.

Furthermore, it is advantageous that the audio encoder comprises a bandwise transformer 862. Based on the decision of the two-channel analyzer 862, the output signal of the time spectrum converter 862 is transformed into a representation indicated by the two-channel analyzer and, particularly, by the two-channel ID 835. Thus, an output of the bandwise transformer 862 is a set of frequency bands where each frequency band can either be in the first two-channel representation or the second different two-channel representation. When the present invention is applied in full band, i.e., when the source range and the reconstruction range are both processed by the bandwise transformer, the spectral analyzer 860 can analyze this representation. Alternatively, however, the spectral analyzer 860 can also analyze the signal output by the time spectrum converter as indicated by control line 861. Thus, the spectral analyzer 860 can either apply the tonality analysis on the output of the bandwise transformer 862 or the output of the time spectrum converter 860 before having been processed by the bandwise transformer 862. Furthermore, the spectral analyzer can apply the identification of the best matching source range for a certain target range either on the result of the bandwise transformer 862 or on the result of the time-spectrum converter 860.

Subsequently, reference is made to FIGS. 9*a* to 9*d* for illustrating a calculation of the energy information values already discussed in the context of FIG. 3*a* and FIG. 3*b*.

Modern state of the art audio coders apply various techniques to minimize the amount of data representing a given audio signal. Audio coders like USAC [1] apply a time to frequency transformation like the MDCT to get a spectral representation of a given audio signal. These MDCT coefficients are quantized exploiting the psychoacoustic aspects of the human hearing system. If the available bitrate is decreased the quantization gets coarser introducing large numbers of zeroed spectral values which lead to audible artifacts at the decoder side. To improve the perceptual quality, state of the art decoders fill these zeroed spectral parts with random noise. The IGF method harvests tiles from the remaining non zero signal to fill those gaps in the spectrum. It is crucial for the perceptual quality of the decoded audio signal that the spectral envelope and the energy distribution of spectral coefficients are preserved. The energy adjustment method presented here uses transmitted side information to reconstruct the spectral MDCT envelope of the audio signal.

Within eSBR [15] the audio signal is downsampled at least by a factor of two and the high frequency part of the spectrum is completely zeroed out [1, 17]. This deleted part is replaced by parametric techniques, eSBR, on the decoder side. eSBR implies the usage of an additional transform, the QMF transformation which is used to replace the empty high frequency part and to resample the audio signal [17]. This adds both computational complexity and memory consumption to an audio coder.

The USAC coder [15] offers the possibility to fill spectral holes (zeroed spectral lines) with random noise but has the following downsides: random noise cannot preserve the temporal fine structure of a transient signal and it cannot preserve the harmonic structure of a tonal signal.

The area where eSBR operates on the decoder side was completely deleted by the encoder [1]. Therefore eSBR is prone to delete tonal lines in high frequency region or distort harmonic structures of the original signal. As the QMF frequency resolution of eSBR is very low and reinsertion of sinusoidal components is only possible in the coarse resolution of the underlying filterbank, the regeneration of tonal components in eSBR in the replicated frequency range has very low precision.

eSBR uses techniques to adjust energies of patched areas, the spectral envelope adjustment [1]. This technique uses transmitted energy values on a QMF frequency time grid to reshape the spectral envelope. This state of the art technique does not handle partly deleted spectra and because of the high time resolution it is either prone to need a relatively large amount of bits to transmit appropriate energy values or to apply a coarse quantization to the energy values.

The method of IGF does not need an additional transformation as it uses the legacy MDCT transformation which is calculated as described in [15].

The energy adjustment method presented here uses side information generated by the encoder to reconstruct the spectral envelope of the audio signal. This side information is generated by the encoder as outlined below:

a) Apply a windowed MDCT transform to the input audio signal [16, section 4.6], optionally calculate a windowed MDST, or estimate a windowed MDST from the calculated MDCT b) Apply TNS/TTS on the MDCT coefficients [15, section 7.8]

c) Calculate the average energy for every MDCT scale factor band above the IGF start frequency ($f_{IGFstart}$) up to IGF stop frequency ($f_{IGFstop}$)

d) Quantize the average energy values $f_{IGFstart}$ and $f_{IGFstop}$ are user given parameters.

The calculated values from step c) and d) are lossless encoded and transmitted as side information with the bit stream to the decoder.

The decoder receives the transmitted values and uses them to adjust the spectral envelope.

a) Dequantize transmitted MDCT values b) Apply legacy USAC noise filling if signaled c) Apply IGF tile filling d) Dequantize transmitted energy values e) Adjust spectral envelope scale factor band wise f) Apply TNS/TTS if signaled Let $\hat{x} \in \mathbb{R}^N$ be the MDCT transformed, real valued spectral representation of a windowed audio signal of window-length 2N. This transformation is described in [16]. The encoder optionally applies TNS on $\hat{x}$.

In [16, 4.6.2] a partition of $\hat{x}$ in scale-factor bands is described. Scale-factor bands are a set of a set of indices and are denoted in this text with scb.

The limits of each $scb_k$ with k=0, 1, 2, . . . max_sfb are defined by an array swb_offset (16, 4.6.2), where swb_offset [k] and swb_offset[k+1]−1 define first and last index for the lowest and highest spectral coefficient line contained in $scb_k$. We denote the scale-factor band $$scb_k := \{swb\_offset[k], 1+swb\_offset[k], 2+swb\_offset[k], \ldots, swb\_offset[k+1]-1\}$$

If the IGF tool is used by the encoder, the user defines an IGF start frequency and an IGF stop frequency. These two values are mapped to the best fitting scale-factor band index igfStartSfb and igfStopSfb. Both are signaled in the bit stream to the decoder.

[16] describes both a long block and short block transformation. For long blocks only one set of spectral coefficients together with one set of scale-factors is transmitted to the decoder. For short blocks eight short windows with eight different sets of spectral coefficients are calculated. To save bitrate, the scale-factors of those eight short block windows are grouped by the encoder.

In case of IGF the method presented here uses legacy scale factor bands to group spectral values which are transmitted to the decoder:

$$E_k = \sqrt{\frac{1}{|scb_k|}\sum_{i \in scb_k} \hat{x}_i^2}$$

Where $k = igfStartSfb, 1 + igfStartSfb, 2 + igfStartSfb, \ldots, igfEndSfb$.

For quantizing $$\hat{E}_k = nINT(4 \log_2(E_k))$$

is calculated. All values $\hat{E}_k$ are transmitted to the decoder.

We assume that the encoder decides to group num_window_group scale-factor sets. We denote with w this grouping-partition of the set {0, 1, 2, . . . , 7} which are the indices of the eight short windows. $w_l$ denotes the l-th subset of w, where l denotes the index of the window group, 0≤l<num_window_group.

For short block calculation the user defined IGF start/stop frequency is mapped to appropriate scale-factor bands. However, for simplicity one denotes for short blocks k=igfStartSfb, 1+igfStartSfb, 2+igfStartSfb, . . . , igfEndSfb as well.

The IGF energy calculation uses the grouping information to group the values $E_{k,l}$:

$$E_{k,l} := \sqrt{\frac{1}{|w_l|}\sum_{j \in w_l}\frac{1}{|scb_k|}\sum_{i \in scb_k} \hat{x}_{j,i}^2}$$

For quantizing $$\hat{E}_{k,l} = nINT(4 \log_2(E_{k,l}))$$

is calculated. All values $\hat{E}_{k,l}$ are transmitted to the decoder.

The above-mentioned encoding formulas operate using only real-valued MDCT coefficients $\hat{x}$. To obtain a more stable energy distribution in the IGF range, that is, to reduce temporal amplitude fluctuations, an alternative method can be used to calculate the values $\hat{E}_k$:

Let $\hat{x}_r \in \mathbb{R}^N$ be the MDCT transformed, real valued spectral representation of a windowed audio signal of window-length 2N, and $\hat{x}_i \in \mathbb{R}^N$ the real valued MDST transformed spectral representation of the same portion of the audio signal. The MDST spectral representation $\hat{x}_i$ could be either calculated exactly or estimated from $\hat{x}_r$. $\hat{c} := (\hat{x}_r, \hat{x}_i) \in \mathbb{C}^N$ denotes the complex spectral representation of the windowed audio signal, having $\hat{x}_r$ as its real part and $\hat{x}_i$ as its imaginary part. The encoder optionally applies TNS on $\hat{x}_r$ and $\hat{x}_i$.

Now the energy of the original signal in the IGF range can be measured with $$E_{ok} = \frac{1}{|scb_k|}\sum_{i \in scb_k} \hat{c}_i^2$$

The real- and complex-valued energies of the reconstruction band, that is, the tile which should be used on the decoder side in the reconstruction of the IGF range $scb_k$, is calculated with:

$$E_{tk} = \frac{1}{|scb_k|}\sum_{i \in tr_k} \hat{c}_i^2,\ E_{rk} = \frac{1}{|scb_k|}\sum_{i \in tr_k} \hat{x}_{r_i}^2$$

where $tr_k$ is a set of indices—the associated source tile range, in dependency of $scb_k$. In the two formulae above, instead of the index set $scb_k$, the set $\overline{scb_k}$ (defined later in this text) could be used to create $tr_k$ to achieve more accurate values $E_t$ and $E_r$.

Calculate $$f_k = \frac{E_{ok}}{E_{tk}}$$

if $E_{tk}>0$, else $f_k=0$.

With $$E_k=\sqrt{f_k E_{rk}}$$

now a more stable version of $E_k$ is calculated, since a calculation of $E_k$ with MDCT values only is impaired by the fact that MDCT values do not obey Parseval's theorem, and therefore they do not reflect the complete energy information of spectral values. $\hat{E}_k$ is calculated as above.

As noted earlier, for short blocks we assume that the encoder decides to group num_window_group scale-factor sets. As above, $w_l$ denotes the l-th subset of w, where l denotes the index of the window group, 0≤l<num_ window_ group.

Again, the alternative version outlined above to calculate a more stable version of $E_{k,l}$ could be calculated. With the defines of $\hat{c}:=(\hat{x}_r,\hat{x}_i)\in\mathbb{C}^N$, $\hat{x}_r\in\mathbb{R}^N$ being the MDCT transformed and $\hat{x}_i\in\mathbb{R}^N$ being the MDST transformed windowed audio signal of length 2N, calculate $$E_{ok,1}=\frac{1}{|w_l|}\sum_{l\in w_l}\frac{1}{|scb_k|}\sum_{i\in scb_k}\hat{c}_{i,l}^2$$

Analogously calculate $$E_{tk,l}=\frac{1}{|w_l|}\sum_{l\in w_l}\frac{1}{|scb_k|}\sum_{i\in tr_k}\hat{c}_{i,l}^2,\ E_{rk,l}=\frac{1}{|w_l|}\sum_{l\in w_l}\frac{1}{|scb_k|}\sum_{i\in tr_k}\hat{x}_{r,l}^2$$

and proceed with the factor $f_{k,l}$ $$f_{k,l}=\frac{E_{ok,l}}{E_{tk,l}}$$

which is used to adjust the previously calculated $E_{rk,l}$:

$$E_{k,l}=\sqrt{f_{k,l}E_{rk,l}}$$

$\hat{E}_{k,l}$ is calculated as above.

The procedure of not only using the energy of the reconstruction band either derived from the complex reconstruction band or from the MDCT values, but also using an energy information from the source range provides an improver energy reconstruction.

Specifically, the parameter calculator 1006 is configured to calculate the energy information for the reconstruction band using information on the energy of the reconstruction band and additionally using information on an energy of a source range to be used for reconstructing the reconstruction band.

Furthermore, the parameter calculator 1006 is configured to calculate an energy information ($E_{ok}$) on the reconstruction band of a complex spectrum of the original signal, to calculate a further energy information ($E_{rk}$) on a source range of a real valued part of the complex spectrum of the original signal to be used for reconstructing the reconstruction band, and wherein the parameter calculator is configured to calculate the energy information for the reconstruction band using the energy information ($E_{ok}$) and the further energy information ($E_{rk}$).

Furthermore, the parameter calculator 1006 is configured for determining a first energy information ($E_{ok}$) on a to be reconstructed scale factor band of a complex spectrum of the original signal, for determining a second energy information ($E_{tk}$) on a source range of the complex spectrum of the original signal to be used for reconstructing the to be reconstructed scale factor band, for determining a third energy information ($E_{rk}$) on a source range of a real valued part of the complex spectrum of the original signal to be used for reconstructing the to be reconstructed scale factor band, for determining a weighting information based on a relation between at least two of the first energy information, the second energy information, and the third energy information, and for weighting one of the first energy information and the third energy information using the weighting information to obtain a weighted energy information and for using the weighted energy information as the energy information for the reconstruction band.

Examples for the calculations are the following, but many other may appear to those skilled in the art in view of the above general principle:

A)

*f_k=E_ok/E_tk;*

*E_k*=sqrt(*f_k***E_rk*);

B)

*f_k=E_tk/E_ok;*

*E_k*=sqrt((1/*f_k*)**E_rk*);

C)

*f_k=E_rk/E_tk;*

*E_k*=sqrt(*f_k***E_ok*)

D)

*f_k=E_tk/E_rk;*

*E_k*=sqrt((1/*f_k*)**E_ok*)

All these examples acknowledge the fact that although only real MDCT values are processed on the decoder side, the actual calculation is—due to the overlap and add—of the time domain aliasing cancellation procedure implicitly made using complex numbers. However, particularly, the determination 918 of the tile energy information of the further spectral portions 922, 923 of the reconstruction band 920 for frequency values different from the first spectral portion 921 having frequencies in the reconstruction band 920 relies on real MDCT values. Hence, the energy information transmitted to the decoder will typically be smaller than the energy information $E_{ok}$ on the reconstruction band of the complex spectrum of the original signal. For example for case C above, this means that the factor f_k (weighting information) will be smaller than 1.

On the decoder side, if the IGF tool is signaled as ON, the transmitted values $\hat{E}_k$ are obtained from the bit stream and shall be dequantized with $$E_k=2^{\frac{1}{4}\hat{E}_k}$$

for all k=igfStartSfb, 1+igfStartSfb, 2+igfStartSfb, . . . , igfEndSfb.

A decoder dequantizes the transmitted MDCT values to $x \in \mathbb{R}^N$ and calculates the remaining survive energy:

$$sE_k := \sum_{i \in scb_k} x_i^2$$

where k is in the range as defined above.

We denote $\overline{scb_k} = \{i \mid i \in scb_k \wedge x_i = 0\}$. This set contains all indices of the scale-factor band $scb_k$ which have been quantized to zero by the encoder.

The IGF get subband method (not described here) is used to fill spectral gaps resulting from a coarse quantization of MDCT spectral values at encoder side by using non zero values of the transmitted MDCT. x will additionally contain values which replace all previous zeroed values. The tile energy is calculated by:

$$tE_k := \sum_{i \in \overline{scb_k}} x_i^2$$

where k is in the range as defined above.

The energy missing in the reconstruction band is calculated by:

$$mE_k := |scb_k| E_k^2 - sE_k$$

And the gain factor for adjustment is obtained by:

$$g := \begin{cases} \sqrt{\frac{mE_k}{tE_k}} & \text{if } (mE_k > 0 \wedge tE_k > 0) \\ 0 & \text{else} \end{cases}$$

With $$g' = \min(g, 10)$$

The spectral envelope adjustment using the gain factor is:

$$x_i := g' x_i$$

for all $i \in \overline{scb_k}$ and k is in the range as defined above.

This reshapes the spectral envelope of x to the shape of the original spectral envelope $\hat{x}$.

With short window sequence all calculations as outlined above stay in principle the same, but the grouping of scale-factor bands are taken into account. We denote as $E_{k,l}$ the dequantized, grouped energy values obtained from the bit stream. Calculate $$sE_{k,l} := \frac{1}{|w_l|} \sum_{j \in w_l} \sum_{i \in scb_{j,k}} x_{j,i}^2$$

and $$pE_{k,l} := \frac{1}{|w_l|} \sum_{j \in w_l} \sum_{i \in \overline{scb_{j,k}}} x_{j,i}^2$$

The index j describes the window index of the short block sequence.

Calculate $$mE_{k,l} := |scb_k| E_{k,l}^2 - sE_{k,l}$$

And $$g := \begin{cases} \sqrt{\frac{mE_{k,l}}{pE_{k,l}}} & \text{if } (mE_{k,l} > 0 \wedge pE_{k,l} > 0) \\ 0 & \text{else} \end{cases}$$

With $$g' = \min(g, 10)$$

Apply $$x_{j,i} := g' x_{j,i}$$

for all $i \in \overline{scb_{k,l}}$

For low bitrate applications a pairwise grouping of the values $E_k$ is possible without losing too much precision. This method is applied only with long blocks:

$$E_{k \gg 1} = \sqrt{\frac{1}{|scb_k \cup scb_{k+1}|} \sum_{i \in scb_k \cup scb_{k+1}} \hat{x}_i^2}$$

Again, after quantizing all values $E_{k>>1}$ are transmitted to the decoder.

Figure 9A:
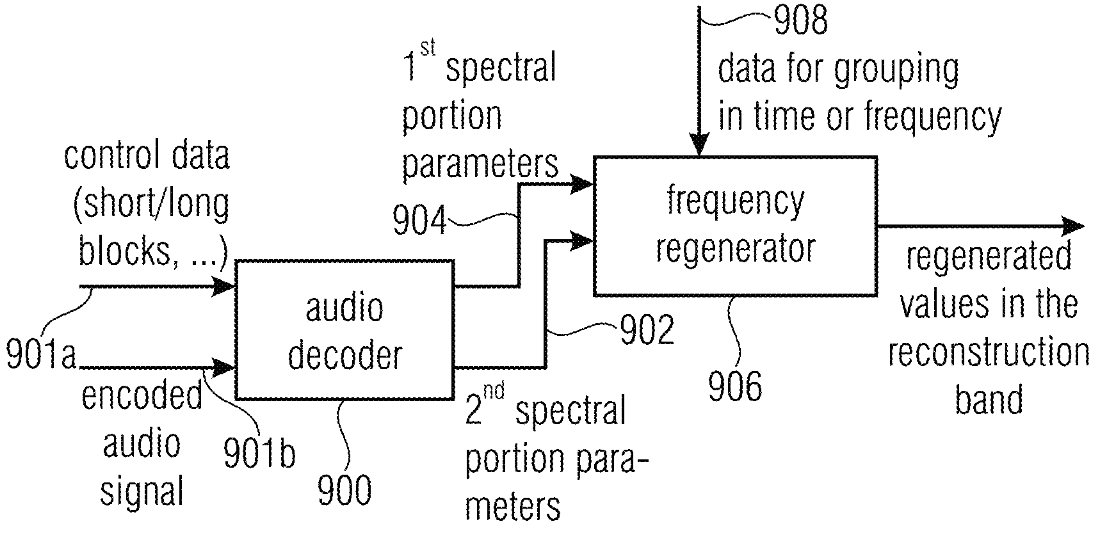
FIG. 9*a* illustrates a decoder with frequency regeneration technology using energy values for the regeneration frequency range.
Figure 9B:
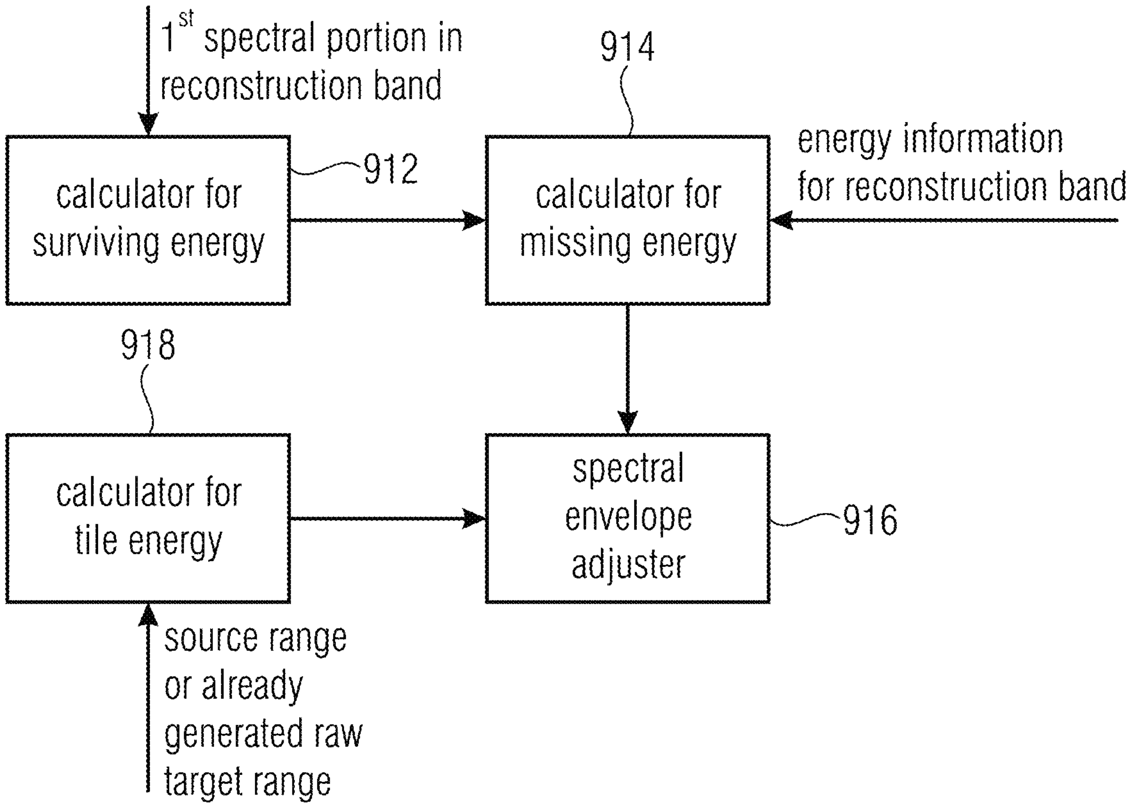
FIG. 9*b* illustrates a more detailed implementation of the frequency regenerator of FIG. 9*a;*

FIG. 9*a* illustrates an apparatus for decoding an encoded audio signal comprising an encoded representation of a first set of first spectral portions and an encoded representation of parametric data indicating spectral energies for a second set of second spectral portions. The first set of first spectral portions is indicated at 901*a* in FIG. 9*a*, and the encoded representation of the parametric data is indicated at 901*b* in FIG. 9*a*. An audio decoder 900 is provided for decoding the encoded representation 901*a* of the first set of first spectral portions to obtain a decoded first set of first spectral portions 904 and for decoding the encoded representation of the parametric data to obtain a decoded parametric data 902 for the second set of second spectral portions indicating individual energies for individual reconstruction bands, where the second spectral portions are located in the reconstruction bands. Furthermore, a frequency regenerator 906 is provided for reconstructing spectral values of a reconstruction band comprising a second spectral portion. The frequency regenerator 906 uses a first spectral portion of the first set of first spectral portions and an individual energy information for the reconstruction band, where the reconstruction band comprises a first spectral portion and the second spectral portion. The frequency regenerator 906 comprises a calculator 912 for determining a survive energy information comprising an accumulated energy of the first spectral portion having frequencies in the reconstruction band. Furthermore, the frequency regenerator 906 comprises a calculator 918 for determining a tile energy information of further spectral portions of the reconstruction band and for frequency values being different from the first spectral portion, where these frequency values have frequencies in the reconstruction band, wherein the further spectral portions are to be generated by frequency regeneration using a first spectral portion different from the first spectral portion in the reconstruction band.

The frequency regenerator 906 further comprises a calculator 914 for a missing energy in the reconstruction band, and the calculator 914 operates using the individual energy for the reconstruction band and the survive energy generated by block 912. Furthermore, the frequency regenerator 906 comprises a spectral envelope adjuster 916 for adjusting the further spectral portions in the reconstruction band based on the missing energy information and the tile energy information generated by block 918.

Reference is made to FIG. 9*c* illustrating a certain reconstruction band 920. The reconstruction band comprises a first spectral portion in the reconstruction band such as the first spectral portion 306 in FIG. 3*a* schematically illustrated at 921. Furthermore, the rest of the spectral values in the reconstruction band 920 are to be generated using a source region, for example, from the scale factor band 1, 2, 3 below the intelligent gap filling start frequency 309 of FIG. 3*a*. The frequency regenerator 906 is configured for generating raw spectral values for the second spectral portions 922 and 923. Then, a gain factor g is calculated as illustrated in FIG. 9*c* in order to finally adjust the raw spectral values in frequency bands 922, 923 in order to obtain the reconstructed and adjusted second spectral portions in the reconstruction band 920 which now have the same spectral resolution, i.e., the same line distance as the first spectral portion 921. It is important to understand that the first spectral portion in the reconstruction band illustrated at 921 in FIG. 9*c* is decoded by the audio decoder 900 and is not influenced by the envelope adjustment performed block 916 of FIG. 9*b*. Instead, the first spectral portion in the reconstruction band indicated at 921 is left as it is, since this first spectral portion is output by the full bandwidth or full rate audio decoder 900 via line 904.

Subsequently, a certain example with real numbers is discussed. The remaining survive energy as calculated by block 912 is, for example, five energy units and this energy is the energy of the exemplarily indicated four spectral lines in the first spectral portion 921.

Furthermore, the energy value $E_3$ for the reconstruction band corresponding to scale factor band 6 of FIG. 3*b* or FIG. 3*a* is equal to 10 units. Importantly, the energy value not only comprises the energy of the spectral portions 922, 923, but the full energy of the reconstruction band 920 as calculated on the encoder-side, i.e., before performing the spectral analysis using, for example, the tonality mask. Therefore, the ten energy units cover the first and the second spectral portions in the reconstruction band. Then, it is assumed that the energy of the source range data for blocks 922, 923 or for the raw target range data for block 922, 923 is equal to eight energy units. Thus, a missing energy of five units is calculated.

Based on the missing energy divided by the tile energy tEk, a gain factor of 0.79 is calculated. Then, the raw spectral lines for the second spectral portions 922, 923 are multiplied by the calculated gain factor. Thus, only the spectral values for the second spectral portions 922, 923 are adjusted and the spectral lines for the first spectral portion 921 are not influenced by this envelope adjustment. Subsequent to multiplying the raw spectral values for the second spectral portions 922, 923, a complete reconstruction band has been calculated consisting of the first spectral portions in the reconstruction band, and consisting of spectral lines in the second spectral portions 922, 923 in the reconstruction band 920.

Advantageously, the source range for generating the raw spectral data in bands 922, 923 is, with respect to frequency, below the IGF start frequency 309 and the reconstruction band 920 is above the IGF start frequency 309.

Furthermore, it is advantageous that reconstruction band borders coincide with scale factor band borders. Thus, a reconstruction band has, in one embodiment, the size of corresponding scale factor bands of the core audio decoder or are sized so that, when energy pairing is applied, an energy value for a reconstruction band provides the energy of two or a higher integer number of scale factor bands. Thus, when is assumed that energy accumulation is performed for scale factor band 4, scale factor band 5 and scale factor band 6, then the lower frequency border of the reconstruction band 920 is equal to the lower border of scale factor band 4 and the higher frequency border of the reconstruction band 920 coincides with the higher border of scale factor band 6.

Figure 9D:
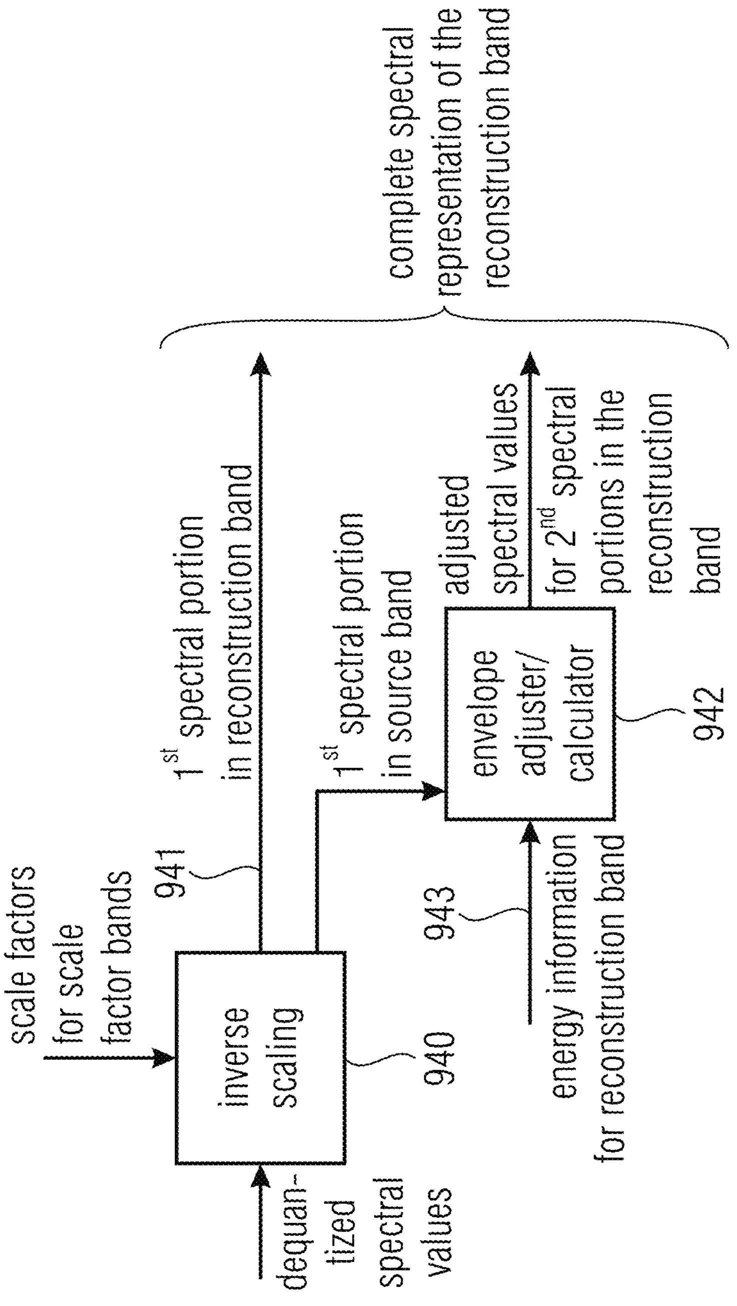
FIG. 9*d* illustrates a further implementation of the decoder of FIG. 9*a;*

Subsequently, FIG. 9*d* is discussed in order to show further functionalities of the decoder of FIG. 9*a*. The audio decoder 900 receives the dequantized spectral values corresponding to first spectral portions of the first set of spectral portions and, additionally, scale factors for scale factor bands such as illustrated in FIG. 3*b* are provided to an inverse scaling block 940. The inverse scaling block 940 provides all first sets of first spectral portions below the IGF start frequency 309 of FIG. 3*a* and, additionally, the first spectral portions above the IGF start frequency, i.e., the first spectral portions 304, 305, 306, 307 of FIG. 3*a* which are all located in a reconstruction band as illustrated at 941 in FIG. 9*d*. Furthermore, the first spectral portions in the source band used for frequency tile filling in the reconstruction band are provided to the envelope adjuster/calculator 942 and this block additionally receives the energy information for the reconstruction band provided as parametric side information to the encoded audio signal as illustrated at 943 in FIG. 9*d*. Then, the envelope adjuster/calculator 942 provides the functionalities of FIGS. 9*b* and 9*c* and finally outputs adjusted spectral values for the second spectral portions in the reconstruction band. These adjusted spectral values 922, 923 for the second spectral portions in the reconstruction band and the first spectral portions 921 in the reconstruction band indicated that line 941 in FIG. 9*d* jointly represent the complete spectral representation of the reconstruction band.

Subsequently, reference is made to FIGS. 10*a* to 10*b* for explaining embodiments of an audio encoder for encoding an audio signal to provide or generate an encoded audio signal. The encoder comprises a time/spectrum converter 1002 feeding a spectral analyzer 1004, and the spectral analyzer 1004 is connected to a parameter calculator 1006 on the one hand and an audio encoder 1008 on the other hand. The audio encoder 1008 provides the encoded representation of a first set of first spectral portions and does not cover the second set of second spectral portions. On the other hand, the parameter calculator 1006 provides energy information for a reconstruction band covering the first and second spectral portions. Furthermore, the audio encoder 1008 is configured for generating a first encoded representation of the first set of first spectral portions having the first spectral resolution, where the audio encoder 1008 provides scale factors for all bands of the spectral representation generated by block 1002. Additionally, as illustrated in FIG. 3*b*, the encoder provides energy information at least for reconstruction bands located, with respect to frequency, above the IGF start frequency 309 as illustrated in FIG. 3*a*. Thus, for reconstruction bands advantageously coinciding with scale factor bands or with groups of scale factor bands, two values are given, i.e., the corresponding scale factor from the audio encoder 1008 and, additionally, the energy information output by the parameter calculator 1006.

The audio encoder has scale factor bands with different frequency bandwidths, i.e., with a different number of spectral values. Therefore, the parametric calculator comprise a normalizer 1012 for normalizing the energies for the different bandwidth with respect to the bandwidth of the specific reconstruction band. To this end, the normalizer 1012 receives, as inputs, an energy in the band and a number of spectral values in the band and the normalizer 1012 then outputs a normalized energy per reconstruction/scale factor band.

Figure 10A:
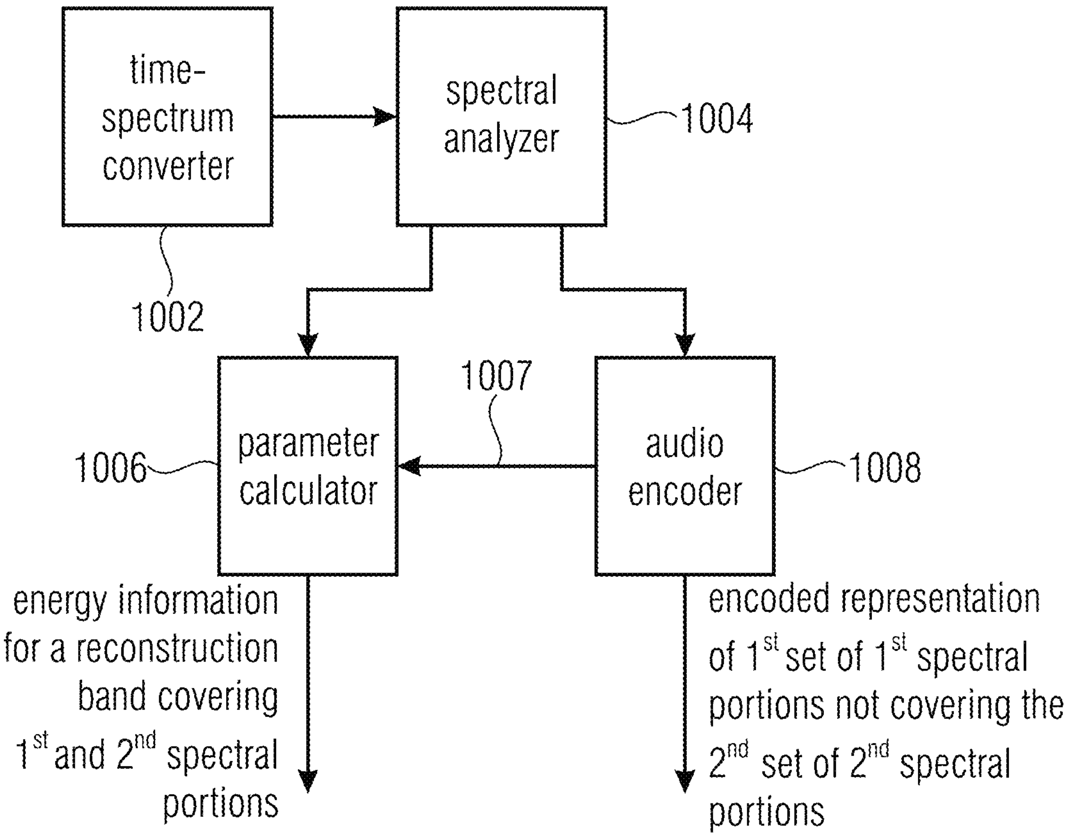
FIG. 10*a* illustrates a block diagram of an encoder matching with the decoder of FIG. 9*a;*
Figure 10B:
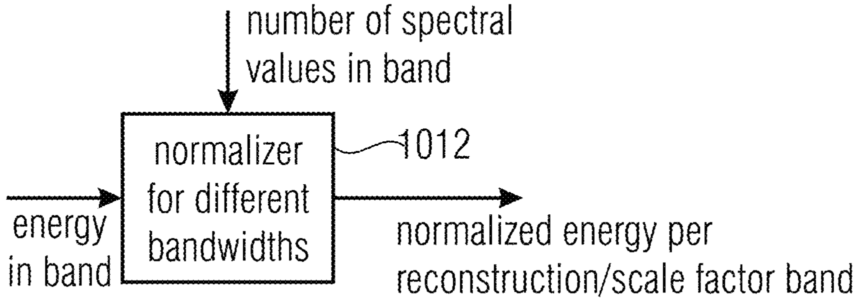
FIG. 10*b* illustrates a block diagram for illustrating a further functionality of the parameter calculator of FIG. 10*a;*
Figure 10C:
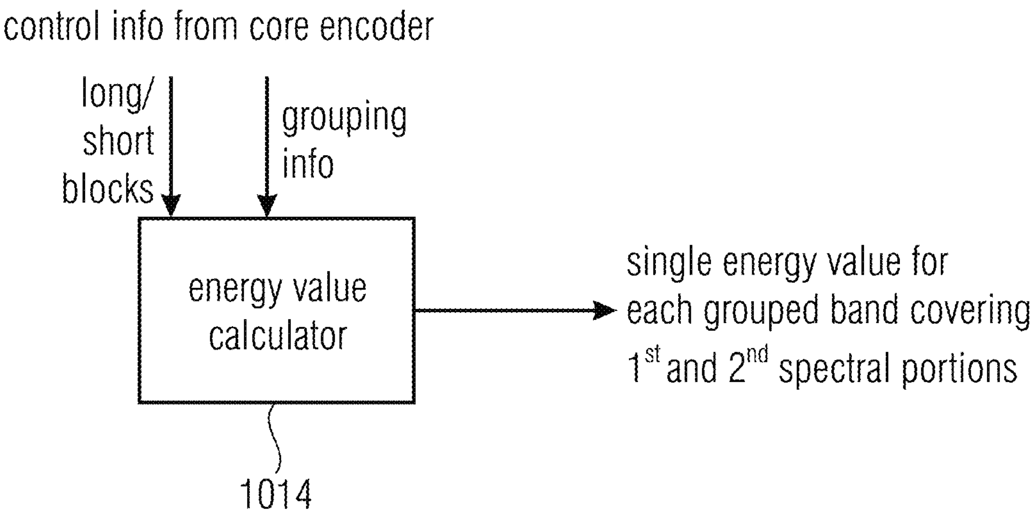
FIG. 10*c* illustrates a block diagram illustrating a further functionality of the parametric calculator of FIG. 10*a;*

Furthermore, the parametric calculator 1006*a* of FIG. 10*a* comprises an energy value calculator receiving control information from the core or audio encoder 1008 as illustrated by line 1007 in FIG. 10*a*. This control information may comprise information on long/short blocks used by the audio encoder and/or grouping information. Hence, while the information on long/short blocks and grouping information on short windows relate to a "time" grouping, the grouping information may additionally refer to a spectral grouping, i.e., the grouping of two scale factor bands into a single reconstruction band. Hence, the energy value calculator 1014 outputs a single energy value for each grouped band covering a first and a second spectral portion when only the spectral portions have been grouped.

Figure 10D:
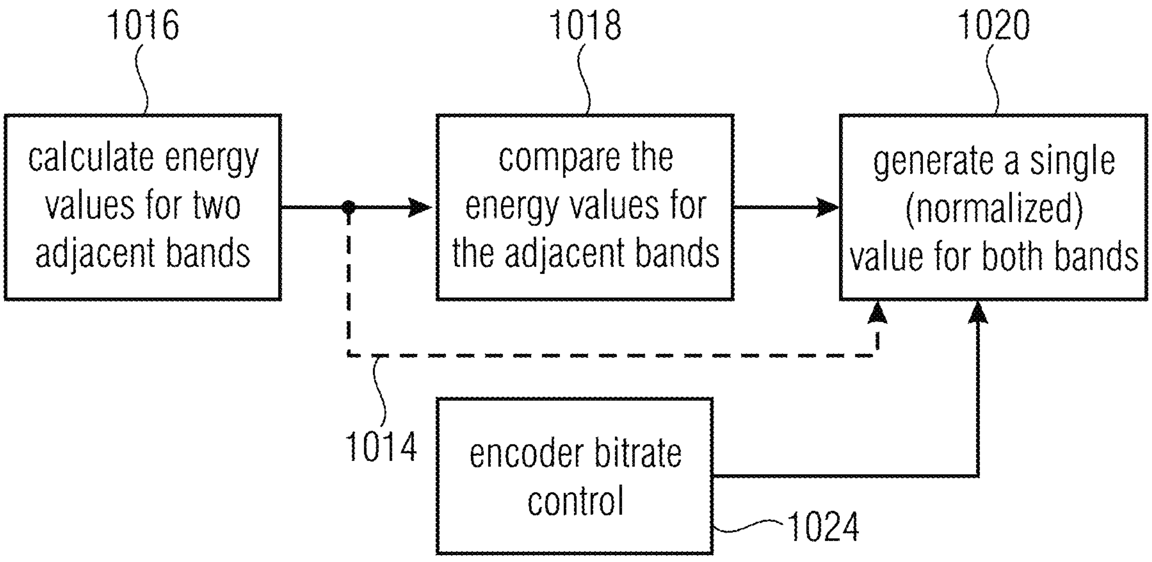
FIG. 10*d* illustrates a block diagram illustrating a further functionality of the parametric calculator of FIG. 10*a;*

FIG. 10*d* illustrates a further embodiment for implementing the spectral grouping. To this end, block 1016 is configured for calculating energy values for two adjacent bands. Then, in block 1018, the energy values for the adjacent bands are compared and, when the energy values are not so much different or less different than defined by, for example, a threshold, then a single (normalized) value for both bands is generated as indicated in block 1020. As illustrated by line 1019, the block 1018 can be bypassed. Furthermore, the generation of a single value for two or more bands performed by block 1020 can be controlled by an encoder bitrate control 1024. Thus, when the bitrate is to be reduced, the encoded bitrate control 1024 controls block 1020 to generate a single normalized value for two or more bands even though the comparison in block 1018 would not have been allowed to group the energy information values.

In case the audio encoder is performing the grouping of two or more short windows, this grouping is applied for the energy information as well. When the core encoder performs a grouping of two or more short blocks, then, for these two or more blocks, only a single set of scale factors is calculated and transmitted. On the decoder-side, the audio decoder then applies the same set of scale factors for both grouped windows.

Regarding the energy information calculation, the spectral values in the reconstruction band are accumulated over two or more short windows. In other words, this means that the spectral values in a certain reconstruction band for a short block and for the subsequent short block are accumulated together and only single energy information value is transmitted for this reconstruction band covering two short blocks. Then, on the decoder-side, the envelope adjustment discussed with respect to FIGS. 9*a* to 9*d* is not performed individually for each short block but is performed together for the set of grouped short windows.

The corresponding normalization is then again applied so that even though any grouping in frequency or grouping in time has been performed, the normalization easily allows that, for the energy value information calculation on the decoder-side, only the energy information value on the one hand and the amount of spectral lines in the reconstruction band or in the set of grouped reconstruction bands has to be known.

In state-of-the-art BWE schemes, the reconstruction of the HF spectral region above a given so-called cross-over frequency is often based on spectral patching. Typically, the HF region is composed of multiple adjacent patches and each of these patches is sourced from band-pass (BP) regions of the LF spectrum below the given cross-over frequency. Within a filterbank representation of the signal such systems copy a set of adjacent subband coefficients out of the LF spectrum into the target region. The boundaries of the selected sets are typically system dependent and not signal dependent. For some signal content, this static patch selection can lead to unpleasant timbre and coloring of the reconstructed signal.

Other approaches transfer the LF signal to the HF through a signal adaptive Single Side Band (SSB) modulation. Such approaches are of high computational complexity compared to [1] since they operate at high sampling rate on time domain samples. Also, the patching can get unstable, especially for non-tonal signals (e.g. unvoiced speech), and thereby state-of-the-art signal adaptive patching can introduce impairments into the signal.

The inventive approach is termed Intelligent Gap Filling (IGF) and, in its advantageous configuration, it is applied in a BWE system based on a time-frequency transform, like e.g. the Modified Discrete Cosine Transform (MDCT). Nevertheless, the teachings of the invention are generally applicable, e.g. analogously within a Quadrature Mirror Filterbank (QMF) based system.

An advantage of the IGF configuration based on MDCT is the seamless integration into MDCT based audio coders, for example MPEG Advanced Audio Coding (AAC). Sharing the same transform for waveform audio coding and for BWE reduces the overall computational complexity for the audio codec significantly.

Moreover, the invention provides a solution for the inherent stability problems found in state-of-the-art adaptive patching schemes.

The proposed system is based on the observation that for some signals, an unguided patch selection can lead to timbre changes and signal colorations. If a signal that is tonal in the spectral source region (SSR) but is noise-like in the spectral target region (STR), patching the noise-like STR by the tonal SSR can lead to an unnatural timbre. The timbre of the signal can also change since the tonal structure of the signal might get misaligned or even destroyed by the patching process.

The proposed IGF system performs an intelligent tile selection using cross-correlation as a similarity measure between a particular SSR and a specific STR. The cross-correlation of two signals provides a measure of similarity of those signals and also the lag of maximal correlation and its sign. Hence, the approach of a correlation based tile selection can also be used to precisely adjust the spectral offset of the copied spectrum to become as close as possible to the original spectral structure.

The fundamental contribution of the proposed system is the choice of a suitable similarity measure, and also techniques to stabilize the tile selection process. The proposed technique provides an optimal balance between instant signal adaption and, at the same time, temporal stability. The provision of temporal stability is especially important for signals that have little similarity of SSR and STR and therefore exhibit low cross-correlation values or if similarity measures are employed that are ambiguous. In such cases, stabilization prevents pseudo-random behavior of the adaptive tile selection.

Figure 12A:
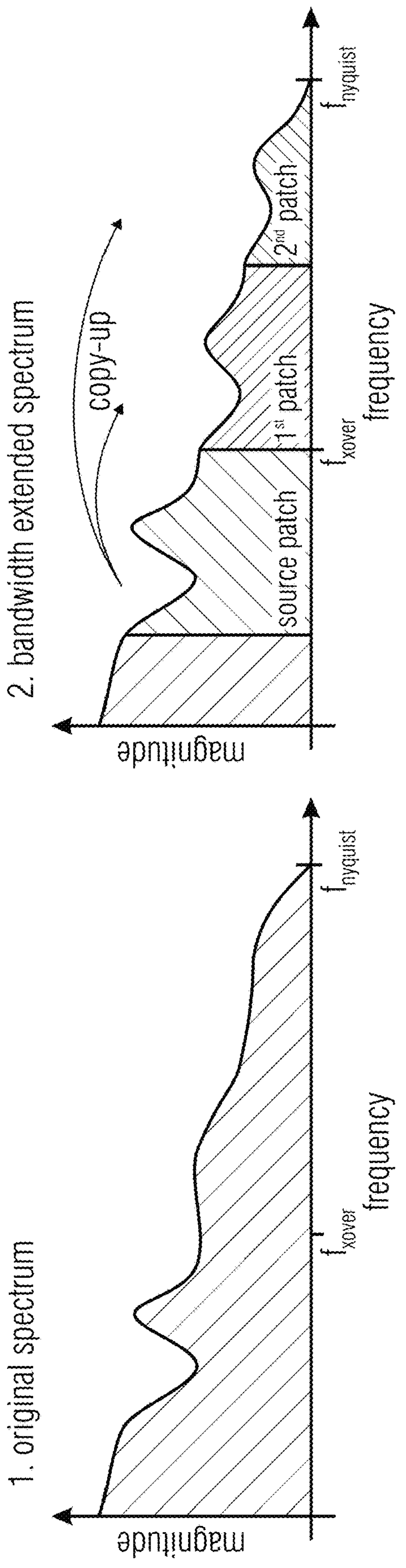
FIGS. 12*a* and 12*b* illustrate frequency sketches for illustrating a source range and a target range.

For example, a class of signals that often poses problems for state-of-the-art BWE is characterized by a distinct concentration of energy to arbitrary spectral regions, as shown in FIG. 12*a* (left). Although there are methods available to adjust the spectral envelope and tonality of the reconstructed spectrum in the target region, for some signals these methods are not able to preserve the timbre well as shown in FIG. 12*a* (right). In the example shown in FIG. 12*a*, the magnitude of the spectrum in the target region of the original signal above a so-called cross-over frequency $f_{xover}$ (FIG. 12*a*, left) decreases nearly linearly. In contrast, in the reconstructed spectrum (FIG. 12*a*, right), a distinct set of dips and peaks is present that is perceived as a timbre colorization artifact.

An important step of the new approach is to define a set of tiles amongst which the subsequent similarity based choice can take place. First, the tile boundaries of both the source region and the target region have to be defined in accordance with each other. Therefore, the target region between the IGF start frequency of the core coder $f_{IGFstart}$ and a highest available frequency $f_{IGFstop}$ is divided into an arbitrary integer number nTar of tiles, each of these having an individual predefined size. Then, for each target tile tar[idx_tar], a set of equal sized source tiles src[idx_src] is generated. By this, the basic degree of freedom of the IGF system is determined. The total number of source tiles nSrc is determined by the bandwidth of the source region, $$bw_{src}=(f_{IGFstart}-f_{IGFmin})$$

where $f_{IGFmin}$ is the lowest available frequency for the tile selection such that an integer number nSrc of source tiles fits into $bw_{src}$. The minimum number of source tiles is 0.

To further increase the degree of freedom for selection and adjustment, the source tiles can be defined to overlap each other by an overlap factor between 0 and 1, where 0 means no overlap and 1 means 100% overlap. The 100% overlap case implicates that only one or no source tiles is available.

Figure 12B:
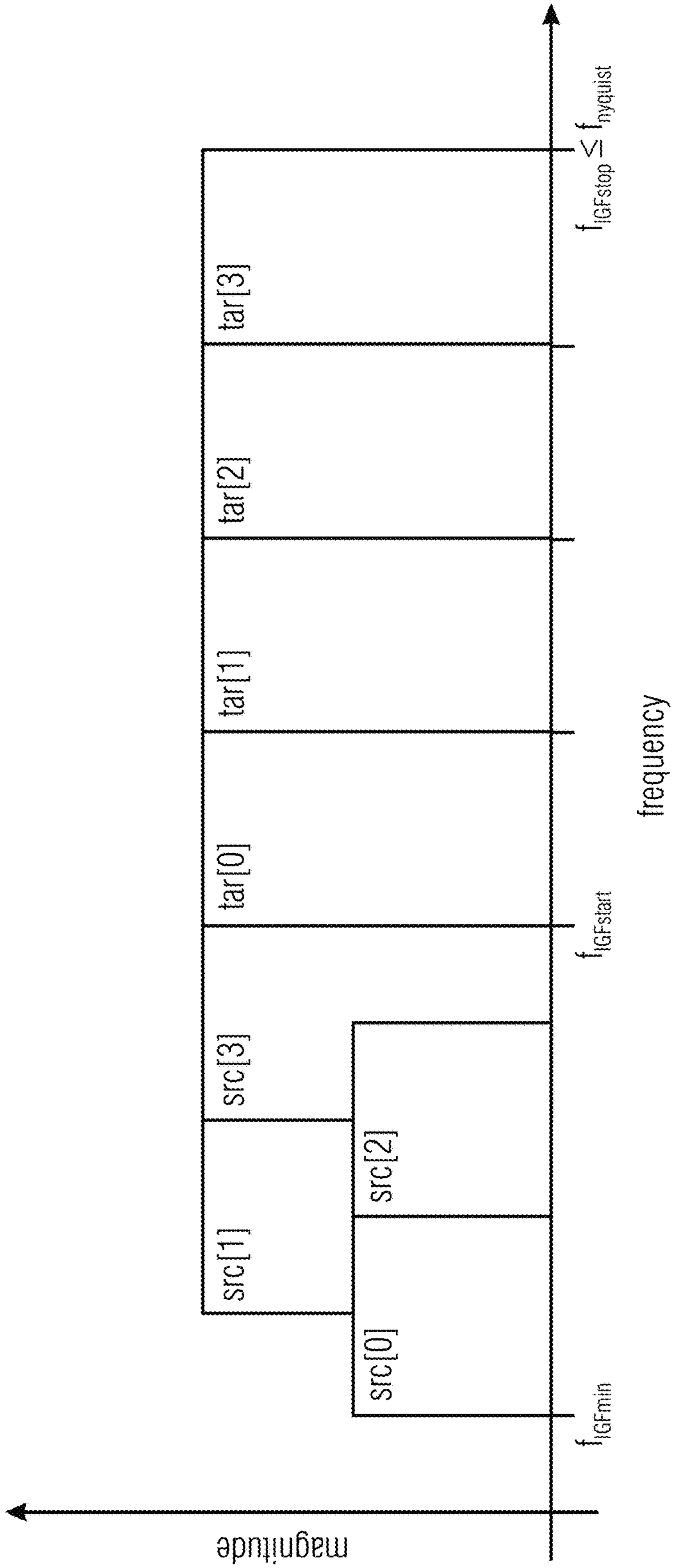

FIG. 12*b* shows an example of tile boundaries of a set of tiles. In this case, all target tiles are correlated with each of the source tiles. In this example, the source tiles overlap by 50%.

For a target tile, the cross correlation is computed with various source tiles at lags up xcorr_maxLag bins. For a given target tile idx_tar and a source tile idx_src, the xcorr_val[idx_tar][idx_src] gives the maximum value of the absolute cross correlation between the tiles, whereas xcorr_lag[idx_tar][idx_src] gives the lag at which this maximum occurs and xcorr_sign[idx_tar][idx_src] gives the sign of the cross correlation at xcorr_lag[idx_tar][idx_src].

The parameter xcorr_lag is used to control the closeness of the match between the source and target tiles. This parameter leads to reduced artifacts and helps better to preserve the timbre and color of the signal.

In some scenarios it may happen that the size of a specific target tile is bigger than the size of the available source tiles. In this case, the available source tile is repeated as often as needed to fill the specific target tile completely. It is still possible to perform the cross correlation between the large target tile and the smaller source tile in order to get the best position of the source tile in the target tile in terms of the cross correlation lag xcorr_lag and sign xcorr_sign.

The cross correlation of the raw spectral tiles and the original signal may not be the most suitable similarity measure applied to audio spectra with strong formant structure. Whitening of a spectrum removes the coarse envelope information and thereby emphasizes the spectral fine structure, which is of foremost interest for evaluating tile similarity. Whitening also aids in an easy envelope shaping of the STR at the decoder for the regions processed by IGF. Therefore, optionally, the tile and the source signal is whitened before calculating the cross correlation.

In other configurations, only the tile is whitened using a predefined procedure. A transmitted "whitening" flag indicates to the decoder that the same predefined whitening process shall be applied to the tile within IGF.

For whitening the signal, first a spectral envelope estimate is calculated. Then, the MDCT spectrum is divided by the spectral envelope. The spectral envelope estimate can be estimated on the MDCT spectrum, the MDCT spectrum energies, the MDCT based complex power spectrum or power spectrum estimates. The signal on which the envelope is estimated will be called base signal from now on.

Envelopes calculated on MDCT based complex power spectrum or power spectrum estimates as base signal have the advantage of not having temporal fluctuation on tonal components.

If the base signal is in an energy domain, the MDCT spectrum has to be divided by the square root of the envelope to whiten the signal correctly.

There are different methods of calculating the envelope:

- transforming the base signal with a discrete cosine transform (DCT), retaining only the lower DCT coefficients (setting the uppermost to zero) and then calculating an inverse DCT
- calculating a spectral envelope of a set of Linear Prediction Coefficients (LPC) calculated on the time domain audio frame
- filtering the base signal with a low pass filter Advantageously, the last approach is chosen. For applications that necessitate low computational complexity, some simplification can be done to the whitening of an MDCT spectrum: First the envelope is calculated by means of a moving average. This only needs two processor cycles per MDCT bin. Then in order to avoid the calculation of the division and the square root, the spectral envelope is approximated by $2^n$, where n is the integer logarithm of the envelope. In this domain the square root operation simply becomes a shift operation and furthermore the division by the envelope can be performed by another shift operation.

After calculating the correlation of each source tile with each target tile, for all nTar target tiles the source tile with the highest correlation is chosen for replacing it. To match the original spectral structure best, the lag of the correlation is used to modulate the replicated spectrum by an integer number of transform bins. In case of odd lags, the tile is additionally modulated through multiplication by an alternating temporal sequence of −1/1 to compensate for the frequency-reversed representation of every other band within the MDCT.

Figure 12C:
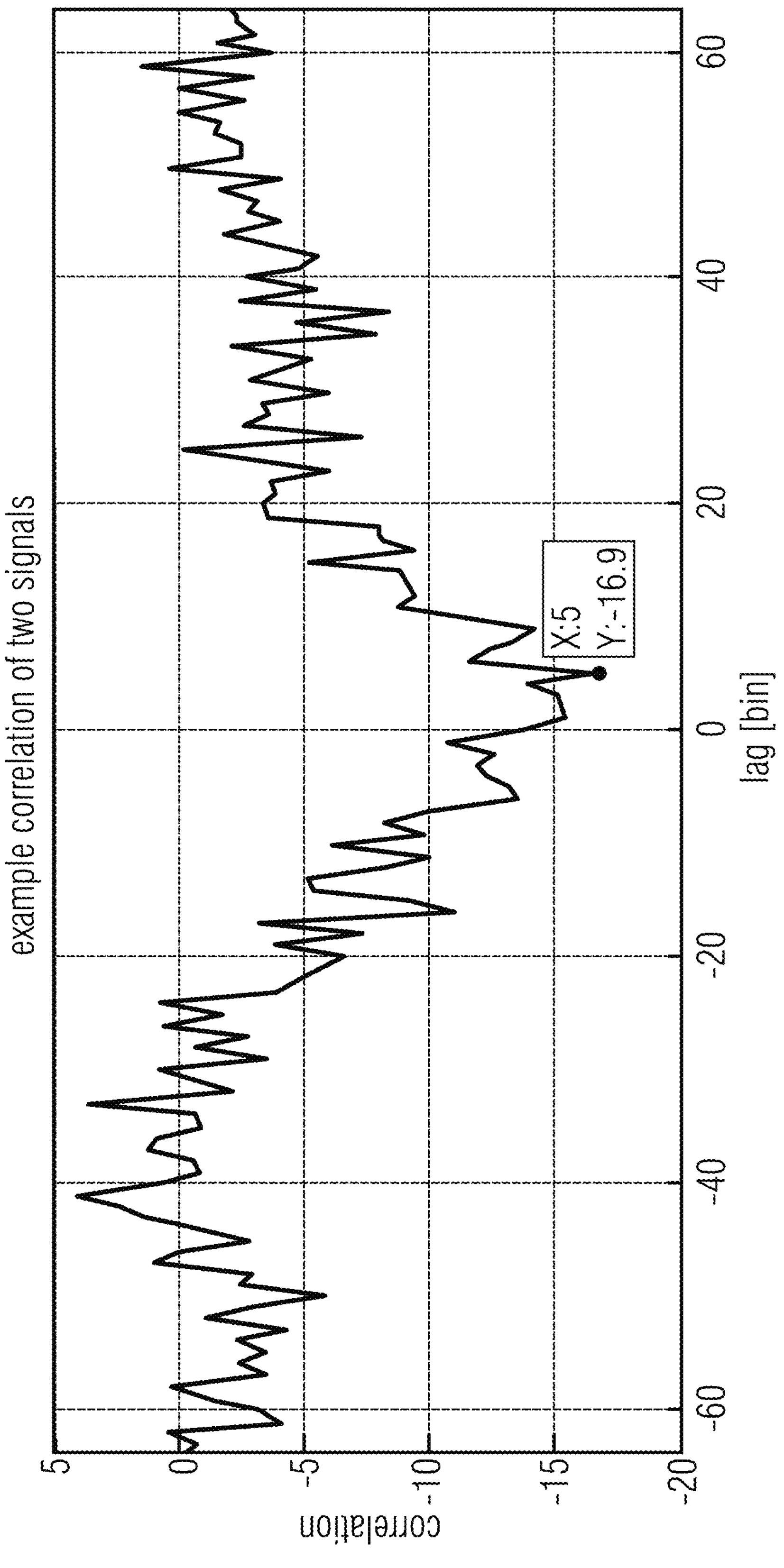
FIG. 12*c* illustrates a plot of an example correlation of two signals.

FIG. 12*c* shows an example of a correlation between a source tile and a target tile. In this example the lag of the correlation is 5, so the source tile has to be modulated by 5 bins towards higher frequency bins in the copy-up stage of the BWE algorithm. In addition, the sign of the tile has to be flipped as the maximum correlation value is negative and an additional modulation as described above accounts for the odd lag.

So the total amount of side information to transmit form the encoder to the decoder could consists of the following data:

- tileNum[nTar]: index of the selected source tile per target tile
- tileSign[nTar]:sign of the target tile
- tileMod[nTar]:lag of the correlation per target tile Tile pruning and stabilization is an important step in the IGF. Its need and advantages are explained with an example, assuming a stationary tonal audio signal like e.g. a stable pitch pipe note. Logic dictates that least artifacts are introduced if, for a given target region, source tiles are selected from the same source region across frames. Even though the signal is assumed to be stationary, this condition would not hold well in every frame since the similarity measure (e.g. correlation) of another equally similar source region could dominate the similarity result (e.g. cross correlation). This leads to tileNum[nTar] between adjacent frames to vacillate between two or three very similar choices. This can be the source of an annoying musical noise like artifact.

In order to eliminate this type of artifacts, the set of source tiles shall be pruned such that the remaining members of the source set are maximally dissimilar. This is achieved over a set of source tiles $$S=\{s_1,s_2, \ldots s_n\}$$

as follows. For any source tile $s_i$, we correlate it with all the other source tiles, finding the best correlation between $s_i$ and $s_j$ and storing it in a matrix $S_x$. Here $S_x[i][j]$ contains the maximal absolute cross correlation value between $s_i$ and $s_j$. Adding the matrix $S_x$ along the columns, gives us the sum of cross correlations of a source tile $s_i$ with all the other source tiles T.

$$T[i]=S_x[i][1]+S_x[i][2] \ldots +S_x[i][n]$$

Here T represents a measure of how well a source is similar to other source tiles. If, for any source tile i, $$T>\text{threshold}$$

source tile i can be dropped from the set of potential sources since it is highly correlated with other sources. The tile with the lowest correlation from the set of tiles that satisfy the condition in equation 1 is chosen as a representative tile for this subset. This way, we ensure that the source tiles are maximally dissimilar to each other.

The tile pruning method also involves a memory of the pruned tile set used in the preceding frame. Tiles that were active in the previous frame are retained in the next frame also if alternative candidates for pruning exist.

Let tiles $s_3$, $s_4$ and $s_5$ be active out of tiles $\{s_1, s_2 \ldots, s_3\}$ in frame k, then in frame k+1 even if tiles $s_1$, $s_3$ and $s_2$ are contending to be pruned with $s_3$ being the maximally correlated with the others, $s_3$ is retained since it was a useful source tile in the previous frame, and thus retaining it in the set of source tiles is beneficial for enforcing temporal continuity in the tile selection. This method is applied if the cross correlation between the source i and target j, represented as $T_x[i][j]$ is high An additional method for tile stabilization is to retain the tile order from the previous frame k−1 if none of the source tiles in the current frame k correlate well with the target tiles. This can happen if the cross correlation between the source i and target j, represented as $T_x[i][j]$ is very low for all i, j For example, if $$T_x[i][j]<0.6$$

a tentative threshold being used now, then $$\text{tileNum}[n\text{Tar}]_k=\text{tileNum}[n\text{Tar}]_{k-1}$$

for all nTar of this frame k.

The above two techniques greatly reduce the artifacts that occur from rapid changing set tile numbers across frames. Another added advantage of this tile pruning and stabilization is that no extra information needs to be sent to the decoder nor is a change of decoder architecture needed. This proposed tile pruning is an elegant way of reducing potential musical noise like artifacts or excessive noise in the tiled spectral regions.

Figure 11A:
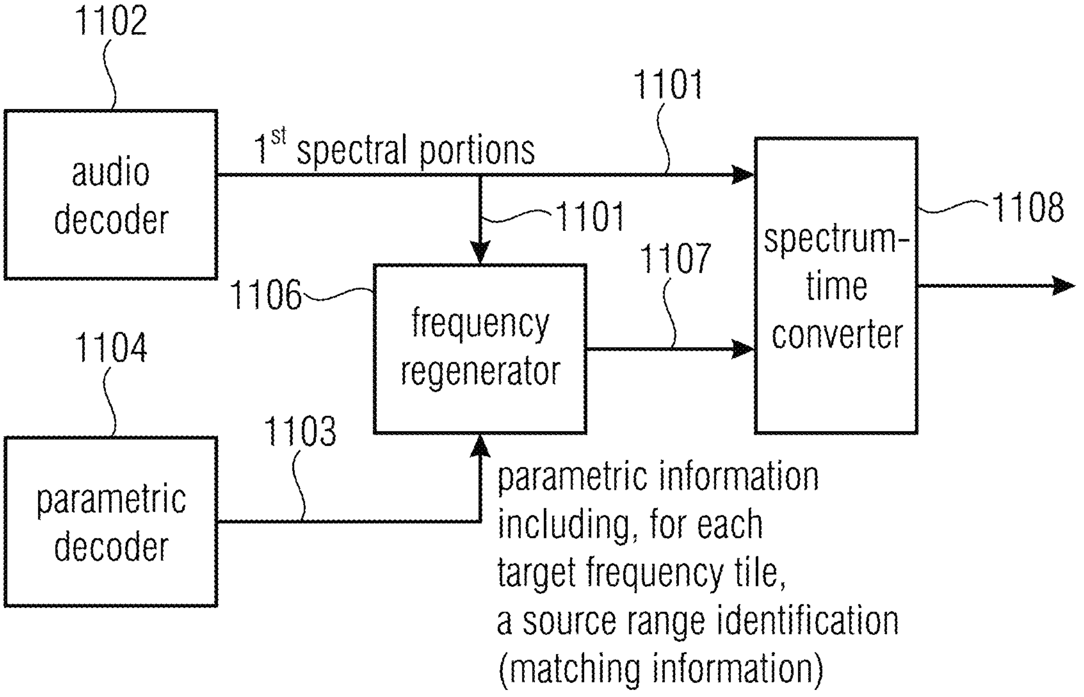
FIG. 11*a* illustrates a further decoder having a specific source range identification for a spectral tile filling operation in the decoder.

FIG. 11*a* illustrates an audio decoder for decoding an encoded audio signal. The audio decoder comprises an audio (core) decoder 1102 for generating a first decoded representation of a first set of first spectral portions, the decoded representation having a first spectral resolution.

Furthermore, the audio decoder comprises a parametric decoder 1104 for generating a second decoded representation of a second set of second spectral portions having a second spectral resolution being lower than the first spectral resolution. Furthermore, a frequency regenerator 1106 is provided which receives, as a first input 1101, decoded first spectral portions and as a second input at 1103 the parametric information including, for each target frequency tile or target reconstruction band a source range information. The frequency regenerator 1106 then applies the frequency regeneration by using spectral values from the source range identified by the matching information in order to generate the spectral data for the target range. Then, the first spectral portions 1101 and the output of the frequency regenerator 1107 are both input into a spectrum-time converter 1108 to finally generate the decoded audio signal.

Advantageously, the audio decoder 1102 is a spectral domain audio decoder, although the audio decoder can also be implemented as any other audio decoder such as a time domain or parametric audio decoder.

Figure 11B:
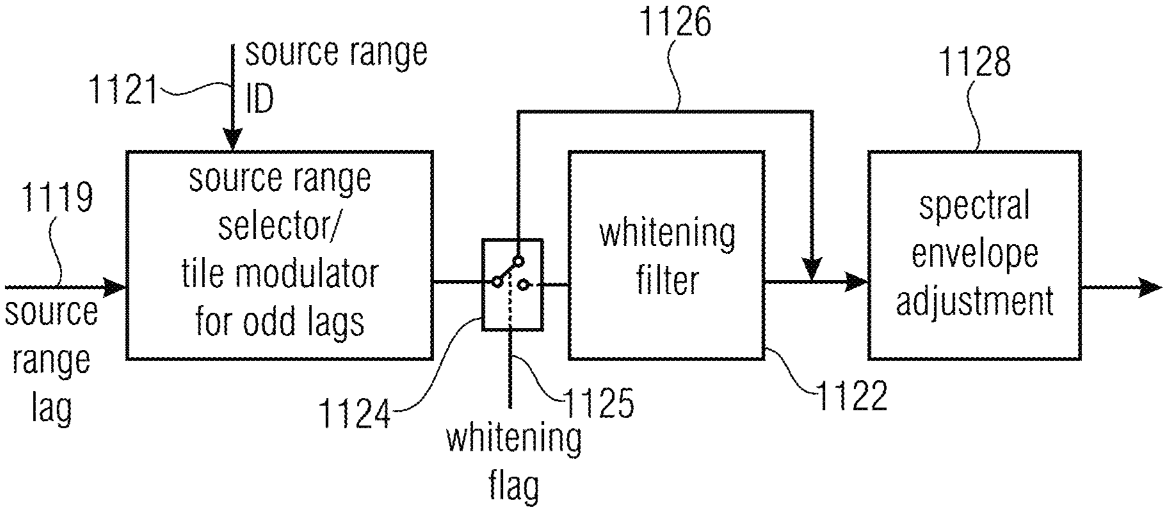
FIG. 11*b* illustrates the further functionality of the frequency regenerator of FIG. 11*a;*

As indicated at FIG. 11*b*, the frequency regenerator 1106 may comprise the functionalities of block 1120 illustrating a source range selector-tile modulator for odd lags, a whitened filter 1122, when a whitening flag 1123 is provided, and additionally, a spectral envelope with adjustment functionalities implemented illustrated in block 1128 using the raw spectral data generated by either block 1120 or block 1122 or the cooperation of both blocks. Anyway, the frequency regenerator 1106 may comprise a switch 1124 reactive to a received whitening flag 1123. When the whitening flag is set, the output of the source range selector/tile modulator for odd lags is input into the whitening filter 1122. Then, however, the whitening flag 1123 is not set for a certain reconstruction band, then a bypass line 1126 is activated so that the output of block 1120 is provided to the spectral envelope adjustment block 1128 without any whitening. There may be more than one level of whitening (1123) signaled in the bitstream and these levels may be signaled per tile. In case there are three levels signaled per tile, they shall be coded in the following way:

```
bit = readBit(1);
if(bit == 1) {
  for(tile_index = 0..nT)
    /*same levels as last frame*/
    whitening_level[tile_index] = whitening_level_prev_frame[tile_index];
} else {
  /*first tile:*/
  tile_index = 0;
  bit = readBit(1);
  if(bit == 1) {
    whitening_level[tile_index] = MID_WHITENING;
  } else {
    bit = readBit(1);
    if(bit == 1) {
      whitening_level[tile_index] = STRONG_WHITENING;
    } else {
      whitening_level[tile_index] = OFF; /*no-whitening*/
    }
  }
/*remaining tiles:*/
  bit = readBit(1);
  if(bit == 1) {
    /*flattening levels for remaining tiles same as first.*/
    /*No further bits have to be read*/
```

-continued

```
    for(tile_index = 1..nT)
      whitening_level[tile_index] = whitening_level[0];
    } else {
    /*read bits for remaining tiles as for first tile*/
    for(tile_index = 1..nT) {
      bit = readBit(1);
      if(bit == 1) {
        whitening_level[tile_index] = MID_WHITENING;
      } else {
        bit = readBit(1);
        if(bit == 1) {
          whitening_level [tile_index] = STRONG_WHITENING;
        } else {
          whitening_level[tile_index] = OFF; /*no-whitening*/
        }
      }
    }
  }
}
```

MID_WHITENING and STRONG_WHITENING refer to different whitening filters (1122) that may differ in the way the envelope is calculated (as described before).

The decoder-side frequency regenerator can be controlled by a source range ID 1121 when only a coarse spectral tile selection scheme is applied. When, however, a fine-tuned spectral tile selection scheme is applied, then, additionally, a source range lag 1119 is provided. Furthermore, provided that the correlation calculation provides a negative result, then, additionally, a sign of the correlation can also be applied to block 1120 so that the page data spectral lines are each multiplied by "−1" to account for the negative sign.

Thus, the present invention as discussed in FIG. 11*a*, 11*b* makes sure that an optimum audio quality is obtained due to the fact that the best matching source range for a certain destination or target range is calculated on the encoder-side and is applied on the decoder-side.

Figure 11C:
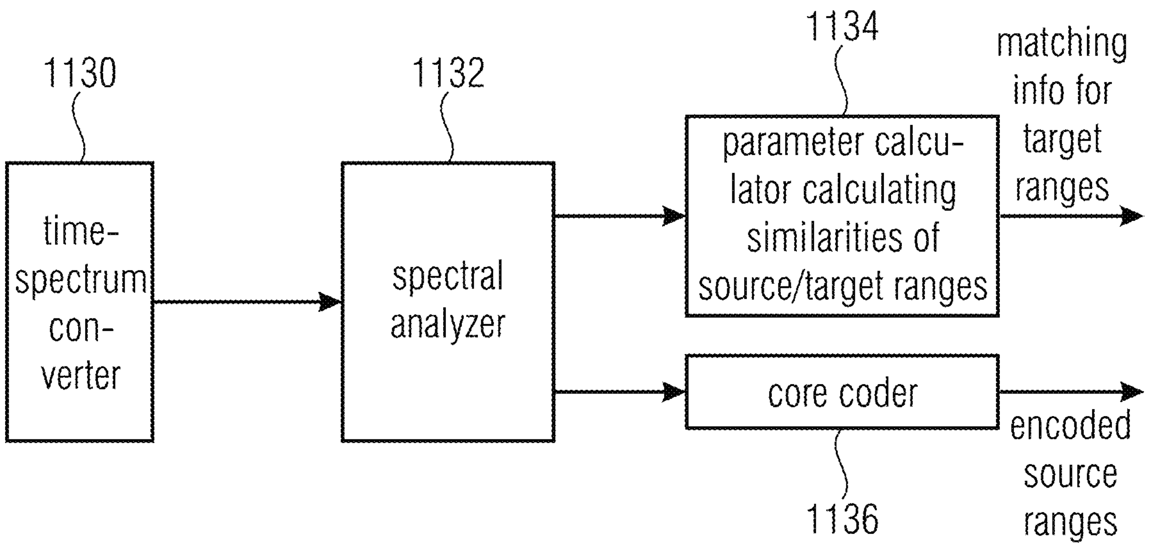
FIG. 11*c* illustrates an encoder used for cooperating with the decoder in FIG. 11*a;*

FIG. 11*c* is a certain audio encoder for encoding an audio signal comprising a time-spectrum converter 1130, a subsequently connected spectral analyzer 1132 and, additionally, a parameter calculator 1134 and a core coder 1136. The core coder 1136 outputs encoded source ranges and the parameter calculator 1134 outputs matching information for target ranges.

The encoded source ranges are transmitted to a decoder together with matching information for the target ranges so that the decoder illustrated in FIG. 11*a* is in the position to perform a frequency regeneration.

The parameter calculator 1134 is configured for calculating similarities between first spectral portions and second spectral portions and for determining, based on the calculated similarities, for a second spectral portion a matching first spectral portion matching with the second spectral portion. Advantageously, matching results for different source ranges and target ranges as illustrated in FIGS. 12*a*, 12*b* to determine a selected matching pair comprising the second spectral portion, and the parameter calculator is configured for providing this matching information identifying the matching pair into an encoded audio signal. Advantageously, this parameter calculator 1134 is configured for using predefined target regions in the second set of second spectral portions or predefined source regions in the first set of first spectral portions as illustrated, for example, in FIG. 12*b*. Advantageously, the predefined target regions are non-overlapping or the predefined source regions are overlapping. When the predefined source regions are a subset of the first set of first spectral portions below a gap filling start frequency 309 of FIG. 3*a*, and advantageously, the predefined target region covering a lower spectral region coincides, with its lower frequency border with the gap filling start frequency so that any target ranges are located above the gap filling start frequency and source ranges are located below the gap filling start frequency.

Figure 11D:
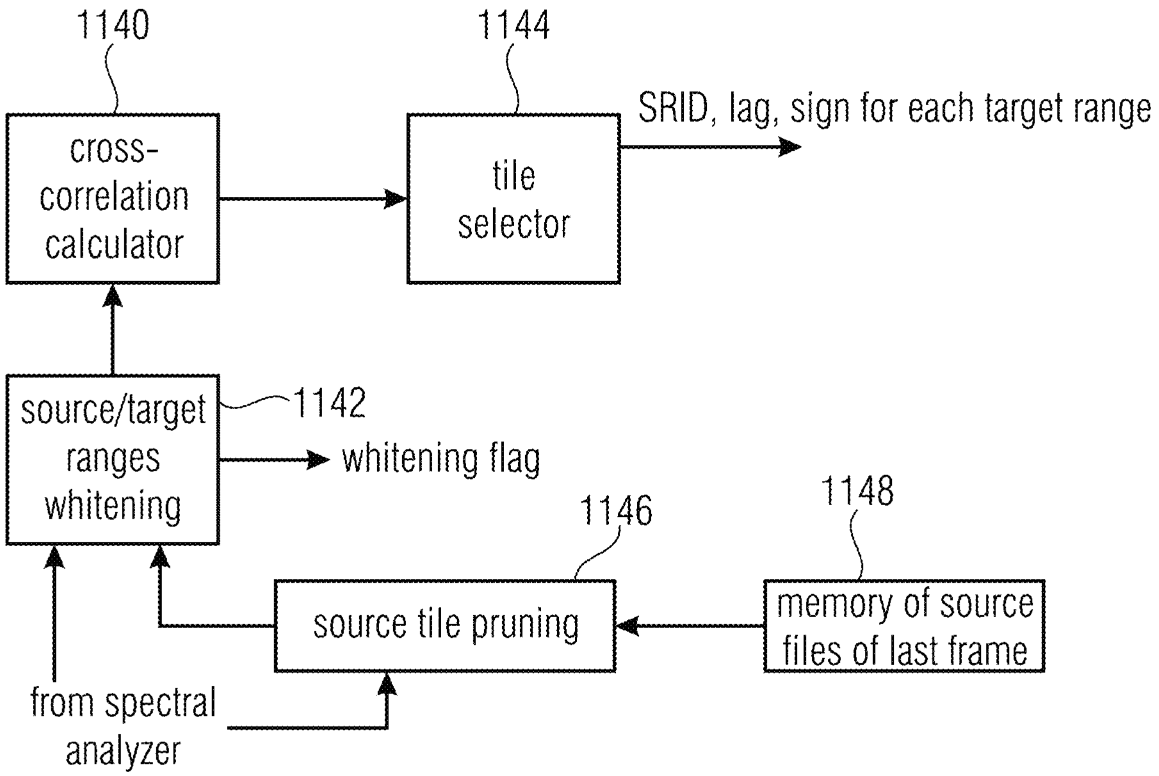
FIG. 11*d* illustrates a block diagram of an implementation of the parameter calculator of FIG. 11*c;*

As discussed, a fine granularity is obtained by comparing a target region with a source region without any lag to the source region and the same source region, but with a certain lag. These lags are applied in the cross-correlation calculator 1140 of FIG. 11*d* and the matching pair selection is finally performed by the tile selector 1144.

Furthermore, it is advantageous to perform a source and/or target ranges whitening illustrated at block 1142. This block 1142 then provides a whitening flag to the bitstream which is used for controlling the decoder-side switch 1123 of FIG. 11*b*. Furthermore, if the cross-correlation calculator 1140 provides a negative result, then this negative result is also signaled to a decoder. Thus, in an embodiment, the tile selector outputs a source range ID for a target range, a lag, a sign and block 1142 additionally provides a whitening flag.

Furthermore, the parameter calculator 1134 is configured for performing a source tile pruning 1146 by reducing the number of potential source ranges in that a source patch is dropped from a set of potential source tiles based on a similarity threshold. Thus, when two source tiles are similar more or equal to a similarity threshold, then one of these two source tiles is removed from the set of potential sources and the removed source tile is not used anymore for the further processing and, specifically, cannot be selected by the tile selector 1144 or is not used for the cross-correlation calculation between different source ranges and target ranges as performed in block 1140.

Different implementations have been described with respect to different figures. FIGS. 1*a*-5*c* relate to a full rate or a full bandwidth encoder/decoder scheme. FIGS. 6*a*-7*e* relate to an encoder/decoder scheme with TNS or TTS processing. FIGS. 8*a*-8*e* relate to an encoder/decoder scheme with specific two-channel processing. FIGS. 9*a*-10*d* relate to a specific energy information calculation and application, and FIGS. 11*a*-12*c* relate to a specific way of tile selection.

All these different aspects can be of inventive use independent of each other, but, additionally, can also be applied together as basically illustrated in FIGS. 2*a* and 2*b*. However, the specific two-channel processing can be applied to an encoder/decoder scheme illustrated in FIG. 13 as well, and the same is true for the TNS/TTS processing, the envelope energy information calculation and application in the reconstruction band or the adaptive source range identification and corresponding application on the decoder side. On the other hand, the full rate aspect can be applied with or without TNS/TTS processing, with or without two-channel processing, with or without an adaptive source range identification or with other kinds of energy calculations for the spectral envelope representation. Thus, it is clear that features of one of these individual aspects can be applied in other aspects as well.

Although some aspects have been described in the context of an apparatus for encoding or decoding, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a Hard Disk Drive (HDD), a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF CITATIONS

[1] Dietz, L. Liljeryd, K. Kjörling and O. Kunz, "Spectral Band Replication, a novel approach in audio coding," in 112th AES Convention, Munich, May 2002.

[2] Ferreira, D. Sinha, "Accurate Spectral Replacement", Audio Engineering Society Convention, Barcelona, Spain 2005.

[3] D. Sinha, A. Ferreiral and E. Harinarayanan, "A Novel Integrated Audio Bandwidth Extension Toolkit (ABET)", Audio Engineering Society Convention, Paris, France 2006.

[4] R. Annadana, E. Harinarayanan, A. Ferreira and D. Sinha, "New Results in Low Bit Rate Speech Coding and Bandwidth Extension", Audio Engineering Society Convention, San Francisco, USA 2006.

[5] T. Żernicki, M. Bartkowiak, "Audio bandwidth extension by frequency scaling of sinusoidal partials", Audio Engineering Society Convention, San Francisco, USA 2008.

[6] J. Herre, D. Schulz, Extending the MPEG-4 AAC Codec by Perceptual Noise Substitution, 104th AES Convention, Amsterdam, 1998, Preprint 4720.

[7] M. Neuendorf, M. Multrus, N. Rettelbach, et al., MPEG Unified Speech and Audio Coding—The ISO/MPEG Standard for High-Efficiency Audio Coding of all Content Types, 132nd AES Convention, Budapest, Hungary, April, 2012.

[8] McAulay, Robert J., Quatieri, Thomas F. "Speech Analysis/Synthesis Based on a Sinusoidal Representation". IEEE Transactions on Acoustics, Speech, And Signal Processing, Vol 34(4), August 1986.

[9] Smith, J. O., Serra, X. "PARSHL: An analysis/synthesis program for non-harmonic sounds based on a sinusoidal representation", Proceedings of the International Computer Music Conference, 1987.

[10] Purnhagen, H.; Meine, Nikolaus, "HILN—the MPEG-4 parametric audio coding tools," *Circuits and Systems,* 2000. *Proceedings. ISCAS* 2000 *Geneva. The* 2000 *IEEE International Symposium on*, vol. 3, no., pp. 201, 204 vol. 3, 2000

[11] International Standard ISO/IEC 13818-3, Generic Coding of Moving Pictures and Associated Audio: Audio", Geneva, 1998.

[12] M. Bosi, K. Brandenburg, S. Quackenbush, L. Fielder, K. Akagiri, H. Fuchs, M. Dietz, J. Herre, G. Davidson, Oikawa: "MPEG-2 Advanced Audio Coding", 101st AES Convention, Los Angeles 1996

[13] J. Herre, "Temporal Noise Shaping, Quantization and Coding methods in Perceptual Audio Coding: A Tutorial introduction", 17th AES International Conference on High Quality Audio Coding, August 1999

[14] J. Herre, "Temporal Noise Shaping, Quantization and Coding methods in Perceptual Audio Coding: A Tutorial introduction", 17th AES International Conference on High Quality Audio Coding, August 1999
[15] International Standard ISO/IEC 23001-3:2010, Unified speech and audio coding Audio, Geneva, 2010.
[16] International Standard ISO/IEC 14496-3:2005, Information technology—Coding of audio-visual objects—Part 3: Audio, Geneva, 2005.
[17] P. Ekstrand, "Bandwidth Extension of Audio Signals by Spectral Band Replication", in Proceedings of 1st IEEE Benelux Workshop on MPCA, Leuven, November 2002
[18] F. Nagel, S. Disch, S. Wilde, A continuous modulated single sideband bandwidth extension, ICASSP International Conference on Acoustics, Speech and Signal Processing, Dallas, Tex. (USA), April 2010

The invention claimed is:

1. An apparatus for decoding an encoded audio signal, the encoded audio signal comprising prediction filter information, comprising:

a spectral domain audio decoder configured for generating a decoded representation of a first set of first spectral portions, the decoded representation of the first set of first spectral portions being spectral prediction residual values for the first set of first spectral portions;

a frequency regenerator configured for generating reconstructed spectral prediction residual values of two reconstructed second spectral portions using the spectral prediction residual values for one or more first spectral portions of the first set of first spectral portions, wherein the reconstructed second spectral portions are different, with respect to frequency, from the one or more first spectral portions of the first set of first spectral portions, wherein a first spectral portion of the one or more first spectral portions of the first set of first spectral portions is placed, with respect to frequency, between the two reconstructed second spectral portions; and an inverse prediction filter configured for performing an inverse prediction over frequency using, as an input signal into the inverse prediction filter, the spectral prediction residual values for the first set of first spectral portions and the reconstructed spectral prediction residual values for the two reconstructed second spectral portions, wherein the inverse prediction filter is configured using the prediction filter information comprised in the encoded audio signal.

2. The apparatus of claim 1, further comprising a frequency time-converter configured for converting an output of the inverse prediction filter or an envelope shaped output of the inverse prediction filter into a time representation.

3. The apparatus of claim 1, wherein the inverse prediction filter is a complex filter defined by the prediction filter information comprised in the encoded audio signal.

4. The apparatus of claim 1, wherein the spectral domain audio decoder is configured to generate the decoded representation of the first set of first spectral portions so that the decoded representation of the first set of first spectral portions comprises a Nyquist frequency equal to a sampling rate of a time domain signal generated by a time-frequency conversion of an output signal of the inverse prediction filter.

5. The apparatus of claim 1, wherein the spectral domain audio decoder is configured so that a maximum frequency represented by a spectral value for the maximum frequency in the decoded representation of the first set of first spectral portions is equal to a maximum frequency comprised in a time representation generated by frequency-time converting an output signal of the prediction filter, wherein the spectral value for the maximum frequency in the decoded representation of the first set of first spectral portions is zero or different from zero.

6. The apparatus of claim 1, wherein the decoded representation of the first set of first spectral portions comprises real spectral prediction residual values for the first set of first spectral portions wherein the apparatus further comprises an estimator configured for estimating imaginary spectral prediction residual values for the spectral prediction residual values for the first set of first spectral portions from the real spectral prediction residual values for the first set of first spectral portions, and wherein the inverse prediction filter is a complex inverse prediction filter defined by the prediction filter information comprised in the encoded audio signal and being complex-valued, and wherein the apparatus further comprises a frequency-time converter configured for performing a conversion of a complex-valued spectrum generated by the complex inverse prediction filter into a time domain audio signal.

7. The apparatus of claim 1, wherein the inverse prediction filter is configured to apply a plurality of subfilters, wherein a frequency border of each subfilter coincides with a frequency border of a reconstruction band comprising the two reconstructed second spectral portions, the reconstruction band coinciding with a frequency tile.

8. The apparatus of claim 1, comprising a combiner building a frame comprising the reconstructed spectral prediction residual values for the two reconstructed second spectral portions and the spectral prediction residual values for the first set of first spectral portions, wherein the inverse prediction filter is configured for performing, within the inverse prediction over frequency, an inverse temporal noise shaping operation or an inverse temporal tile shaping operation to acquire spectral values from the frame comprising the reconstructed spectral prediction residual values for the two reconstructed second spectral portions and the spectral prediction residual values for the first set of first spectral portions.

9. The apparatus of claim 1, wherein the inverse prediction filter is configured to perform an inverse linear prediction along a frequency direction.

10. The apparatus of claim 9, wherein the performing the inverse linear prediction along the frequency direction comprises calculating a spectral value for a certain frequency in a frame using spectral domain prediction values for other frequencies in the frame weighted using the prediction filter information comprised in the encoded audio signal.

11. The apparatus of claim 1, further comprising a spectral envelope shaper configured for shaping a spectral envelope of the input signal into the inverse prediction filter or an output signal of the inverse prediction filter.

12. The apparatus of claim 11, wherein the encoded audio signal comprises spectral envelope information for the second spectral portion, the spectral envelope information comprising a second spectral resolution, the second spectral resolution being lower than a first spectral resolution associated with the decoded representation of the first set of first spectral portions, wherein the spectral envelope shaper is configured to apply a spectral envelope shaping operation on the output of the inverse prediction filter, wherein the prediction filter information has been determined by using an audio signal before a prediction filtering in an encoder, or wherein the spectral envelope shaper is configured to apply a spectral envelope shaping operation on the input signal into the inverse prediction filter, wherein the prediction filter information comprised in the encoded audio signal has been determined by using an audio signal subsequent to a prediction filtering in an encoder.

13. An apparatus for encoding an audio signal, comprising:

a time-frequency converter configured for converting the audio signal into a spectral representation comprising spectral values;

a prediction filter configured for performing a prediction over frequency on the spectral values of the spectral representation to generate spectral prediction residual values for a first set of first spectral portions and to generate spectral prediction residual values for a second set of second spectral portions, the prediction filter being defined by prediction filter information derived from the audio signal, wherein a first spectral portion of the first set of first spectral portions is placed, with respect to frequency, between two second spectral portions of the second set of second spectral portions;

an audio encoder configured for encoding the spectral prediction residual values for the first set of first spectral portions to acquire encoded spectral prediction residual values for the first set of first spectral portions;

a parametric coder configured for parametrically coding the spectral prediction residual values for the second set of second spectral portions or for parametrically coding the spectral values of the spectral representation for the second set of second spectral acquire a parametrically encoded second set of second spectral portions, wherein the second spectral portions of the second set of second spectral portions are different, with respect to frequency, from the first spectral portions of the first set of first spectral portions; and an output interface configured for outputting an encoded signal, the encoded signal comprising the parametrically encoded second set of second spectral portions, the encoded spectral prediction residual values for the first set of first spectral portions, and prediction the filter information derived from the audio signal.

14. The apparatus of claim 13, wherein the prediction filter is configured for performing, within the prediction over frequency, a temporal noise shaping operation or a temporal tile shaping operation to acquire the spectral prediction residual values for the first set of first spectral portions and for the second set of second spectral portions from the spectral values of the spectral representation.

15. The apparatus of claim 13, comprising a filter information calculator for calculating a set of linear prediction coefficients using a forward prediction on the spectral representation, and wherein the prediction filter is configured to be controlled by the set of linear prediction coefficients in performing the prediction over frequency, and wherein the prediction filter information represents the set of linear prediction coefficients.

16. The apparatus of claim 13, wherein the time-frequency converter is configured for performing a modified discrete cosine transform on the audio signal, and wherein the spectral residual values for the first set of first spectral portions and for the second set of second spectral portions are modified discrete cosine transform spectral residual values.

17. The apparatus of claim 13, wherein the prediction filter comprises a filter information calculator, the filter information calculator being configured for using the spectral values of the spectral representation to calculate the prediction filter information derived from the audio signal, and wherein the prediction filter is configured for calculating the spectral residual values for the first set of first spectral portions and for the second set of second spectral portions using the spectral values of the spectral representation, wherein the spectral values for the first set of first spectral portions and for the second set of second spectral portions for calculating the prediction filter information derived from the audio signal and the spectral values for the first set of first spectral portions and for the second set of second spectral portions input into the prediction filter are derived from the same audio signal.

18. The apparatus of claim 13, wherein the time-frequency converter is configured for providing a complex-valued spectral representation, and wherein the spectral values are complex spectral values, wherein the prediction filter is configured for performing the prediction over frequency on the complex-spectral values, and wherein the prediction filter information derived from the audio signal is configured to define a complex inverse prediction filter.

19. The apparatus of claim 13, wherein the prediction filter is configured to perform a linear prediction on the spectral representation along a frequency direction.

20. The apparatus of claim 19, wherein the performing the linear prediction on the spectral representation along the frequency direction comprises calculating a spectral residual value of the spectral residual values for a certain frequency for the first set of first spectral portions and for the second set of second spectral portions in a frame using spectral values from the spectral representation for other frequencies in the frame weighted using the prediction filter information derived from the audio signal.

21. The apparatus of claim 13, wherein the prediction filter comprises a filter calculator configured for calculating the prediction filter information derived from the audio signal using the spectral values of the spectral representation from a TNS start frequency to a TNS stop frequency, wherein the TNS start frequency is lower than 4 kHz and the TNS stop frequency is greater than 9 kHz.

22. The apparatus for encoding of claim 21, further comprising an analyzer configured for determining the first set of first spectral portions to be encoded by the audio encoder, the analyzer using a gap filling start frequency, wherein spectral portions below the gap filling start frequency are first spectral portions of the first set of first spectral portions, and wherein the TNS stop frequency is greater than the gap filling start frequency.

23. A method of decoding an encoded audio signal the encoded audio signal comprising prediction filter information, comprising:

generating a decoded representation of a first set of first spectral portions, the decoded representation of the first set of first spectral portions being spectral prediction residual values for the first set of first spectral portions;

regenerating reconstructed spectral prediction residual values of two reconstructed second spectral portions using the spectral prediction residual values for one or more first spectral portions of the first set of first spectral portions, wherein the two reconstructed second spectral portions are different, with respect to frequency, from the one or more first spectral portions of the first set of first spectral portions, wherein a first spectral portion of the one or more first spectral portions of the first set of first spectral portions is placed, with respect to frequency, between the two reconstructed second spectral portions; and performing an inverse prediction over frequency using, as an input signal into the inverse prediction filter, the spectral prediction residual values for the first set of first spectral portions and reconstructed spectral prediction residual values for the two reconstructed second spectral portions, wherein the inverse prediction filter is configured using the prediction filter information comprised in the encoded audio signal.

24. The method of claim 23, wherein the encoded audio signal comprises spectral envelope information for the second spectral portion, the spectral envelope information comprising a second spectral resolution, the second spectral resolution being lower than a first spectral resolution associated with the decoded representation, wherein the regenerating comprises a spectral envelope shaping comprising applying a spectral envelope shaping operation on an output of the step of performing an inverse prediction over frequency, wherein the prediction filter information comprised in the encoded audio signal has been determined by using an audio signal before a prediction filtering in an encoder, or wherein the regenerating comprises a spectral envelope shaping comprising applying a spectral envelope shaping operation on an input of the step of performing an inverse prediction over frequency, wherein the prediction filter information comprised in the encoded audio signal has been determined by using an audio signal subsequent to a prediction filtering in an encoder.

25. A method of encoding an audio signal, comprising:

converting the audio signal into a spectral representation comprising spectral values;

performing a prediction over frequency on the spectral values of the spectral representation to generate spectral prediction residual values for a first set of first spectral portions and to generate spectral prediction residual values for a second set of second spectral portions, the prediction filter being defined by prediction filter information derived from the audio signal, wherein a first spectral portion of the first set of first spectral portions is placed, with respect to frequency, between two second spectral portions of the second set of second spectral portions;

encoding the spectral prediction residual values for the first set of first spectral portions to acquire encoded spectral prediction residual values for the first set of first spectral portions;

parametrically coding the spectral prediction residual values for the second set of second spectral portions or for parametrically coding the spectral values of the spectral representation for the second set of second spectral portions to acquire a parametrically encoded second set of second spectral portions, wherein the second spectral portions of the second set of second spectral portions are different, with respect to frequency, from the first spectral portions of the first set of first spectral portions; and outputting an encoded signal, the encoded signal comprising the parametrically encoded second set of second spectral portions, the encoded spectral prediction residual values for the first set of first spectral portions, and the prediction filter information derived from the audio signal.

26. A non-transitory digital storage medium having a computer program stored thereon to perform, when the computer program is run by a computer, the method of decoding an encoded audio signal, the encoded audio signal comprising prediction filter information, and the method of decoding comprising:

generating a decoded representation of a first set of first spectral, the decoded representation of the first set of first spectral portions being spectral prediction residual values for the first set of first spectral portions;

regenerating reconstructed spectral prediction residual values of two reconstructed second spectral portions using the spectral prediction residual values for one or more first spectral portions of the first set of first spectral portions, wherein the two reconstructed second spectral portions are different, with respect to frequency, from the one or more first spectral portions of the first set of first spectral portions, wherein a first spectral portion of the one or more first spectral portions of the first set of first spectral portions is placed, with respect to frequency, between the two reconstructed second spectral portions; and performing an inverse prediction over frequency using, as an input signal into the inverse prediction filter, the spectral prediction residual values for the first set of first spectral portions and the reconstructed spectral prediction residual values for the two reconstructed second spectral portions, wherein the inverse prediction filter is configured using the prediction filter information comprised in the encoded audio signal.

27. A non-transitory digital storage medium having a computer program stored thereon to perform, when the computer program is run by a computer, the method of encoding an audio signal, the method comprising:

converting the audio signal into a spectral representation comprising spectral values;

performing a prediction over frequency on the spectral values of the spectral representation to generate spectral prediction residual values for a first set of first spectral portions and to generate spectral prediction residual values for a second set of second spectral portions, the prediction filter being defined by prediction filter information derived from the audio signal, wherein a first spectral portion of the first set of first spectral portions is placed, with respect to frequency, between two second spectral portions of the second set of second spectral portions;

encoding the spectral prediction residual values for the first set of first spectral portions to acquire encoded spectral prediction residual values for the first set of first spectral portions;

parametrically coding the spectral prediction residual values for the second set of second spectral portions or for parametrically coding the spectral values of the spectral representation for the second set of second spectral portions to acquire a parametrically encoded second set of second spectral portions, wherein the second spectral portions of the second set of second spectral portions are different, with respect to frequency, from the first spectral portions of the first set of first spectral portions; and outputting an encoded signal, the encoded signal comprising the parametrically encoded second set of second spectral portions, the encoded spectral prediction residual values for the first set of first spectral portions, and the prediction filter information derived from the audio signal.

* * * * *